US011458993B2

(12) United States Patent
Brown et al.

(10) Patent No.: US 11,458,993 B2
(45) Date of Patent: Oct. 4, 2022

(54) DETECTING A ROAD CLOSURE BY A LEAD AUTONOMOUS VEHICLE (AV) AND UPDATING ROUTING PLANS FOR FOLLOWING AVS

(71) Applicant: TuSimple, Inc., San Diego, CA (US)

(72) Inventors: Robert Patrick Brown, San Diego, CA (US); Scott Douglas Foster, San Diego, CA (US); Joyce Tam, Pleasanton, CA (US)

(73) Assignee: TUSIMPLE, INC., San Diego, CA (US)

( * ) Notice: Subject to any disclaimer, the term of this patent is extended or adjusted under 35 U.S.C. 154(b) by 44 days.

(21) Appl. No.: 17/021,991

(22) Filed: Sep. 15, 2020

(65) Prior Publication Data
US 2022/0081005 A1 Mar. 17, 2022

(51) Int. Cl.
*B60W 60/00* (2020.01)
*G01C 21/34* (2006.01)
(Continued)

(52) U.S. Cl.
CPC .... *B60W 60/0015* (2020.02); *B60W 30/0956* (2013.01); *B60W 30/143* (2013.01);
(Continued)

(58) Field of Classification Search
CPC ......... B60W 60/0015; B60W 30/0956; B60W 30/143; B60W 30/16; B60W 40/06;
(Continued)

(56) References Cited

U.S. PATENT DOCUMENTS 10,073,462 B2   9/2018  Debreczeni
10,571,285 B2 * 2/2020  Wang ................. G01C 21/3415
(Continued)

FOREIGN PATENT DOCUMENTS

KR      20200009559 A       1/2020
WO   WO-2017176550 A1 * 10/2017   ......... G01C 21/3415

OTHER PUBLICATIONS

Brown, R. P. et al., "Detecting a Road Closure by a Lead Autonomous Vehicle (AV) and Updating Routing Plans for Following AVs," U.S. Appl. No. 17/021,934, filed Sep. 15, 2020, 119 pages.
(Continued)

*Primary Examiner* — Dale W Hilgendorf
(74) *Attorney, Agent, or Firm* — Paul Liu; Glenn Theodore Matthews; Baker Botts LLP

(57) ABSTRACT

A lead autonomous vehicle (AV) includes a sensor configured to observe a field of view in front of the lead AV. Following AVs are on the same road behind the lead AV. A processor of the lead AV is configured to detect a road closure. The processor overrides driving instructions of the lead AV, such that the lead AV is stopped at first location coordinates. The processor sends a first message to an operation server, indicating that the road closure is detected. The operation server update the first portion of the map data, reflecting the road closure. The operation server determines whether re-routing is possible for each AV. If re-routing is possible is possible for that AV, the operation server sends re-routing instructions to the AV. If re-routing is not possible is possible for that AV, the operation server sends pulling over instructions to the AV.

17 Claims, 18 Drawing Sheets

(51) Int. Cl.
*G01C 21/00* (2006.01)
*B60W 30/095* (2012.01)
*G01C 21/30* (2006.01)
*B60W 50/14* (2020.01)
*B60W 30/14* (2006.01)
*B60W 30/16* (2020.01)
*B60W 40/06* (2012.01)
*G08G 1/00* (2006.01)

(52) U.S. Cl.
CPC ............ *B60W 30/16* (2013.01); *B60W 40/06* (2013.01); *B60W 50/14* (2013.01); *G01C 21/30* (2013.01); *G01C 21/3415* (2013.01); *G01C 21/3815* (2020.08); *G01C 21/3837* (2020.08); *G01C 21/3863* (2020.08); *G01C 21/3885* (2020.08); *B60W 2420/40* (2013.01); *B60W 2420/42* (2013.01); *B60W 2420/52* (2013.01); *B60W 2552/00* (2020.02); *B60W 2554/20* (2020.02); *G08G 1/22* (2013.01)

(58) Field of Classification Search
CPC ............ B60W 50/14; B60W 2420/40; B60W 2420/42; B60W 2420/52; B60W 2552/00; B60W 2554/20; G01C 21/30; G01C 21/3415; G01C 21/3815; G01C 21/3837; G01C 21/3863; G01C 21/3885; G08G 1/22
See application file for complete search history.

(56) References Cited

U.S. PATENT DOCUMENTS

| | | | |
|---|---|---|---|
| 10,818,187 B2* | 10/2020 | Perko | G05D 1/0011 |
| 2015/0254986 A1 | 9/2015 | Fairfield et al. | |
| 2016/0161267 A1* | 6/2016 | Harada | G01C 21/3658 701/25 |
| 2016/0231746 A1* | 8/2016 | Hazelton | G05D 1/0274 |
| 2017/0242436 A1 | 8/2017 | Creusot | |
| 2017/0262790 A1* | 9/2017 | Khasis | G01C 21/3492 |
| 2018/0299283 A1* | 10/2018 | Wang | G08G 1/096844 |
| 2019/0135283 A1* | 5/2019 | Bonk | G08G 1/096844 |
| 2019/0187723 A1* | 6/2019 | Tao | G01C 21/3492 |
| 2019/0242721 A1 | 8/2019 | Awano | |
| 2020/0312144 A1* | 10/2020 | Noguchi | G01C 21/3453 |

OTHER PUBLICATIONS

Brown, R. P. et al., "Detecting a Road Structure Change by a Lead Autonomous Vehicle (AV) and Updating Routing Plans for the Lead AV and Following AVs," U.S. Appl. No. 17/021,963, filed Sep. 15, 2020, 114 pages.

Brown, R. P. et al., "Detecting an Unknown Object by a Lead Autonomous Vehicle (AV) and Updating Routing Plans for Following AVs," U.S. Appl. No. 17/021,981, filed Sep. 15, 2020, 115 pages.

European Patent Office, Extended European Search Report, Application No. 21196575.1, dated Feb. 10, 2022, 8 pages.

* cited by examiner

DETECTING A ROAD CLOSURE BY A LEAD AUTONOMOUS VEHICLE (AV) AND UPDATING ROUTING PLANS FOR FOLLOWING AVS

TECHNICAL FIELD

The present disclosure relates generally to autonomous vehicles. More particularly, the present disclosure is related to detecting a road closure by a lead Autonomous Vehicle (AV) and updating routing plans for following AVs.

BACKGROUND

One aim of autonomous vehicle technologies is to provide vehicles that can safely navigate towards a destination with limited or no driver assistance. In some cases, an autonomous vehicle may encounter an unexpected situation on its way to a destination. In such cases, an assistance of a driver is needed to manually drive the autonomous vehicle bypassing the unexpected situation. Current autonomous vehicle technologies may not be configured to account for encountering specific unexpected situations.

SUMMARY

With respect to encountering an unknown object as described in FIGS. 2-5, in one embodiment, a system includes a lead autonomous vehicle (AV). The lead AV includes at least one vehicle sensor that is configured to observe a first field-of-view comprising a region in front of the lead AV. The system further includes one or more following AVs different from the lead AV. The lead AV is on a particular road heading toward a destination using a routing plan and map data previously received from an operation server. The one or more following AVs are on the particular road behind the lead AV. The lead AV and the one or more following AVs are communicatively coupled with the operation server. The system further includes a first control subsystem, associated with the lead AV. The first control subsystem is communicatively coupled with the lead AV, the one or more following AVs, and the operation server.

The first control subsystem includes a first processor configured to receive sensor data from at least one vehicle sensor of the lead AV. The sensor data comprises location coordinates of any object on the particular road within the first field-of-view of the lead AV. The first processor compares the sensor data with a first portion of the map data comprising location coordinates of expected objects on the particular road within the first field-of-view of the lead AV. The first processor determines whether there is an unknown object on the particular road which is not among the expected objects based at least in part upon comparing the sensor data with the first portion of the map data. In response to a determination that there is an unknown object on the particular road, the first processor determines a particular lane on which the unknown object is located. The first processor sends a first message to the one or more following AVs, comprising particular location coordinates of the unknown object and instructions to divert from the particular lane. The first processor updates driving instructions of the lead AV to navigate around the unknown object by diverting the particular lane. While navigating around the unknown object, the first processor sends a plurality of second messages to the operation server, comprising sensor data related to the unknown object.

The system further includes the operation server comprising a second processor. The second processor confirms whether there is the unknown object located at the particular location coordinates on the particular lane based at least in part upon the plurality of second messages. If it is confirmed that the unknown object is located at the particular location coordinates, the second processor updates the first portion of the map data, such that the updated map data comprises the unknown object located at particular location coordinates. The second processor sends the updated map data to the one or more following AVs. In other words, the updated map data is updated by the operation server and then sent to the one or more following AVs.

With respect to encountering a road closure as described in FIGS. 6-8, in another embodiment, a system includes a lead autonomous vehicle (AV). The lead AV includes at least one vehicle sensor that is configured to observe a first field-of-view comprising a region in front of the lead AV. The system further includes one or more following AVs different from the lead AV. The lead AV is on a particular road heading toward a destination using a routing plan and map data previously received from an operation server. The one or more following AVs are on the particular road behind the lead AV. The lead AV and the one or more following AVs are communicatively coupled with the operation server. The system further includes a first control subsystem, associated with the lead AV. The first control subsystem is communicatively coupled with the lead AV, the one or more following AVs, and the operation server.

The first control subsystem includes a first processor configured to receive sensor data from at least one vehicle sensor of the lead AV. The sensor data comprises location coordinates of any object on the particular road within the first field-of-view of the lead AV. The first processor compares the sensor data with a first portion of the map data. The first portion of the map data comprises location coordinates of expected objects on the particular road within the first field-of-view of the lead AV. The first processor determines whether the particular road is closed ahead by identifying objects in the sensor data that correspond to a road closure and that are not among the expected objects in the map data. In response to a determination that the particular road is closed ahead, the first processor determines particular location coordinates of the road closure. The first processor overrides driving instructions of the lead AV, such that the lead AV is stopped (e.g., in place on the road or pulled over off the road or to a shoulder of the road) at first location coordinates. The first processor sends a first message to the operation server, indicating that the particular road is closed at the particular location coordinates.

The system further includes the operation server comprising a second processor. The second processor updates the first portion of the map data, reflecting that the particular road is temporarily closed at the particular location coordinates based at least in part upon the first message. The second processor determines location coordinates of each AV from the one or more following AVs. The second processor determines whether re-routing is possible for each AV. The second processor determines that re-routing is possible for an AV if there is at least one road to a second routing plan to reach the destination between the AV and the road closure. If it is determined that re-routing is possible for an AV, the second processor sends the updated map data and re-routing instructions to the AV, where the re-routing instruction comprises using the second routing plan. If it is determined that re-routing is not possible for an AV, the second processor sends the updated map data and road closure instructions to the AV, where road closure instructions comprise stopping and/or pulling over the AV.

With respect to encountering a construction zone as described in FIGS. 9-11, in another embodiment, a system includes a lead autonomous vehicle (AV). The lead AV includes at least one vehicle sensor that is configured to observe a first field-of-view comprising a region in front of the lead AV. The system further includes one or more following AVs different from the lead AV. The lead AV is on a particular road heading toward a destination using a routing plan and map data previously received from an operation server. The one or more following AVs are on the particular road behind the lead AV. The lead AV and the one or more following AVs are communicatively coupled with the operation server. The system further includes a first control subsystem, associated with the lead AV. The first control subsystem is communicatively coupled with the lead AV, the one or more following AVs, and the operation server.

The first control subsystem includes a first processor configured to receive sensor data from at least one vehicle sensor of the lead AV. The sensor data comprises location coordinates of any object on the particular road within the first field-of-view of the lead AV. The first processor compares the sensor data with a first portion of the map data comprising location coordinates of expected objects on the particular road within the first field-of-view of the lead AV. The first processor determines whether there is a construction zone in the particular road by identifying one or more objects in the sensor data that correspond to the construction zone and that are not among the expected objects in the map data. In response to a determination that the construction zone is detected in the particular road, the first processor sends a first message to the operation server, indicating that the construction zone is detected. The first processor updates driving instructions of the lead AV to navigate around the construction zone. While navigating around the construction zone, the first processor sends a plurality of second messages to the operation server, comprising sensor data associated with the construction zone.

The system further includes the operation server comprising a second processor. The second processor determines an extent of the construction zone by determining a distance between location coordinates of two opposite ends of the construction zone based at least in part upon the plurality of second messages. The second processor updates the first portion of the map data, reflecting that there is may be a construction zone in the particular road. The second processor determines location coordinates of each AV. The second processor determines whether re-routing is possible for an AV. The second processor determines that re-routing is possible for an AV if there is at least one road to a second routing plan to reach the destination between the AV and the construction zone. If it is determined that re-routing is possible and the extent of the construction zone is above a configurable threshold distance, the second processor sends the updated map data and re-routing instructions to the AV, where the re-routing instruction comprises using the second routing plan. If it is determined that re-routing is not possible or the extent of the construction zone is below the configurable threshold distance, the second processor sends the updated map data and construction zone instructions to the AV, where the construction zone instructions comprise instructions to navigate around the construction zone.

With respect to encountering a road structural change as described in FIGS. 12 and 13, in another embodiment, a system includes a lead autonomous vehicle (AV). The lead AV includes at least one vehicle sensor that is configured to observe a first field-of-view comprising a region in front of the lead AV. The system further includes one or more following AVs different from the lead AV. The lead AV is on a particular road heading toward a destination using a routing plan and map data previously received from an operation server. The one or more following AVs are on the particular road behind the lead AV. The lead AV and the one or more following AVs are communicatively coupled with the operation server. The system further includes a first control subsystem, associated with the lead AV. The first control subsystem is communicatively coupled with the lead AV, the one or more following AVs, and the operation server.

The first control subsystem includes a first processor configured to receive sensor data from the at least one vehicle sensor of the lead AV. The sensor data comprises location coordinates of any object on the particular road within the first field-of-view of the lead AV. The first processor compares the sensor data with a first portion of the map data comprising location coordinates of expected objects on the particular road within the first field-of-view of the lead AV. The first processor determines whether a structural change in the particular road is detected by identifying one or more objects in the sensor data that correspond to the structural change and that are not among the expected objects in the map data. In response to a determination that the structural change is detected in the particular road, the first processor updates driving instructions of the lead AV to navigate through the structural change using driving instructions related to the structural change. The first processor sends a first message to the operation server indicating that the structural change is detected.

The system further includes the operation server comprising a second processor. The second processor updates the first portion of the map data, reflecting the structural change based at least in part upon the first message. The second processor sends the updated map data to the one or more following AVs.

This disclosure recognizes various problems and previously unmet needs related to AV navigation and driving. For example, current autonomous vehicle navigation technologies may not be configured to account for encountering specific unexpected situations on a road. For instance, in current autonomous vehicle navigation technologies, when an AV encounters an unexpected situation on a road, a driver may be needed to manually drive the AV until it passes the unexpected situation on the road. Certain embodiments of this disclosure provide unique solutions to technical problems of the autonomous vehicle navigation technologies, including those problems described above by identifying the unexpected situation and updating routing plans of the lead AV (i.e., the first AV that is encountering the unexpected situation) and one or more following AVs accordingly.

Some examples of encountering unexpected situations include but are not limited to encountering an unknown object, a road closure, a construction zone, and a road structure change. For example, the disclosed systems provide several technical advantages, which include: 1) in a case of the lead AV encountering an unknown object, identifying the unknown object, navigating the lead AV around the unknown object by diverting from the particular lane that the unknown object is occupying, and informing the one or more following AVs to divert from the particular lane; 2) in a case of the lead AV encountering a road closure, identifying the road closure, overriding the driving instructions of the lead AV by pulling over the lead AV (or stopping the lead AV if all the vehicles behind the road closure are stopped), and informing the one or more following AVs that the road closure is detected; 3) in a case of the lead AV encountering a road closure, determining whether re-routing is possible for each of the one or more following AVs; 4) if it is determined that re-routing is possible for a following AV, updating routing plan of that AV; 5) if is it determined that re-routing is not possible for a following AV, sending instructions to pull over that following AV, sending instructions to proceed towards the road closure and stop at a safe location behind the road closure, or stop at an intermediate AV launch pad/landing pad until the road is opened; 6) in a case of the lead AV encountering a construction zone, identifying the construction zone, navigating the lead AV around the construction zone, while navigating around the construction zone, determining an extent of the construction zone; 7) if it is determined that the construction zone is extensive, update routing plans of the one or more following AVs by instructing them to change to a lane further away from the construction zone ahead of time or re-routing them to avoid the construction zone completely; 8) in a case of the lead AV encountering a road structure change, identifying the road structure change, updating the driving instructions of the lead AV according to the driving instructions related the road structure change, informing the one or more following AVs about the detected road structure change, and updating their driving instructions accordingly; and 9) for each case of encountering an unexpected situation, updating map data accordingly. As such, this disclosure may improve the function of computer systems used for AV navigation during at least a portion of a journey taken by an AV.

In some embodiments, the systems described in this disclosure may be integrated into a practical application of identifying different unexpected situations while driving on a road and, for each unexpected situation, determining a more efficient, safe, and reliable navigating solution for each AV based at least in part upon the nature of that unexpected situation, extent of the unexpected situation, and location coordinate of each AV, among other factors.

For example, in a case of the lead AV encountering an unknown object (e.g., a couch, a ladder), a more efficient, safe, and reliable navigating solution may be to instruct the lead AV to enter a safety mode (e.g., by reducing its speed, increasing a threshold distance from other vehicles, and avoiding driving parallel to other vehicles) and navigate the lead AV around the unknown object. Also, the solution may further involve instructing the one or more following AVs to divert from a lane that the unknown object is occupying. Examples of navigating solutions when encountering an unknown object are described in FIGS. 2-5.

For example in a case of the lead AV encountering a road closure, if it is determined that re-routing for a following AV is not possible (e.g., there are no exits between the following AV and the road closure), a more efficient, safe, and reliable navigating solution may be to pull over the following AV or instruct the following AV to stop at an intermediate AV launch pad/landing pad until the road is opened. Examples of navigating solutions when encountering a road closure are described in FIGS. 6-8.

For example, in a case of the lead AV encountering a construction zone, a more efficient, safe, and reliable navigating solution may be to re-route a following AV for which re-routing is possible. If re-routing is not possible for a following AV, a more efficient, safe, and reliable navigating solution may be instructing that following AV to enter a safety zone and divert to a lane further away from the construction zone ahead of time (i.e., to expect the construction zone). Examples of navigating solutions when encountering a construction zone are described in FIGS. 9-11.

For example, in a case of the lead AV encountering a road structure change, a more efficient, safe, and reliable navigating solution may be to update the driving instructions of the lead AV according to the road structure change and inform the following AVs to expect the road structure change by updating their driving instructions. Examples of navigating solutions when encountering a road structure change are described in FIGS. 12-13.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies may fail to provide efficient and reliable solutions for determining routing or navigation plans for AVs particularly when a first AV (i.e., the lead AV) faces unexpected situations on a particular road. This disclosure provides various systems and methods for improving the navigation of AVs including the first AV and one or more following AVs that are on the particular road behind the lead AV.

Example AV Route

Figure 1:
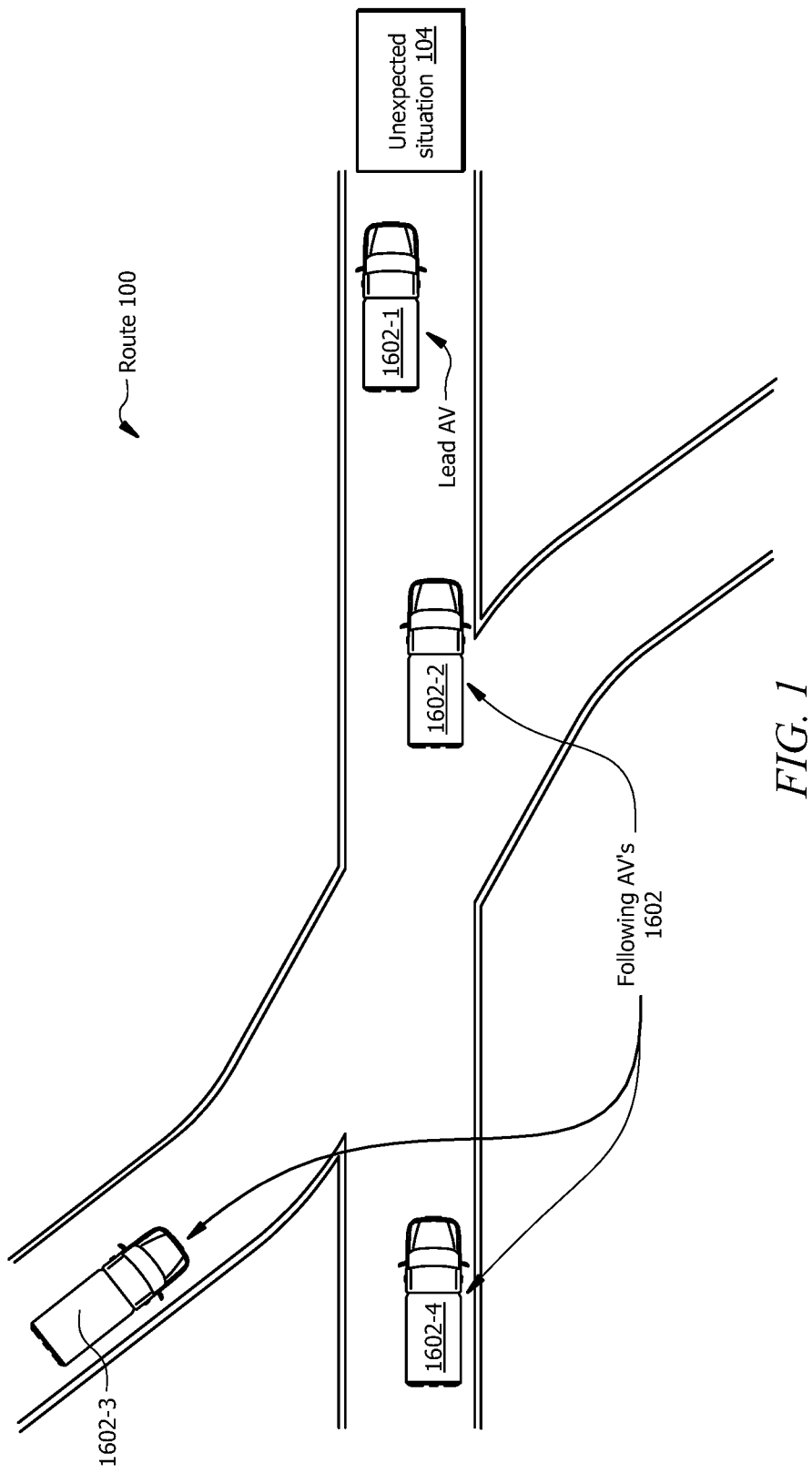
FIG. 1 illustrates a schematic diagram of a route traveled by a lead AV and one or more following AVs according to the present disclosure.

FIG. 1 illustrates a simplified schematic diagram of an example route 100 traveled by the lead AV 1602-1 and one or more following AVs 1602 (i.e., AVs 1602-2, 1602-3, and 1602-4). Each of the AVs 1602 may have started from the same start location or a different start location. Similarly, each AV 1602 may be headed towards the same destination or different destinations.

In general, each AV 1602 is navigated by a plurality of components described in detail in FIGS. 14-18. The corresponding description below includes brief descriptions of certain components of the AV 1602. Each AV 1602 may be a semi-truck tractor unit that attaches to a trailer to transport cargo or freight from a first location to a second location (See FIG. 16). The AV 1602 is described in greater detail below with respect to FIG. 16. In brief, the AV 1602 includes vehicle drive subsystem 1642, a sensor subsystem 1644, and an in-vehicle control computer 1650 which are operated to facilitate autonomous driving of the AV 1602. See FIGS. 16-18 for a further description of the operation of the AV 1602. Each AV 1602 is instructed to follow a routing plan 1514 to reach its destination using sensor data 1412 and map data 1510. See FIGS. 14 and 15 for further descriptions of sensor data 1412 and map data 1510. In brief, sensor data 1412 includes data captured by one or more sensors 1646 of the sensor subsystem 1644. The one or more sensors 1646 are configured to capture any object within detection zones or fields of view of those one or more sensors 1646, such as landmarks, lane markings, lane boundaries, road boundaries, vehicles, pedestrians, road/traffic signs, among other objects. The one or more sensors 1646 may include cameras, LiDAR sensors, motion sensors, infrared sensors, and the like. In one embodiment, the sensors 1646 may be positioned around the AV 1602 to capture the environment surrounding the AV 1602.

In one embodiment, the map data 1510 may include a virtual map of an environment surrounding the route 100. Thus, the map data 1510 may include geographical location coordinates of expected objects on and around the route 100, such as road/traffic signs, buildings, terrain, etc. The map data 1510 may also include information about landmarks, lane markings, lane boundaries, and road boundaries.

The map data 1510 may also include information about elevations of the roads and grade of the roads (i.e., its incline, decline, slop). For example, if a section of a road is perfectly flat and level, then the map data 1510 would specify that the grade along that section is zero. The map data 1510 may include elevation of different segments of the roads, such as hills, valleys, curves, etc., among other information. This information may be used to determine shifting to proper gear, such as shifting to high gear in an uphill road and shifting to low gear in a downhill road. As such, by detecting the elevation change in a road, proper gear shifting may be applied, thereby saving fuel of the AVs 1602, increasing longevity of the vehicle drive subsystems 1642 of the AVs 1602, i.e., engines 1642a, tires 1642b, transmission components 1642c, electrical components 1642d, and power sources 1642e. In one embodiment, if the control system 1400 of an AV 1602 determines that a grade of a road is more than a threshold elevation change (e.g., 7%), it may determine that it is not safe for the AV 1602 to drive in that road.

In one embodiment, the control subsystem 1400 may be a subsystem of the in-vehicle control computer 1650. The control subsystem 1400 is in signal communication with the in-vehicle control computer 1650. See FIG. 14 for details of the operations of the control subsystem 1400 and FIG. 16 for details of the operations of the in-vehicle control computer 1650. In brief, the in-vehicle control computer 1650 is generally configured to control the operation of the AV 1602 and its components, such as the vehicle drive subsystems 1642, vehicle sensor subsystems 1644, and vehicle control subsystem 1648.

The control subsystem 1400 is generally configured to determine a pathway in front of the AV 1602 that is safe to travel. For example, the control subsystem 1400 may determine that a pathway is safe to travel if there are no objects/obstacles in that pathway. Thus, the control subsystem 1400 (in signal communication with the in-vehicle control computer 1650) navigates the AV 1602 according to the driving rules/instructions 1518 of the AV 1602 while keeping a safe distance (e.g., 200 feet) from objects ahead of and around the AV 1602 detected by the sensors of 1646 of that AV 1602. While traveling the route 100, the control subsystem 1400 of the AV 1602 receives the sensor data 1412 from the sensors 1646 of that AV 1602, e.g., covering a region in front of that AV 1602. These sensor data 1412 may include signals from the vehicle sensor subsystem 1644 of the AV 1602 and/or communication from the in-vehicle control computer 1650 of the AV 1602. The sensor data 1412 may include timestamps of data feeds being received from the AV 1602. Examples of the sensor data 1412 are described in FIGS. 2-4 with respect to sensor data 216a-c; in FIGS. 6 and 7 with respect to sensor data 616a, b; in FIGS. 9 and 10 with respect to sensor data 906a, b; and in FIG. 12 with respect to sensor data 1206.

The control subsystem 1400 compares the sensor data 1412 with a portion of the map data 1510 covering the same region in front of the AV 1602 to navigate the AV 1602 until it reaches its destination. Referring back to FIG. 1, in some cases, the lead AV 1602-1 may encounter an unexpected situation 104 that may be any discrepancy between the sensor data 1412 and the map data 1510. In other words, the sensors 1646 of the lead AV 1602-1 may capture the presence of one or more objects that are not among the expected objects in the map data 1510. In such cases, the control subsystem 1400 of the lead AV 1602-1 is configured to identify the unexpected situation 104 and update the routing plan 1514 of the lead AV 1602-1 accordingly.

The control subsystem 1400 of the lead AV 1602-1 and/or the operation server 1500 may inform the one or more following AVs 1602 about the detected unexpected situation 104. Depending on different unexpected situations 104 and the location coordinate of each following AV 1602, the routing plan 1514 of that following AV 1602 may be updated accordingly. When the lead AV 1602-1 is encountering different unexpected situations 104, different unexpected situation instructions 1410 may be communicated to each following AV 1602 based at least in part upon the nature of each unexpected situation 104 and location coordinates of each following AV 1602.

In a first case, for example, assume that the lead AV 1602-1 encounters an unexpected situation 104 that is an unknown object 204 not found among the expected objects in the map data 1510 and/or is not behaving as expected from objects on the road 200 (e.g., a ladder, a couch, etc.). An example situation of encountering an unknown object 204 is described in FIGS. 2-5.

In a second case, for example, assume that the lead AV 1602-1 encounters an unexpected situation 104 that is a road closure 602, where one or more objects indicating the road closure 602 (e.g., a traffic barrier, a delineator, etc.) are detected. An example situation of encountering a road closure 602 is described in FIGS. 6-8.

In a third case, for example, assume that the lead AV 1602-1 encounters an unexpected situation 104 that is a construction zone 902, where one or more objects indicating the construction zone 902 (e.g., a piece of a construction vehicle, reflective vest, construction helmet, etc.) are detected. An example situation of encountering a construction zone 902 is described in FIGS. 9-11.

In a fourth case, for example, assume that the lead AV 1602-1 encounters an unexpected situation 104 that is a road structure change 1202, such as a stop sign replaced with a stop traffic light, or a dashed lane marking changed to a solid lane, etc. An example situation of encountering a road structure change 1202 is described in FIGS. 12-13.

In one embodiment, the control subsystem 1400 of the lead AV 1602-1 may send the sensor data 1412 (associated with the detected unexpected situation 104) to the operation server 1500. See FIG. 15 for further descriptions of the operation server 1500. In brief, the operation server 1500 is generally configured to oversee the operations of the AVs 1602. The operation server 1500 is in signal communication with the AVs 1602. For example, the operation server 1500 may receive sensor data 1412 and analyze them using object detection machine learning modules 1520 to confirm whether the detection of the unexpected situation 104 was correct. For example, the object detection machine learning modules 1520 may be implemented using neural networks and/or machine learning algorithms for detecting objects from images, videos, infrared images, point clouds, radar data, etc. The object detection machine learning modules 1520 may be trained by a training dataset 1522. In one embodiment, the operation server 1500 may be implemented in a cluster of servers where distributed computing is applied to conduct the object detection process of the object detection machine learning modules 1520. As such, in one embodiment, the operation server 1500 may include more processing power than the control subsystem 1400.

If the operation server 1500 confirms that the detection of the unexpected situation 104 (by the control subsystem 1400) was correct, it may inform the one or more following AVs 1602 that the detection of the unexpected situation 104 was correct. The operation server 1500 may also update the map data 1510 reflecting the unexpected situation 104 and send the updated map data 1510 to the following AVs 1602. The operation server 1500 may also determine and update routing plans 1514 of the following AVs 1602 based on the detected unexpected situation 104 and location coordinates of the following AVs 1602. For example, the operation server 1500 may choose a particular routing plan 1514 to a following AV 1602 from a plurality of routing plans 1514 for reaching its destination using the map data 1510 and traffic data 1524 of the plurality of routing plans 1514 that leads to a reduced amount of driving time and safer driving experience.

Example Situation of Encountering an Unknown Object

Figure 2:
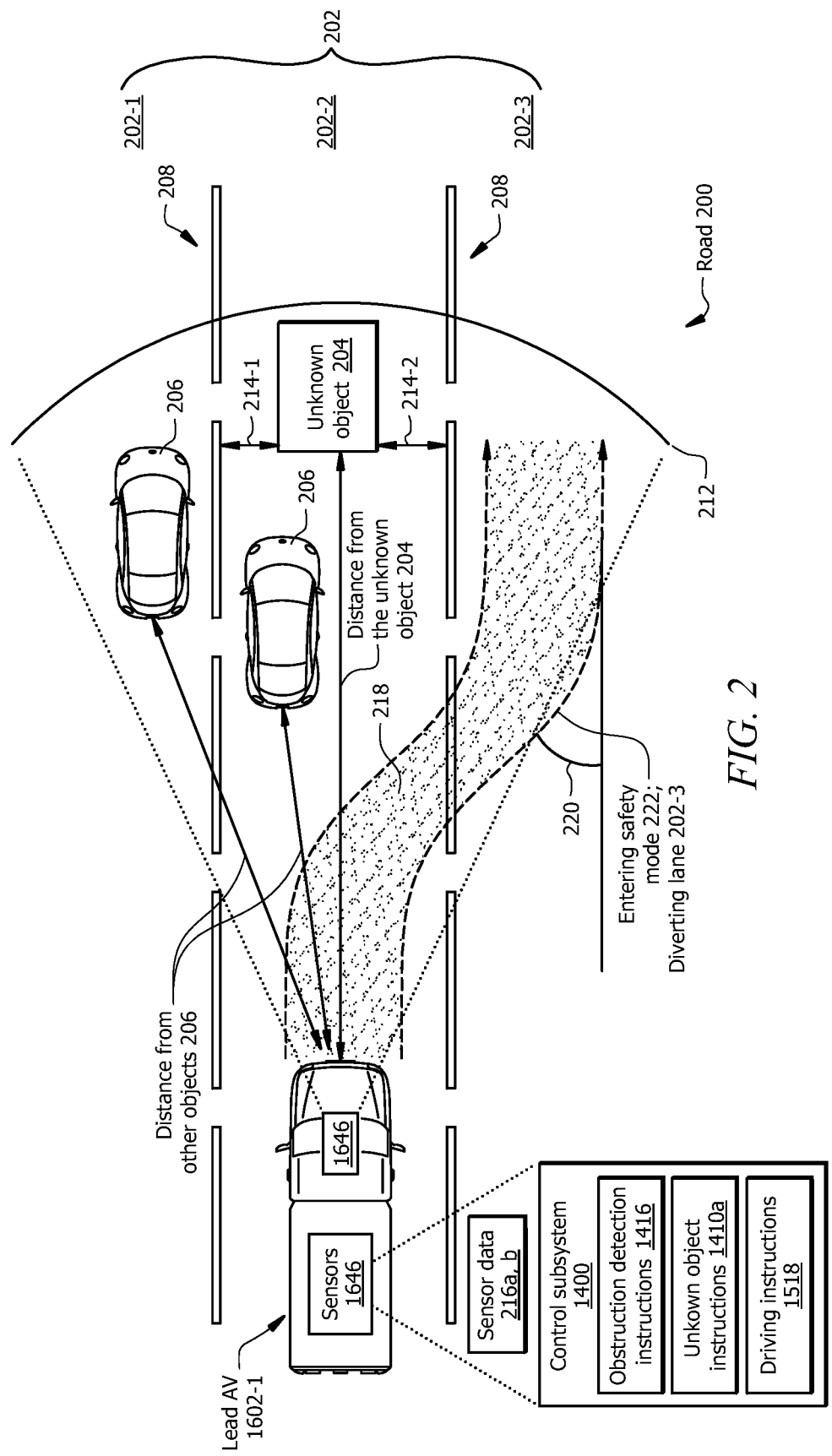
FIG. 2 illustrates a schematic diagram of a road on which a lead AV is encountering an unknown object.

FIG. 2 illustrates a simplified schematic of a road 200 (a road on the route 100) traveled by the lead AV 1602-1, where the lead AV 1602-1 is encountering an unknown object 204. When the lead AV 1602-1 comes in a threshold vicinity of the unknown object 204, sensors 1646 of the lead AV 1602-1 capture the presence of the unknown object 204. In other words, the sensors 1646 of the lead AV 1602-1 capture the presence of the unknown object 204 when the unknown object 204 is within the first field of view 212 (i.e., within a first detection zone of sensors 1646 in front of the lead AV 1602-1). The sensors 1646 of the lead AV 1602-1 may include any sensors capable of detecting objects, motion, and/or sound associated with the presence of an object within the first field of view 212, and generating sensor data 216a. The sensor data 216a may include a feed of images/videos of objects within the first field of view 212. Similarly, the sensor data 216a may include feeds of other types of data, such as LiDAR data, motion sensor data, sound data, and infrared data associated with the objects within the first field of view 212.

In the example situation illustrated in FIG. 2, the sensor data 216a provides information about the unknown object 204, surrounding vehicles 206, and lane markings 208. The sensors 1646 of the lead AV 1602-1 communicate the sensor data 216a to the control subsystem 1400 of the lead AV 1602-1. As discussed above, the control subsystem 1400 of the lead AV 1602-1 is configured to navigate the lead AV 1602-1 according to the driving rules/instructions 1518 of the lead AV 1602-1 while keeping a safe distance (e.g., 200 feet) from objects ahead of the lead AV 1602-1, such as other vehicles, pedestrians, etc. To this end, the control subsystem 1400 compares the sensor data 216a corresponding to the objects within the first field of view 212 with a first portion of the map data 1510 covering the first field of view 212. For example, the control subsystem 1400 detects the lane markings 208 and navigates the lead AV 1602-1 to drive according to driving rules/instructions 1518 related to/inferred from the lane markings 208, such as to drive in a particular lane 202 within two adjacent lane markings 208. Similarly, the control subsystem 1400 may detect road signs and lane boundaries on the road 200 and navigate the lead AV 1602-1 to drive according to driving rules/instructions 1518 related to/inferred from those road signs and lane boundaries, such as to drive within the speed range detected by a speed sign.

In one embodiment, the control subsystem 1400 may use obstruction detection instructions 1416 for detecting objects within the first field of view 212. The control subsystem 1400 may use the obstruction detection instructions 1416 to determine if an object is detected in the sensor data 216a (e.g., in image/video feeds, LiDAR data feeds, motion sensor data feeds, infrared data feeds, etc.) received from the sensors 1646 of the lead AV 1602-1. For example, the obstruction detection instructions 1416 may include code for implementing object detection methods from the feed of images corresponding to frames of videos (e.g., detecting objects within the first field of view 212 from videos). Similarly, the obstruction detection instructions 1416 may include code for detecting objects from LiDAR data, motion sensor data (e.g., detecting motions of the objects within the first field of view 212), sounds (e.g., detecting sounds near the lead AV 1602-1), and infrared data (e.g., detecting objects within the first field of view 212 in infrared images). The obstruction detection instructions 1416 may include code for detecting objects using other data types as well.

In one embodiment, the obstruction detection instructions 1416 may include object classification techniques to determine to which class each detected object belongs. For example, the object classification techniques may be trained to classify objects based on their features, such as their geometries, sizes, speeds, among features other. As such, the object classification techniques may classify objects with common features in one class. In one embodiment, the object classification techniques may be trained by a training dataset of data types representing objects, such as in images, videos, LiDAR data, radar, motion data, etc. In one embodiment, the object classification techniques may classify objects that are expected or known to be encountered by an AV 1602. For example, classes of objects expected to be encountered by an AV 1602 may include a class of vehicles, a class of motorcycles, a class of bicycles, a class of pedestrians, a class of road signs, among others. As such, while the lead AV 1602-1 is traveling, control subsystem 1400 of the lead AV 1602-1 determines to which class each object detected within the first field of view 212 belongs by extracting features of each detected object and comparing those with features of objects in each class (pre-determined by the object classification techniques). The control subsystem 1400 determines that a detected object belongs to a particular class if features of that detected object correspond to features of objects in the particular class (i.e., match above a threshold percentage, e.g. 90%). In one embodiment, the object classification techniques may use the sensor data 1412 received from one or more AVs 1602 to refine and increase the accuracy of the classification process, as well as to produce new classes of objects that belong to a class separate from already determined classes.

In one embodiment, the control subsystem 1400 (via the obstruction detection instructions 1416) determines classifications of the detected objects using any data processing module, such as image processing, LiDAR data processing, infrared data processing, etc. to extract features of the detected objects. In one embodiment, the control subsystem 1400 (via the obstruction detection instructions 1416) determines that an object is an unknown object 204, if the features of that object do not match any features associated with the classes of known objects. In other words, the control subsystem 1400 determines that an object is an unknown object 204, if the control subsystem 1400 and/or the operation server 1500 has not been exposed to enough quantities of that object to be classified (i.e., that object previously is not classified). The control subsystem 1400 may generate a class of similar objects when it encounters at least a threshold number of those objects (e.g., at least ten instances of encountering those objects).

In the particular example situation illustrated in FIG. 2, the control subsystem 1400 extracts the features of the sensor data 216a and determines characteristics of the detected objects within the first field of view 212, such as their identifications (e.g., a vehicle, a road sign, etc.), size, width across the road 200, speed, location coordinates, etc. The control subsystem 1400 then compares the extracted features of the sensor data 216a with (previously extracted) features of the expected objects in the map data 1510. In this particular example, the control system 1400 identifies that the objects 206 belong to a class of vehicles because their extracted features correspond to the features associated with the class of vehicles. However, the control subsystem 1400 determines that the extracted features of the object 204 do not correspond to any features of classes of objects. As such, the control subsystem 1400 determines that the object 204 is an unknown object 204. In other words, the control subsystem 1400 may determine that the object 204 is an unknown object 204 because it is not among the expected objects in the map data 1510 and/or is not behaving as expected from objects on the road 200 (i.e., the features of the sensor data 216a associated with the unknown object 204 do not match with any features of the expected objects in the map data 1510).

For example, the control subsystem 1400 may determine that the object 204 detected in the first field of view 212 is an unknown object 204, if it is an object that the control subsystem 1400 has not been exposed to enough quantities thereof, such as a garbage can (e.g., rolled into road 200), a couch (e.g., fell from a truck), a ladder, an animal (e.g., previously struck or otherwise wounded), an unconventionally shaped vehicle (e.g., a hot dog-shaped vehicle), a carriage, etc. The unknown object 204 may be a stationary or a moving object that the control subsystem 1400 has not been exposed to enough quantities thereof.

In the example situation illustrated in FIG. 2, the control subsystem 1400 (via the obstruction detection instructions 1416) identifies location coordinates of the surrounding vehicles 206 and unknown object 204 within the first field of view 212. The control subsystem 1400 also determines speeds of the objects within the first field of view 212, e.g., via interference module 1746 with reference to FIG. 17. See FIG. 17 for further details of operations of the interference module 1746. In brief, for determining the speeds of the objects within the first field of view 212, the interference module 1746 captures the positions of the objects with respect to the lead AV 1602-1 using the sensor data 216a. For example, the interference module 1746 determines the positions of the objects within the first field of view 212 in each frame of the videos received from the camera units of the lead AV 1602-1 and based on dislocation (i.e., the difference in locations) of those objects in consecutive frames, the interference module 1746 determines the speeds of those objects. In another example, the interference module 1746 may use radio waves from radar sensors of the lead AV 1602-1 to determine the speeds of objects within the first field of view 212. In this example, the radar sensors emit radio waves and collect reflected radio waves that bounce off the objects within the first field of view 212. The reflected radio waves or radar readouts have a frequency shift with respect to the emitted radio waves. The frequency shift between the emitted radio waves and reflected radio waves correspond to the speeds of the detected objects within the first field of view 212. Thus, the interference module 1746 calculates the speeds of the objects within the first field of view 212 based on the frequency shift between the emitted radio waves and reflected radio waves. Similarly, the interference module 1746 may determine the distances of the objects within the first field of view 212 from the lead AV 1602-1 using the location coordinates of those objects determined from each frame of videos received from the camera units, the time difference from a first time the radar units emit radio waves and a second time that the reflected radio waves are received, and the speed at which the radio waves travel, etc. Therefore, based at least in part upon the determined location coordinates and speeds of the objects within the first field of view 212, the control subsystem 1400 (via the interference module 1746), determines whether any of these objects is an unknown object 204, e.g., by determining that a speed of an object is below a configurable threshold speed, an object is stationary, etc.

Once the control subsystem 1400 detects the unknown object 204 within the first field of view 212, it determines particular lane(s) 202 on which the unknown object 204 is located. In the exemplary situation illustrated in FIG. 2, the unknown object 204 is located on and occupies a portion of the lane 202-2. In some situations, the unknown object 204 may occupy two or more lanes 202. In cases where the unknown object 204 is occupying two or more lanes 202, the control subsystem 1400 may determine that the severity level of the unexpected situation 104 is high and it is urgent to inform the following AVs 1602 to avoid those occupied lanes 202. In one embodiment, the control subsystem 1400 may determine the particular lane(s) 202 on which the unknown object 204 is located by determining distances 214 between the edges of the unknown object 204 and the lane markings 208 (i.e., distance 214-1 and 214-2). As such, the control subsystem 1400 may determine whether the unknown object 204 is located on the same or different lane 202 as the lead AV 1602-1. If the control subsystem 1400 determines that the unknown object 204 is located on (or occupies at least a portion of) the same lane 202 as the lead AV 1602-1, it may update the driving instruction 1518 of the lead AV 1602-1, such that the lead AV 1602-1 enters a safety mode 222. For example, the safety mode 222 may include one or more of reducing the speed of the lead AV 1602-1 according to the speeds of surrounding vehicles, increasing a safe distance threshold from the surrounding vehicles/objects, and avoiding autonomous driving parallel to the surrounding vehicles. If the control subsystem 1400 determines that the unknown object 204 is located on (or occupies at least a portion of) one or more different lanes 202 as the lead AV 1602-1, it may still update the driving instruction 1518 of the lead AV 1602-1, such that the lead AV 1602-1 enters a safety mode 222. For example, the safety mode 222 may include one or more of reducing the speed of the lead AV 1602-1 according to the speeds of surrounding vehicles, increasing a safe distance threshold from the surrounding vehicles/objects, and avoiding autonomous driving in the lane 202 in which the unknown object 204 resides.

Navigating Around the Unknown Object

If the control subsystem 1400 determines that the unknown object 204 is located on (or occupies at least a portion of) the same lane 202 as the lead AV 1602-1, the control subsystem 1400 updates driving instructions 1518 of the lead AV 1602-1, such that the lead AV 1602-1 diverts from the particular lane(s) 202 on which the unknown object 204 is detected. In the example situation illustrated in FIG. 2, the control subsystem 1400 updates the driving instructions 1518 of the lead AV 1602-1 to divert from the lane 202-2. As such, the control subsystem 1400 navigates the lead AV 1602-1 to change from the lane 202-2 to a safe lane 202, such as lane 202-3. In order to determine and divert to a safe lane 202, the control subsystem 1400 may collect sensor data 216b that corresponds to the environment and objects on lanes 202 adjacent to the lead AV 1602-1 (i.e., lanes 202-1 and 202-3.). For example, the sensor data 216b may include a feed of images/videos, LiDAR data, motion data, radar data, etc., associated with the environment on the lanes 202 adjacent to the lead AV 1602-1, similar to sensor data 216a discussed above with respect to objects within the first field of view 212. The control subsystem 1400 determines a safe lane 202 to change to based at least in part upon the location coordinates, estimated speeds, and trajectories of the objects (e.g., other vehicles 206) on the lanes 202 adjacent to lead AV 1602-1, determined in a similar way to the examples discussed above, e.g., via the interference module 1746. For example, the control subsystem 1400 may determine that it is safe to change to a particular lane 202 where there are no vehicles 206 in a pathway 218 for changing to that particular lane 202 and a probability of other vehicles 206 entering the pathway 218 to that particular lane 202 is low (e.g., below a threshold percentage, such as below 1%). The process of determining and changing to a safe lane 202 is described in FIG. 3.

Figure 3:
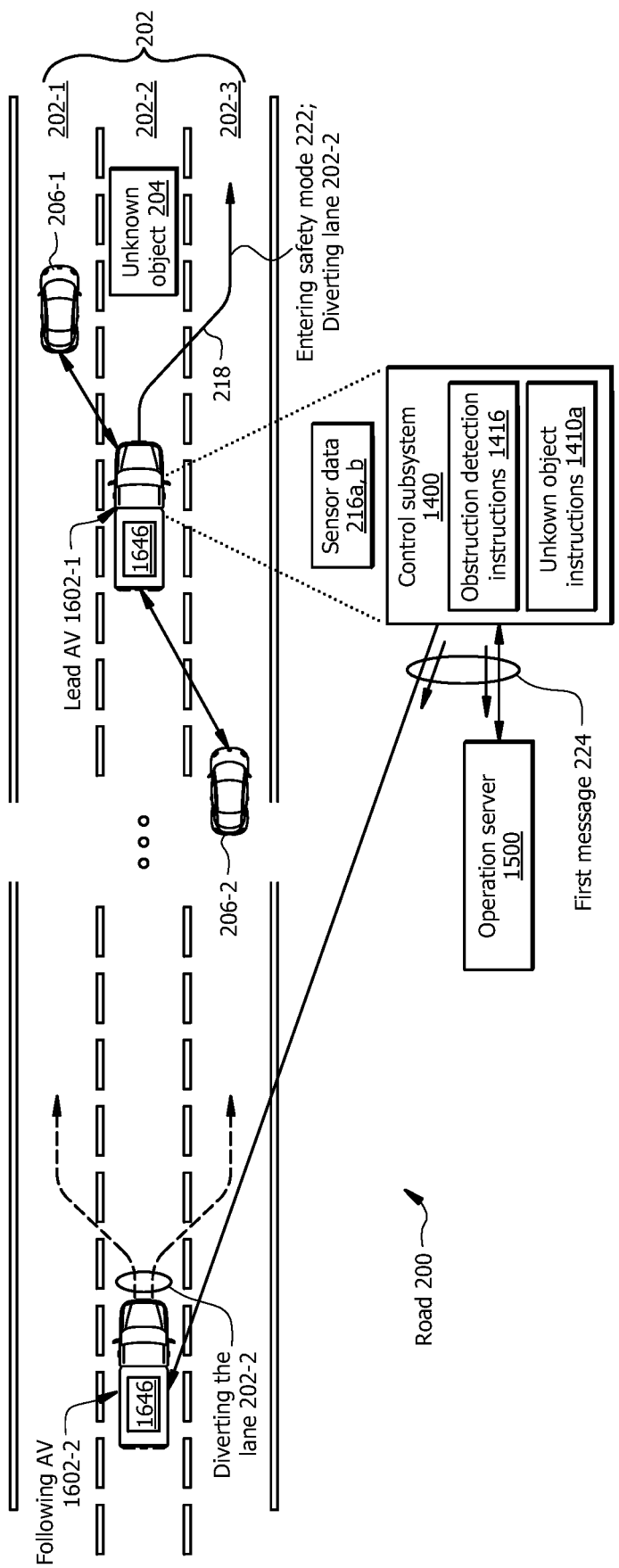
FIG. 3 illustrates a continuation of the schematic diagram in FIG. 2 with a following AV behind the lead AV.

FIG. 3 illustrates a continuation of the example situation illustrated in FIG. 2 where the lead AV 1602-1 and the following AV 1602-2 are traveling on the road 200 on which the unknown object 204 is detected by the control subsystem 1400 of the lead AV 1602-1. In the example situation illustrated in FIG. 3, the control subsystem 1400 detects the speeds and trajectories of the vehicle 206-1 and vehicle 206-2 similar to as described above in FIG. 1 with respect to the objects detected within the first field of view 212.

Based on the speeds and trajectories of the vehicles 206-1 and 206-2, the control subsystem 1400 determines the probabilities of the vehicle 206-1 entering a pathway 218 for changing to lane 202-1 and vehicle 206-2 entering a pathway 218 for changing to lane 202-3. The control subsystem 1400 searches for a pathway 218 to a lane 202 in which there is no object and a probability of other objects entering that pathway 218 is low. In one example, the pathway 218 may have a larger width as the lead AV 1602-1 to account for marginal distances from objects on the sides of lead AV 1602-1. The control subsystem 1400 determines the angle 220 of the pathway 218 such that it leads to stable wheel angles and is within boundaries of steering bends, e.g., carried out by the vehicle control subsystem 1648 with reference to FIG. 16. The angle 220 of the pathway 218 may also be determined based at least in part upon the speed of the lead AV 1602-1. For example, if the speed of the lead AV 1602-1 is high (e.g., 75 mph), the angle 220 of the pathway 218 may be determined to be lower (e.g., 20-25 degrees).

In the example situation illustrated in FIG. 3, the control subsystem 1400 determines that there is no potential pathway 218 to change to lane 202-1 because the vehicle 206-1 is occupying the potential pathway 218 for changing to lane 202-1. Therefore, the control subsystem 1400 determines that it is not safe to change to lane 202-1. However, the control subsystem 1400 determines that it is safe to change to lane 202-3 because there are no objects in the pathway 218 that is leading to lane 202-3 and the probability of vehicle 206-2 entering the pathway 218 is low based at least in part upon the current location coordinates, speed, and trajectory of the vehicle 206-2. In other words, the control subsystem 1400 determines that vehicle 206-2 will not enter the pathway 218 by the time the lead AV 1602-1 is successfully changed to lane 202-3. Thus, the control subsystem 1400 updates the driving instructions 1518 of the lead AV 1602-1 to change to the lane 202-3. For this particular example for changing to lane 202-3, the updated driving instructions 1518 of the lead AV 1602-1 may include turning on turn lights indicating changing to lane 202-3, reducing (or increasing) the speed of the lead AV 1602-1 to accommodate a safe changing lane process, gradually steering the lead AV 1602-1 according to the determined angle 220 of the pathway 218, etc. Once the lead AV 1602-1 is on lane 202-3, the control subsystem 1400 may gradually steer the lead AV 1602-1 back to a straight line. While the example situation in FIG. 3 illustrates the lead AV 1602-1 changing to its adjacent lane 202-3, it should be understood that the lead AV 1602-1 may change two or more lanes 202 if necessary, e.g., if the unknown object 204 is occupying two or more lanes 202.

Informing One or More Following AVs about the Unknown Object

In one embodiment, the control subsystem 1400 of the lead AV 1602-1 may inform one or more following AVs 1602 before diverting the lane 202-2 on which the unknown object 204 is detected. In another embodiment, the control subsystem 1400 of the lead AV 1602-1 may inform one or more following AVs 1602 while diverting the lane 202-2 on which the unknown object 204 is detected. In another embodiment, the control subsystem 1400 of the lead AV 1602-1 may inform one or more following AVs 1602 after diverting the lane 202-2. The control subsystem 1400 sends a first message 224 to the one or more following AVs 1602, indicating that the unknown object 204 is detected on the lane 202-2 of the road 200.

In one embodiment, the first message 224 may include unknown object instructions 1410a which indicate the location coordinates of the unknown object 204 and instructions to divert from and/or avoid the lane 202-2 (on which the unknown object 204 is located). As such, the control subsystem 1400 associated with the following AV 1602-2 diverts from the lane 202-2 to a safe lane 202 similar to as discussed above with respect to lead AV 1602-1 (or avoids lane 202-2 if it is already occupying a safe lane 202). In one embodiment, the control subsystem 1400 may also send the first message 224 to the operation server 1500.

Figure 4:
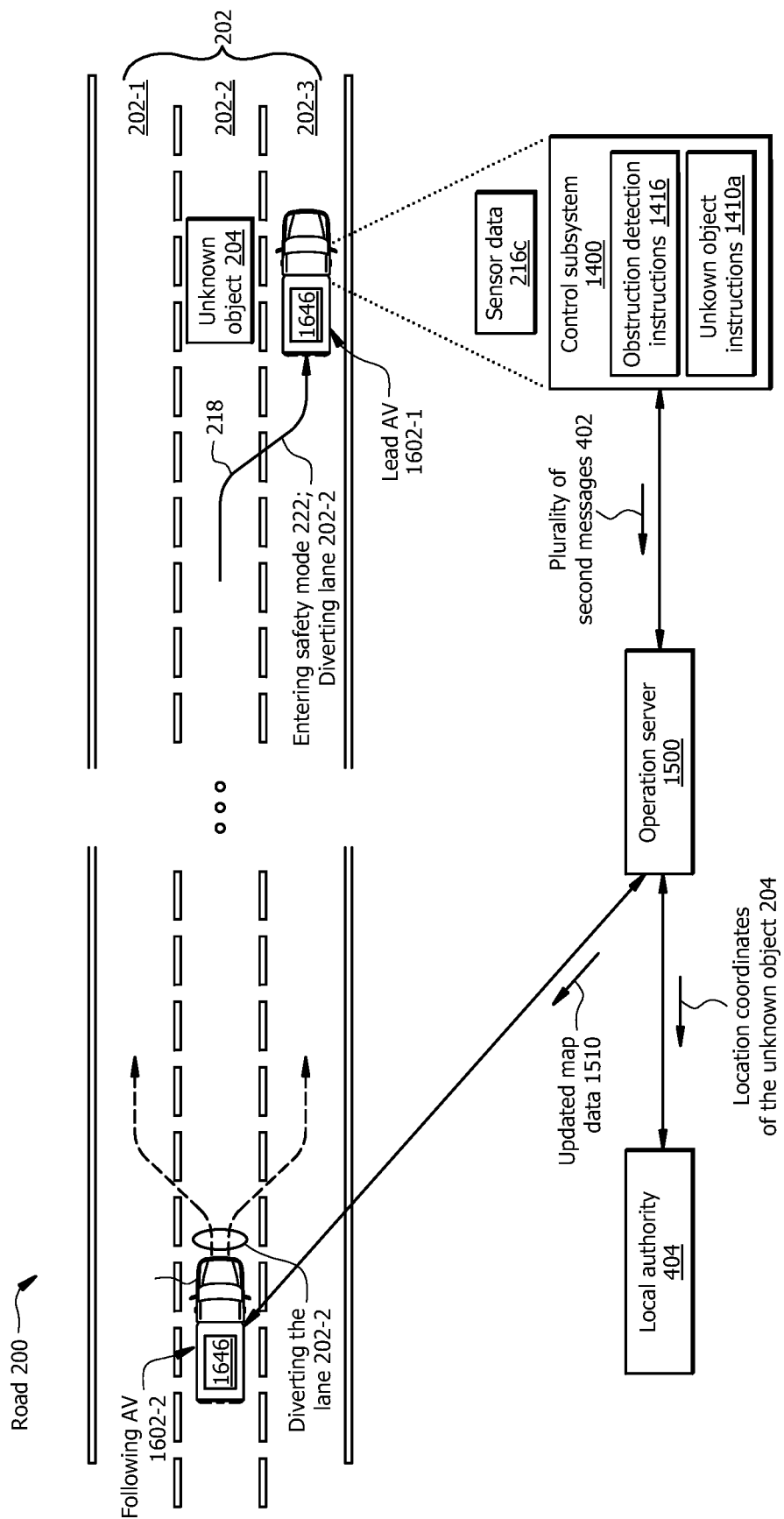
FIG. 4 illustrates a continuation of the schematic diagram in FIGS. 2 and 3.

FIG. 4 illustrates a continuation of the example situation illustrated in FIGS. 2 and 3. While navigating around the unknown object 204, the sensors 1646 of the lead AV 1602-1 capture sensor data 216c corresponding to the unknown object 204 and send them to the control subsystem 1400. The sensor data 216c may provide more information about the unknown object 204. For example, the sensor data 216c may include a feed of images/videos of the unknown object 204 from a plurality of angles (as the lead AV 1602-1 is navigating around the unknown object 204). Similarly, the sensor data 216c may include feeds of other data types, such as LiDAR data, motion sensor data, sound data, and infrared data associated with the unknown object 204 captured from a plurality of directions (as the lead AV 1602-1 is navigating around the unknown object 204). Therefore, more information about the unknown object 204 may be determined, such as its size, length along the road 200, etc.

The control subsystem 1400 sends a plurality of second messages 402 which includes the sensor data 216c to the operation server 1500. The operation server 1500 analyses the plurality of second messages 402 to confirm whether the detection of the unknown object 204 was correct (i.e., whether there is indeed an unknown object 204 at the particular location coordinates). In response to the operation server 1500 confirming that the detection of the unknown object 204 was correct, it updates the map data 1510, indicating that the unknown object 204 is located at the particular (or updated) location coordinates on the lane 202-2. For example, the operation server 1500 confirms the first message 224 which was sent by the lead AV 1602-1 to the one or more following AVs 1602 by sending the updated map data 1510 to the one or more following AVs 1602.

The operation server 1500 may also send a message to a local authority 404 that includes the location coordinate of the unknown object 204 so that the local authority 404 may address the unknown object 204. In a case where the unknown object 204 is an object that needs to be removed (e.g., a couch), the local authority 404 may arrange to remove it.

In one embodiment, if a control subsystem 1400 associated with any of the one or more following AVs 1602 determines that the unknown object 204 is no longer present at the determined location coordinates, that control subsystem 1400 sends a message to other AVs 1602 that the unknown object 204 is no longer present at the determined location coordinates. That control subsystem 1400 may also send a message to the operation server 1500 that the unknown object 204 is no longer present at the determined location coordinates.

For example, assume that the following AV 1602-2 has diverted from the lane 202-2 (based on the first message 224 and/or the plurality of second messages 402) and is arriving to the determined location coordinates of the unknown object 204. Also, assume that the unknown object 204 is no longer present at the determined location coordinates, e.g., addressed by the local authority 404 with respect to the examples discussed above. As such, while the AV 1602-2 is passing the determined location coordinates of the unknown object 204, the control subsystem 1400 of the AV 1602-2 determines that the unknown object 204 is no longer present, e.g., by analyzing sensor data received from the sensors 1646 of the AV 1602-2. In this case, the control subsystem 1400 of the AV 1602-2 sends a third message to other AVs 1602 that the unknown object 204 is no longer present at the determined location coordinates. The control subsystem 1400 of the AV 1602-2 may also send sensor data of the environment surrounding the determined location coordinates of the unknown object 204 to the operation server 1500. The operation server 1500 analyzes the sensor data and confirms whether the unknown object 204 is no longer present at the determined location coordinates. If the operation server 1500 confirms that the unknown object 204 is no longer present at the determined location coordinates, it updates the map data 1510, indicating that the unknown object 204 is no longer present at the determined location coordinates. The operation server 1500 then sends the updated map data 1510 to the other AVs 1602. Therefore, other following AVs 1602 may continue traveling on the road 200 without diverting from or otherwise avoiding the lane 202-2 which was previously occupied by the unknown object 204.

Figure 5:
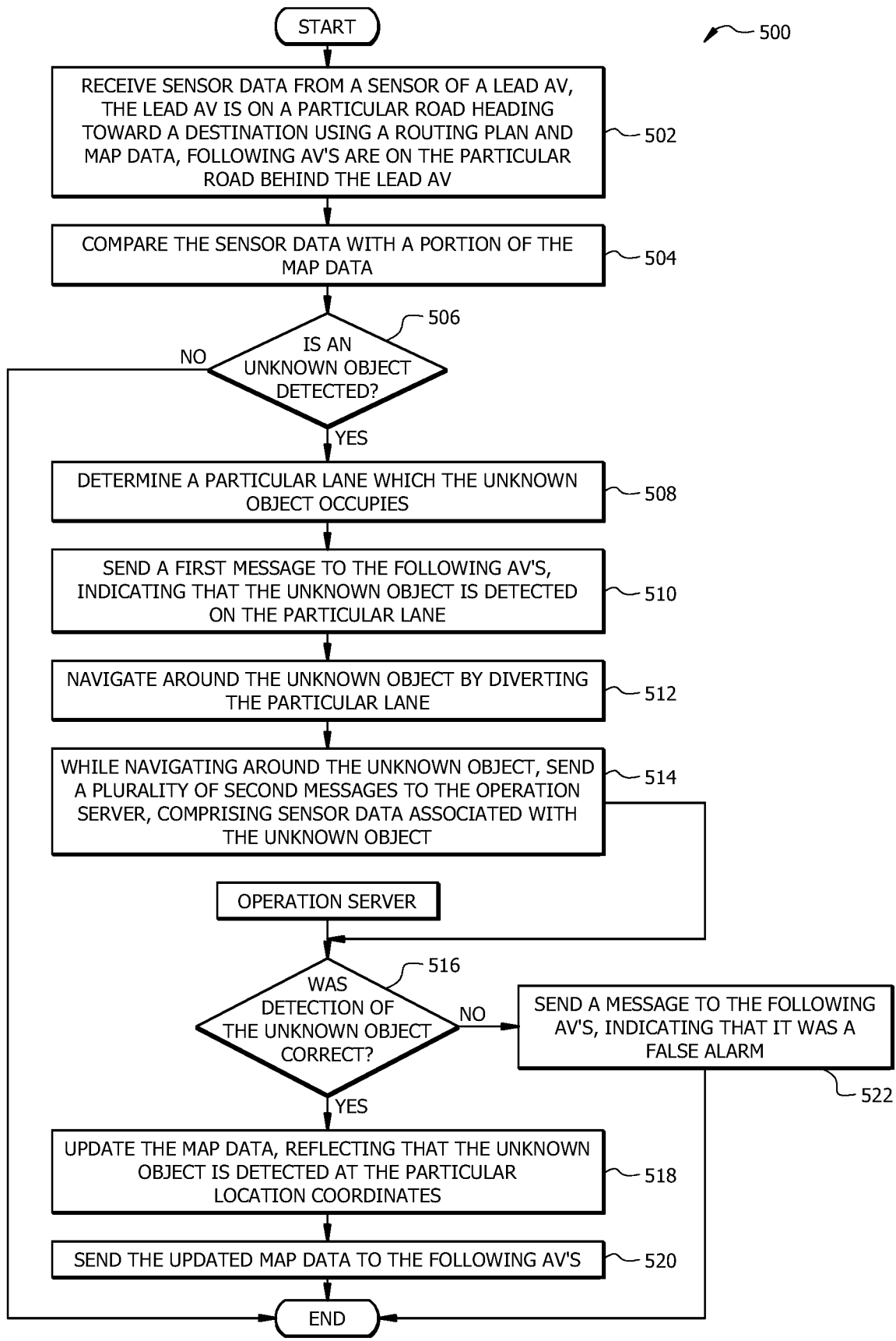
FIG. 5 illustrates a flowchart of an example method for detecting an unknown object and updating routing plans of a lead AV and one or more following AVs accordingly.

An Example Method for Detecting an Unknown Object and Updating Routing Plans of a Lead AV and One or More Following AVs Accordingly FIG. 5 illustrates a flow chart of a method 500 for detecting an unknown object 204 and updating routing plans 1514 of the lead AV 1602-1 and one or more following AVs 1602 accordingly. One or more of steps 502-522 of the method 500 may be implemented, at least in part, in the form of software instructions 1408, 1508, and 1680 stored on non-transitory, tangible, machine-readable media (e.g., memories 1404, 1504, 1690, and 1802) that when run by one or more processors (e.g., processors 1402, 1502, 1670, and 1804) may cause the one or more processors to perform steps 502-522. In some embodiments, method 500 may be performed by control subsystem 1400, operation server 1500, and in-vehicle control computer 1650, respectively from FIGS. 14, 15, and 16. Aspects of the steps 502-522 of the method 500 have been covered in the description for FIGS. 2-4; and additional aspects are provided below.

The method 500 begins at step 502 where the control subsystem 1400 of the lead AV 1602-1 receives sensor data 216a from one or more sensors 1646 of the lead AV 1602-1, where the lead AV 1602-1 is on the road 200 heading toward a destination using the routing plan 1514 and the map data 1510. The one or more following AVs 1602 are also on the road 200 behind the lead AV 1602-1. The map data 1510 includes geographical location coordinates of expected objects on a map which includes road 200, as described in FIG. 2. For example, the map data 1510 may include geographical location coordinates of road/traffic signs and buildings on the sides of the route 100. The map data 1510 may also include information about landmarks, lane markings 208, lane boundaries, and road boundaries, among other information. For example, the sensor data 216*a* may include a feed of images, videos, LiDAR data, motion sensor data, sound data, infrared data, and/or other data types associated with the objects within the first field of view 212, as described in FIG. 2.

In step 504, the control subsystem 1400 compares the sensor data 216*a* with a first portion of the map data 1510 covering the first field of view 212. For example, the control subsystem 1400 may use obstruction detection instructions 1416 for detecting objects within the first field of view 212, as described in FIG. 2.

In step 506, the control subsystem 1400 determines whether an unknown object 204 is detected in the first field of view 212. The control subsystem 1400 may determine that the object 204 detected in the first field of view 212 is unknown if that object is not among the expected objects in the map data 1510 and/or is not behaving as expected from objects on the road 200. For example, the unknown object 204 may be an object that the control subsystem 1400 and/or the operation server 1500 has not been exposed to enough quantities thereof to classify it (e.g., a couch, a ladder, etc.

If the control subsystem 1400 determines that there are no unknown objects 204 in the first field of view 212, the method 500 terminates and the lead AV 1602-1 proceeds to travel toward its destination. If, however, the control subsystem 1400 determines that an unknown object 204 detected in the first field of view 212, the method 500 processed to step 508.

In step 508, the control subsystem 1400 (using the sensor data 216*a*) determines particular lane(s) 202 which the unknown object 204 occupies.

For example, the control subsystem 1400 may determine the particular lane(s) 202 which unknown object 204 occupies by determining distances 214 between the edges of the unknown object 204 and the lane markings 208, as described in FIG. 2.

In step 510, the control subsystem 1400 sends the first message 224 to the one or more following AVs 1602, indicating that the unknown object 204 is detected on the particular lane(s) 202. For example, the first message 224 may include unknown object instructions 1410*a* which indicate the location coordinates of the unknown object 204 and instructions to divert from the particular lane(s) 202.

In some examples, the sensors 1646 of the lead AV 1602-1 may capture the presence of the unknown object 204 even if the unknown object 204 is not on the same lane 202 as the lead AV 1602-1, where the unknown object 204 is within the detection zones (i.e., other fields of view 212) of the sensors 1646 of the lead AV 1602-1 covering regions surrounding the lead AV 1602-1. For example, the sensors 1646 of the lead AV 1602-1 may detect the unknown object 204 that occupies one or more side lanes 202 of the lead AV 1602-1. In such cases, the control subsystem 1400 of the lead AV 1602-1 may send the first message 224 to the one or more following AVs 1602 to divert to those lane(s) 202 which the unknown object 204 is occupying. In one embodiment, the control subsystem 1400 may also send the first message 224 to the operation server 1500.

In step 512, the control subsystem 1400 updates the driving instructions 1518 of the lead AV 1602-1, such that the lead AV 1602-1 navigates around the unknown object 204 by diverting from and/or avoiding the particular lane(s) 202 which the unknown object 204 is occupying. For example, the control subsystem 1400 may determine that it is safe to change to a particular lane 202 where there are no vehicles 206 in the pathway 218 for changing to that particular lane 202 and the probability of other vehicles 206 invading the pathway 218 to that particular lane 202 is low. To find pathway 218 to a safe lane 202, the control subsystem 1400 may collect sensor data 216*b* that are associated with the environment and objects on the side lanes 202 of the lead AV 1602-1. One example of the process of determining and changing to a safe lane 202 is described in FIG. 3.

In step 514, while navigating around the unknown object 204, the control subsystem 1400 sends a plurality of second messages 402 to the operation server 1500. The plurality of second messages 402 includes sensor data 216*c* associated with the unknown object 204. For example, the sensor data 216*c* may include a feed of images/videos of the unknown object 204 from a plurality of angles (as the lead AV 1602-1 is navigating around the unknown object 204). Similarly, the sensor data 216*c* may include feeds of other types of data, such as LiDAR data, etc., as described in FIG. 4.

In step 516, based on the plurality of second messages 402, the operation server 1500 confirms whether the detection of the unknown object 204 was correct. In other words, the operation server 1500 confirms whether the unknown object 204 is located at the particular location coordinates and occupies the particular lane(s) 202 determined by the control subsystem 1400. For example, the operation server 1500 may use any combination of object detection machine learning modules 1520 for detecting objects from images, videos, infrared images, point clouds, radar, etc., as described in FIG. 4. If the operation server 1500 determines that the detection of the unknown object 204 was correct, the method 500 proceeds to step 518.

If, however, the operation server 1500 determines that the detection of the unknown object 204 was not correct (i.e., there are no unknown objects 204 at the particular location coordinates determined by the control subsystem 1400), the method 500 proceeds to step 522.

In step 518, the operation server 1500 updates the map data 1510, such that the updated map data 1510 reflects the unknown object 204 located at the particular location coordinates occupying the particular lane(s) 202.

In step 520, the operation server 1500 sends the updated map data 1510 to the one or more following AVs 1602.

In step 522, the operation server 1500 sends a message to the one or more following AVs 1602, indicating that it was a false alarm (i.e., there are no unknown objects 204 located at the particular location coordinates occupying the particular lane(s) 202).

Example Situation of Encountering a Road Closure

Figure 6:
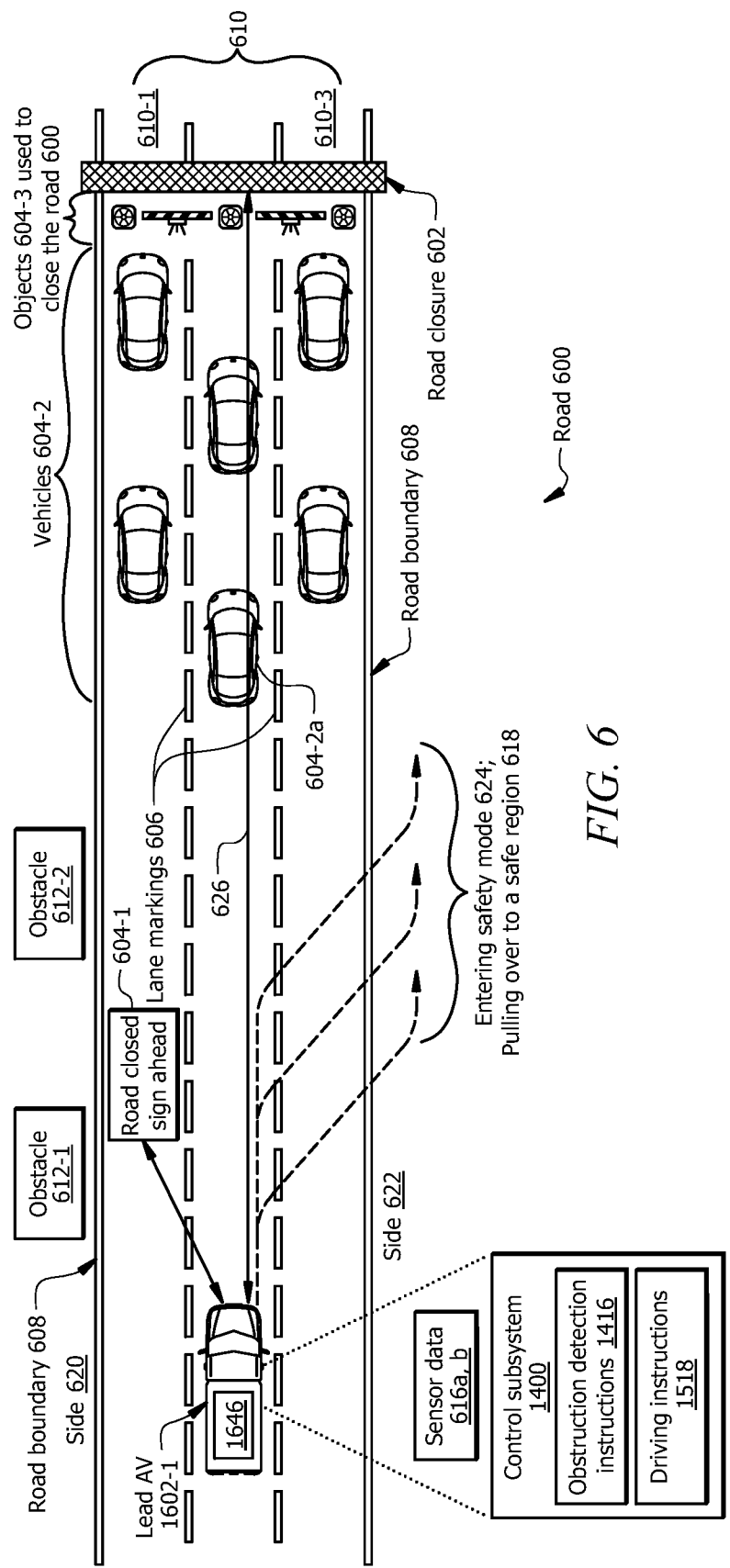
FIG. 6 illustrates a schematic diagram of a road on which a lead AV is encountering a road closure.

FIG. 6 illustrates a simplified schematic diagram of a road 600 (a road on the route 100) traveled by the lead AV 1602-1 and the one or more following AVs 1602, where the lead AV 1602-1 is encountering a road closure 602. Similar to as described above with respect to FIGS. 1-4, the sensors 1646 of the lead AV 1602-1 are configured to observe objects within their detection zones, such as the first detection zone or first field of view 212 in front of the lead AV 1602-1 (See FIG. 2).

In the example situation illustrated in FIG. 6, the sensors 1646 of the lead AV 1602-1 capture lane markings 606 and road boundaries 608, and generate sensor data 616 corresponding to the lane markings 606 and road boundaries 608. The sensors 1646 of the lead AV 1602-1 communicate sensor data 616 associated with the lane markings 606 and road boundaries 608 to the control subsystem 1400. The control subsystem 1400 uses the sensor data 616 associated with the lane markings 606 and road boundaries 608 to navigate the lead AV 1602-1 according to driving instructions 1518 related to/inferred from the lane markings 606 and road boundaries 608, while keeping a safe distance from objects detected within the detection zone of the sensors 1646 of the lead AV 1602-1, similar to as described above in FIGS. 1-4.

When the lead AV 1602-1 comes in a threshold vicinity (e.g., distance 626) of the road closure 602, the sensors 1646 of the lead AV 1602-1 capture the presence of one or more objects 604 which are associated with the road closure 602. In other words, the sensors 1646 of the lead AV 1602-1 capture the presence of one or more objects 604 associated with the road closure 602 when the one or more objects 604 are within at least one detection zone of the sensors 1646 of the lead AV 1602-1, similar to as described in FIG. 2 with respect to objects 204, 206 within the first field of view 212. For example, objects 604 associated with the road closure 602 may include a road closed ahead sign 604-1, a stopped vehicle 604-2, an object 604-3 used to close the road 600, such as a traffic cone, a traffic barrier, a traffic barrel, a traffic barricade tape, a delineator, and/or the like. The sensors 1646 of the lead AV 1602-1 generate sensor data 616a which provides information about the objects 604 (detected within the detection zone of the sensors 1646 of the lead AV 1602-1). The sensor data 616a may include a feed of images, videos, LiDAR data, motion sensor data, sound data, infrared data, and/or other data types associated with the environment behind the road closure 602 including the objects 604 and traffic behind the road closure 602. The sensors 1646 of the lead AV 1602-1 communicate the sensor data 616a to the control subsystem 1400 of the lead AV 1602-1.

In one embodiment, the control subsystem 1400 may use the obstruction detection instructions 1416 to identify each object 604 from the sensor data 616a, similar to as described above with respect to FIGS. 1-4. The control subsystem 1400 then compares the sensor data 616a corresponding to objects 604 with a second portion of the map data 1510 covering the detection zone of the sensors 1646 of the lead AV 1602-1. For example, the second portion of the map data 1510 may include expected objects ahead of the lead AV 1602-1 within and around the road 600, such as lane markings, road boundaries, road signs, buildings, terrain, etc.

Based on comparing the sensor data 616a with the second portion of the map data 1510, the control subsystem 1400 determines whether the road 600 is closed ahead by identifying one or more objects 604 associated with a road closure 602 and that are not among the expected objects in the second portion of the map data 1510. In other words, the control subsystem 1400 determines the road 600 is closed if it detects the presence of one or more objects 604, such as a road closed ahead sign 604-1, one or more stopped vehicles 604-2, an object 604-3 used to close the road 600, e.g., a traffic cone, a traffic barrier, a traffic barrel, a traffic barricade tape, a delineator, and/or the like.

In the particular example situation illustrated in FIG. 6, the control subsystem 1400 identifies the road closed ahead sign 604-1, stopped vehicles 604-2, and objects 604-3 which are associated with the road closure 602 and that are not among the expected objects in the second portion of map data 1510. In the example of vehicles 604-2, the control subsystem 1400 determines the speed of each of those stopped vehicles 604-2 using the interference module 1746, similar to as described above with respect to vehicles 206 in FIGS. 2-4. For example, the control subsystem 1400 may also determine that the vehicles 604-2 are stopped by detecting that their back red lights are turned on.

In one embodiment, once the control subsystem 1400 of the lead AV 1602-1 determines that the road 600 is closed (i.e., detects one or more objects 604 associated with the road closure 602), it may update the driving instructions 1518 of the lead AV 1602-1, such that the lead AV 1602-1 enters a safety mode 624. The safety mode 624 may be similar to the safety mode 222 described in FIGS. 2-3.

Stopping the Lead AV

In one embodiment, once the control subsystem 1400 of the lead AV 1602-1 determines that the road 600 is closed, it may update the driving instructions 1518 of the lead AV 1602-1, such that the lead AV 1602-1 stops at a safe location behind the road closure 602 (and the vehicles 604-2). For example, the lead AV 1602-1 may proceed toward the road closure 602 and stop at a safe location behind the vehicles 604-2 while keeping a safe distance from them (e.g., 20 feet behind the stopped vehicle 604-2a). In cases where there are no vehicles 604-2, the lead AV 1602-1 may stop at a safe location behind the road closure 602 (e.g., 20 feet behind the road closure 602). In this way, if the road 600 is opened (i.e., the road closure 602 is removed, e.g., objects as a result of car crash are removed), the lead AV 1602-1 may resume its autonomous driving.

Pulling Over the Lead AV

In one embodiment, once the control subsystem 1400 of the lead AV 1602-1 determines that the road 600 is closed ahead of the lead AV 1602-1, it overrides the driving instructions 1518 of the lead AV 1602-1, such that the lead AV 1602-1 is pulled over. In this case, the control subsystem 1400 (in signal communication with the in-vehicle control computer 1650) pulls over the lead AV 1602-1 to a safe region 618 on a side of the road 600 beyond the road boundaries 608, where the safe region 618 covers enough space (or is large enough) to accommodate the lead AV 1602-1.

To this end, the control subsystem 1400 instructs the sensors 1646 of the lead AV 1602-1 to scan the sides of the road 600 beyond the road boundaries 608 to search for a safe region 618. The sensors 1646 of the lead AV 1602-1 generate sensor data 616b associated with the sides of the road 600 beyond the road boundaries 608 and send them to the control subsystem 1400. The sensor data 616b may include a feed of images, videos, LiDAR data, motion sensor data, sound data, infrared data, and/or other data types associated with the environment beyond the road boundaries 608.

The control subsystem 1400 analyzes the sensor data 616b and determines whether there is any safe region 618 on either side of the road 600 beyond the road boundaries 608. For example, the control subsystem 1400 determines that a region 618 is a safe region 618 if it is free of objects/obstacles 612 and a probability of other vehicles entering that region 618 is low (e.g., below a threshold percentage, such as below 1%). In one embodiment, the control subsystem 1400 may pull over the lead AV 1602-1 in the closest safe region 618 rather than a farther safe region 618, depending on the urgency of the pulling over process. For example, the control subsystem 1400 may determine that the pulling over process is urgent if the distance between the lead AV 1602-1 and the road closure 602 is below a first threshold distance, such that there is not enough room and/or time to safely pull over in a farther safe region. In another example, the control subsystem 1400 may determine that the pulling over process is urgent if the distance between the lead AV 1602-1 and the closest stopped vehicle 604-2a is below a second threshold distance, such that there is not enough room and/or time to safely stop or pull over in a farther safe region. In another example, the control subsystem 1400 may determine that the pulling over process is urgent if an opportunity to pull over the lead AV 1602-1 is low because there are several vehicles on the lanes 610 adjacent to the lead AV 1602-1 (i.e., lanes 610-1 and 610-3). As such, the control subsystem 1400 may pull over the lead AV 1602-1 in the closest safe region 618 rather than a farther safe region 618, if it determines that the pulling over is urgent.

Once the control subsystem 1400 identifies a safe region 618 on a side of the road 600, the control subsystem 1400 (in signal communication with the in-vehicle control computer 1650) navigates the lead AV 1602-1 to change to a lane 610 adjacent to that side of the road 600. In the exemplary situation illustrated in FIG. 6, the control subsystem 1400 determines that there are no potential safe regions 618 on the left side of the road 600 (i.e., side 620) because the obstacles 612-1 and 612-2 are occupying the left side of the road 600. However, the control subsystem 1400 determines one or more safe regions 618 on the right side of the road 600 (i.e., side 622) because there are no objects/obstacles 612 on the right side of the road 600 and a probability of other vehicles entering those regions 618 is low. Therefore, the control subsystem 1400 (in signal communication with the in-vehicle control computer 1650) navigates the lead AV 1602-1 to change to lane 610-3 when the traffic on the lane 610-3 allows, similar to as described above in FIGS. 2 and 3 with respect to the lead AV 1602-1 changing to lane 202-3.

Once the lead AV 1602-1 is safely changed to lane 610-3, the control subsystem 1400 (in signal communication with the in-vehicle control computer 1650) pulls over the lead AV 1602-1 into the determined safe region 618. While the example situation in FIG. 6 illustrates the lead AV 1602-1 changing to its adjacent lane 610-3, it should be understood that the lead AV 1602-1 may change two or more lanes 610 if necessary, e.g., if the lead AV 1602-1 is on the lane 610-1 and having to pull over to a safe region 618 on the right side of the road 600 (i.e., side 622).

Now that the lead AV 1602-1 is pulled over, in one embodiment, the control subsystem 1400 of the lead AV 1602-1 may send a message to a driver nearby that the lead AV 1602-1 is pulled over at a first location coordinate 710, and manual driving may be needed to drive the lead AV 1602-1 past the road closure 602, e.g., by driving over another road. Upon the driver driving the lead AV 1602-1 past the road closure 602, the lead AV 1602-1 may resume autonomous driving towards its destination.

Informing the Operation Server about the Road Closure

Figure 7:
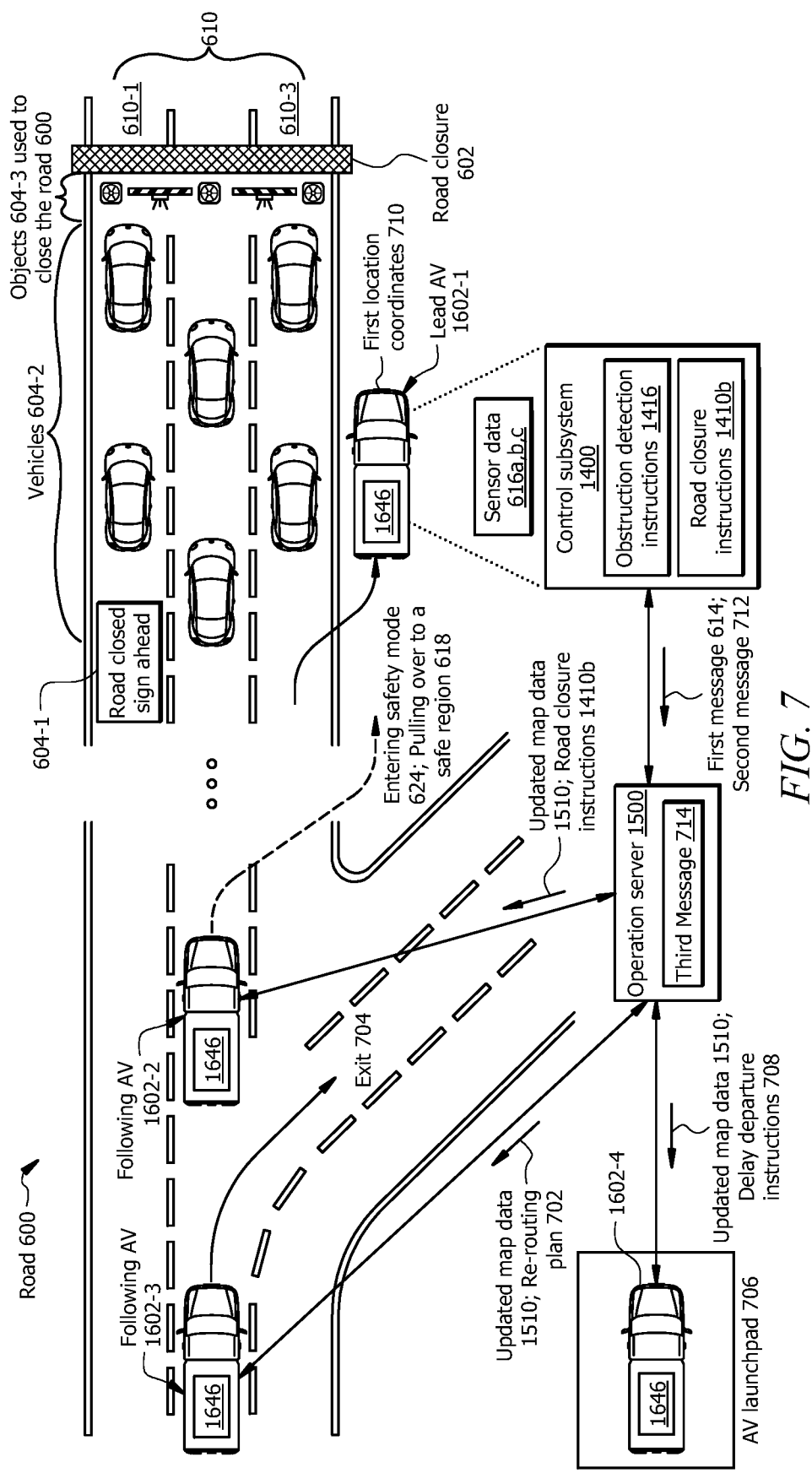
FIG. 7 illustrates a continuation of the schematic diagram in FIG. 6 with one or more following AVs.

FIG. 7 illustrates a continuation of the example situation illustrated in FIG. 6 where the lead AV 1602-1 and the following AV 1602-2 are traveling on the road 600 on which the road closure 602 is detected by the control subsystem 1400 of the lead AV 1602-1. In one embodiment, the control subsystem 1400 of the lead AV 1602-1 may inform the operation server 1500 about the road closure 602 before pulling over the lead AV 1602-1. In another embodiment, the control subsystem 1400 of the lead AV 1602-1 may inform the operation server 1500 about the road closure 602 while pulling over the lead AV 1602-1. In another embodiment, the control subsystem 1400 of the lead AV 1602-1 may inform the operation server 1500 about the road closure 602 after pulling over the lead AV 1602-1.

To inform the operation server 1500 about the road closure 602, the control subsystem 1400 of the lead AV 1602-1 sends a first message 614 to the operation server 1500, indicating that the road 600 is closed at particular location coordinates (i.e., the road closure 602 is detected at the particular location coordinates.). For example, the first message 614 may include sensor data 616*a* associated with the road closure 602. The operation server 1500 analyzes the sensor data 616*a* (e.g., using the object detection machine learning modules 1520 described above in FIGS. 2-4 with respect to analyzing sensor data 216*a, c*) and confirms that the road 600 is temporarily closed at the particular (or updated) location coordinates on the road closure 602. In one embodiment, based on the first message 614, the operation server 1500 updates the map data 1510, indicating that the road 600 is temporarily closed at the particular (or updated) location coordinates of the road closure 602.

Informing the One or More Following AVs about the Road Closure

Depending on the location coordinates of each following AV 1602, the operation server 1500 may send different instructions/data to that following AV 1602. For example, based on the location coordinates of a following AV 1602, the operation server 1500 determines whether re-routing is possible for that following AV 1602 to avoid the road closure 602. In another example, based on the location coordinates of a following AV 1602, the operation server 1500 may determine that the following AV 1602 has not left an AV launchpad 706. As such, in different cases based on the location coordinates of a following AV 1602, the operation server 1500 may send different instructions/data to each following AV 1602. Some example cases for sending different instructions/data to each following AV 1602 are illustrated in FIG. 7.

In some embodiment, the operation server 1500 may episodically or continuously track the location coordinates of the AVs 1602. In a first case, the AV 1602-2 has passed all the exits on the road 600, such as exit 704, before heading towards the road closure 602. In such cases, the operation server 1500 sends the updated map data 1510 and the road closure instructions 1410*b* to the AV 1602-2. The road closure instructions 1410*b* may include the location coordinates of the road closure 602, instructions to enter safety mode 624 before reaching the road closure 602, and instructions to pull over to a safe region 618 before reaching the road closure 602. As such, in one embodiment, when the AV 1602-2 receives the road closure instructions 1410*b*, the control subsystem 1400 of the AV 1602-2 may pull over the AV 1602-2 to a safe region 618 before reaching the road closure 602 where the pulling over process is not as urgent compared to the lead AV 1602-1 described in FIG. 6. In other words, the control subsystem 1400 of the AV 1602-2 has more freedom to find a more convenient and safer region 618 to pull over the AV 1602-2. In one embodiment, the process of pulling over the AV 1602-2 may be similar to as described above with respect to the lead AV 1602-1 in FIG. 6.

In another embodiment, when the AV 1602-2 receives the road closure instructions 1410*b*, the control subsystem 1400 of the AV 1602-2 may update the driving instructions 1518 of the AV 1602-2, such that it stops at a safe location behind the road closure 602 (and the vehicles 604-2), similar to as described above with respect to the lead AV 1602-1 in FIG. 6.

In a second case, the AV 1602-3 has at least one exit 704 available to take before heading towards the road closure 602. In such cases, the operation server 1500 may send the updated map data 1510 and a re-routing plan 702 to the AV 1602-3. In this particular example, the re-routing plan 702 includes instructions to take the exit 704 and use a particular route (or routing plan 1514) to reach the destination of the AV 1602-3. For example, the operation server 1500 may fetch the traffic data 1524 of a plurality of routing plans 1514 heading towards the destination of the AV 1602-3 to choose a particular routing plan 1514, such as one that leads to a reduced amount of driving time and safer driving experience compared to other routing plans 1514. The operation server 1500 may also use information obtained from external sources (e.g., live traffic reporting, live road closure data, etc.) in choosing the particular routing plan 1514 for the AV 1602-3.

In a third case, the AV 1602-4 has not left an AV launchpad/landing pad 706. The AV launchpad/landing pad 706 facilitates safe, efficient, and reliable starting or "launching" of an AV 1602 to begin moving along a route and/or "landing" an AV 1602 when the AV 1602 reaches its destination. For example, the AV launchpad 706 may include one or more bays to maintain the AVs 1602, load/re-load trailers of the AVs 1602, among other facilities. In such cases, the operation server 1500 may send the updated map data 1510 and the delay departure instructions 708 to the AV 1602-4, where the delay departure instructions 708 includes delaying the departure of the AV 1602-4 until the road 600 is opened (or some period of time prior to the opening of the road 600).

In some embodiments, the operation server 1500 may send any navigation instructions/data to any of the following AVs 1602 as necessary. For example, the operation server 1500 may send a re-routing plan 702 to the AV 1602-4, if based on traffic data 1524 of the alternative routes to the destination (in which the road closure 602 is not included), the driving time using at least one of those alternative routes is below a threshold driving time (e.g., five hours) while providing a safer driving experience.

In another example, the operation server 1500 may send any of the following AVs 1602 instructions to proceed towards the road closure 602 and stop at a safe location behind the road closure 602 (and the vehicles 604-2) while keeping a safe distance from them. For example, the operation server 1500 may send any of the following AVs 1602 instructions to stop behind the road closure 602, if it is determined that based on traffic data 1524 of the alternative routes to the destination, it is safer to wait for the road 600 to be opened and proceed with the initial routing plan 1514. In another example, the operation server 1500 may send any of the following AVs 1602 instructions to stop behind the road closure 602, if it is determined that the road closure 602 is temporary (e.g., as a result of a car crash). As such, when the road 600 is opened, the following AV 1602 that is stopped behind the road closure 602 may resume its autonomous driving.

In another example, the operation server 1500 may send pulling over instructions to the AV 1602-3, if pulling over the AV 1602-3 is safer than driving any of the alternative routes (in which the road closure 602 is not included). The operation server 1500 may also send pulling over instructions to the AV 1602-3, if based on traffic data 1524 of the alternative routes to the destination, the driving time using any of the alternative routes is more a threshold driving time (e.g., five hours).

In another example, the operation server 1500 may send a re-routing plan 702 to the AV 1602-3 that includes instructions to stop at an intermediate AV launchpad/landing pad 706, if it determines that stopping the AV 1602-3 at an intermediate AV launchpad/landing pad 706 is safer than driving any of those alternative routes, e.g., because there is not enough data about those alternative routes.

The operation server 1500 may also send a re-routing plan 702 to the AV 1602-3 that includes instructions to stop at an intermediate AV launchpad/landing pad 706, if based on traffic data 1524 of the alternative routes to the destination, the driving time using any of the alternative routes is more a threshold driving time (e.g., five hours). The operation server 1500 may determine the safety of each alternative route by executing simulations of autonomous driving in each alternative route (see descriptions of autonomous driving simulations in FIG. 15).

In one embodiment, if a control subsystem 1400 associated with any of the AVs 1602 determines that the road 600 is opened (i.e., the road closure 602 is no longer present at the particular location coordinates), that control subsystem 1400 sends a second message 712 to the operation server 1500 indicating that the road 600 is opened. The second message 712 may include sensor data associated with the environment surrounding the road closure 602 including objects 604, e.g., the traffic behind the road closure 602 (i.e., stopped vehicles 604-2). For example, a control subsystem 1400 of an AV 1602 may determine that the road closure 602 is removed by detecting that one or more objects 604 corresponding to the road closure 602 are no longer present at their previously detected location coordinates. In other words, a control subsystem 1400 of an AV 1602 may determine that the road 600 is opened, if the traffic flow behind the (previously detected) road closure 602 is returned to as expected on the road 600.

In a particular example with respect to the lead AV 1602-1, while the lead AV 1602-1 is being stopped and/or after it is stopped, the sensors 1646 of the lead AV 1602-1 monitor the environment behind the road closure 602 including the objects 604 and the traffic behind the road closure 602. The sensors 1646 of the lead AV 1602-1 may generate sensor data 616c associated with the environment behind the road closure 602 captured from different angles/directions while the lead AV 1602-1 is being stopped and/or after its stopped.

In another particular example with respect to the lead AV 1602-1, while the lead AV 1602-1 is stopped behind the road closure 602, the sensors 1646 of the lead AV 1602-1 monitor the environment behind the road closure 602 including the objects 604 and the traffic behind the road closure 602. The sensors 1646 of the lead AV 1602-1 may generate sensor data 616c associated with the environment behind the road closure 602 captured while the lead AV 1602-1 is proceeding towards the road closure 602 and while the lead AV 1602-1 is stopped behind the road closure 602.

In either of these particular examples, the sensor data 616c may include a feed of images, videos, LiDAR data, motion sensor data, sound data, infrared data, and/or other data types associated with the environment behind the road closure 602 including the objects 604 and traffic behind the road closure 602.

The control subsystem 1400 of the lead AV 1602-1 analyzes the sensor data 616c and determines that the road closure 602 is removed (i.e., the road 600 is to be opened), if it detects that there is no congested traffic (e.g., stopped vehicles 604-2) previously detected behind the road closure 602 and there are no objects 604-3 previously detected at particular location coordinates. In this case, the control subsystem 1400 of the lead AV 1602-1 may send the second message 712 to the operation server 1500, indicating that the road closure 602 is removed (i.e., the road 600 is opened). For example, the second message 712 may include sensor data 616c. The operation server 1500 analyzes the second message 712 and confirms whether the road closure 602 is removed (i.e., the road 600 is opened). If the operation server 1500 confirms that the road closure 602 is removed, it updates the map data 1510, reflecting that the road closure 602 is removed (i.e., the road 600 is opened), and sends the updated map data 1510 to the AVs 1602.

In other examples, a control subsystem 1400 of any of the followings AVs 1602 may detect that the road 600 is opened, for example, if a following AV 1602 is reaching the road closure 602 and the control subsystem 1400 of that following AV 1602 determines that the objects 604 are no longer present at the previously determined location coordinates. In such cases, the control subsystem 1400 of that following AV 1602 may send a third message 714 to the operation server 1500, indicating that the road closure 602 is removed (i.e., the road 600 is be opened). The third message 714 may include sensor data associated with the environment surrounding the road closure 602 including objects 604, e.g., the traffic behind the road closure 602 (i.e., stopped vehicles 604-2). The operation server 1500 analyzes the third message 714 and confirms whether the road closure 602 is removed (i.e., the road 600 is opened). If the operation server 1500 confirms that the road closure 602 is removed, it updates the map data 1510, reflecting that the road closure 602 is removed (i.e., the road 600 is opened), and sends the updated map data 1510 to the AVs 1602.

Similar to the example of the lead AV 1602-1 where it was pulled over off the road or to a shoulder of the road, if any of the following AVs 1602 are pulled over, the control subsystem 1400 of that AV 1602 may send a message to a driver nearby that the AV 1602 is pulled over at a particular location coordinate and manual driving may be needed to drive that AV 1602 past the road closure 602, e.g., by driving over another road.

Figure 8:
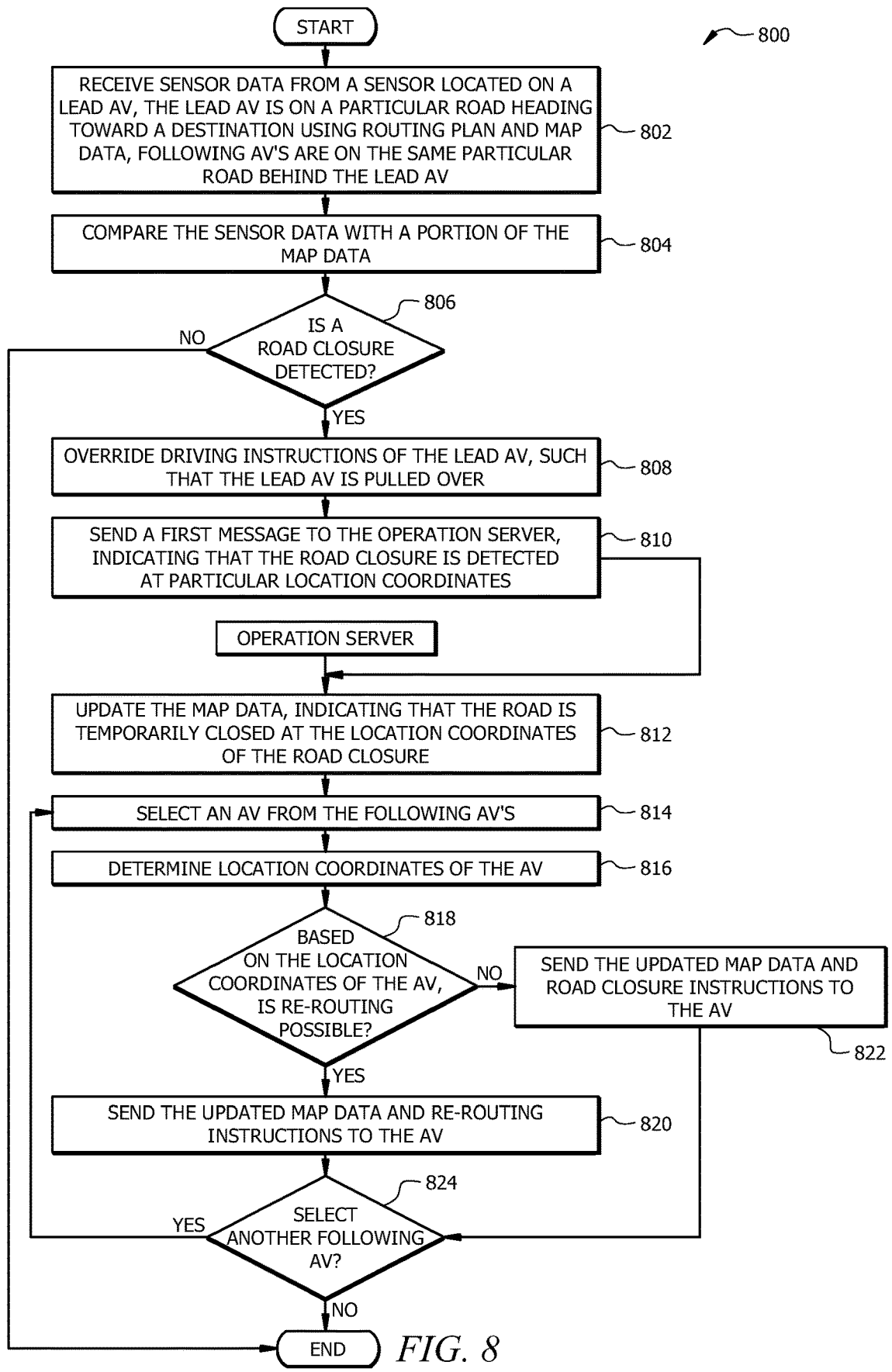
FIG. 8 illustrates a flowchart of an example method for detecting a road closure and updating routing plans of a lead AV and one or more following AVs accordingly.

An Example Method for Detecting a Road Closure and Updating Routing Plans of a Lead AV and One or More Following AVs Accordingly FIG. 8 illustrates a flow chart of a method 800 for detecting a road closure 602 and updating routing plans 1514 of the lead AV 1602-1 and one or more following AVs 1602 accordingly. One or more of steps 802-824 of the method 800 may be implemented, at least in part, in the form of software instructions 1408, 1508, and 1680 stored on non-transitory, tangible, machine-readable media (e.g., memories 1404, 1504, 1690, and 1802) that when run by one or more processors (e.g., processors 1402, 1502, 1670, and 1804) may cause the one or more processors to perform steps 802-824. In some embodiments, method 800 may be performed by control subsystem 1400, operation server 1500, and in-vehicle control computer 1650, respectively from FIGS. 14, 15, and 16. Aspects of the steps 802-824 of the method 800 have been covered in the description for FIGS. 6 and 7; and additional aspects are provided below.

The method 800 begins at step 802 where the control subsystem 1400 of the lead AV 1602-1 receives sensor data 616a from one or more sensors 1646 of the lead AV 1602-1, where the lead AV 1602-1 is on the road 600 heading toward a destination using the routing plan 1514 and the map data 1510. The one or more following AVs 1602 are also on the road 600 behind the lead AV 1602-1. For example, the sensor data 616a may include data related to objects 604 associated with the road closure 602, as described in FIG. 6. Aspects of the map data 1510 are described in FIGS. 1, 2, and 15.

In step 804, the control subsystem 1400 compares the sensor data 616a with the second portion of the map data 1510 covering the detection zone of the sensors 1646 of the lead AV 1602-1 in front of the lead AV 1602-1. For example, the control subsystem 1400 may use obstruction detection instructions 1416 for detecting objects within the detection zone of the sensors 1646 of the lead AV 1602-1, as described in FIG. 6. For example, the second portion of the map data 1510 may include expected objects ahead of the lead AV 1602-1 within and around the road 600, such as lane markings, road boundaries, road signs, buildings, terrain, etc.

In step 806, the control subsystem 1400 determines whether a road closure 602 is detected (i.e., whether the road 600 is closed ahead of the lead AV 1602-1). The control subsystem 1400 may determine that the road 600 is closed if it identifies one or more objects 604 associated with a road closure 602 and that are not among the expected objects in the second portion of map data 1510. Some examples of the objects 604 associated with the road closure 602 include but are not limited to the road closed ahead sign 604-1, one or more stopped vehicles 604-2, an object 604-3 used to close the road 600, e.g., a traffic cone, a traffic barrier, a traffic barrel, a traffic barricade tape, a delineator, and/or the like.

If the control subsystem 1400 determines that there are no objects 604 (associated with the road closure 602) in the detection zone of the sensors 1646 of the lead AV 1602-1, the method 800 terminates and the lead AV 1602-1 proceeds to travel toward its destination. If, however, the control subsystem 1400 determines the presence of one or more objects 604, the method 800 proceeds to step 808.

In step 808, the control subsystem 1400 of the lead AV 1602-1 overrides the driving instructions 1518 of the lead AV 1602-1, such that the lead AV 1602-1 is pulled over. In this process, the control subsystem 1400 (in signal communication with the in-vehicle control computer 1650) pulls over the lead AV 1602-1 to the safe region 618 on a side of the road 600 beyond the road boundaries 608, as described in FIG. 6.

In one embodiment, the control subsystem 1400 of the lead AV 1602-1 may update the driving instructions 1518 of the lead AV 1602-1, such that the lead AV 1602-1 stops on the road at a safe location behind the road closure 602 (and the vehicles 604-2), as described in FIG. 6.

In one embodiment, once the control subsystem 1400 detects the road closure 602, it may update the driving instructions 1518 of the lead AV 1602-1, such that the lead AV 1602-1 enters the safety mode 624, as described in FIG. 6.

In step 810, the control subsystem 1400 sends the first message 614 to the operation server 1500, indicating that the road closure 602 is detected at the particular location coordinates. For example, the first message 614 may include sensor data 616a. In another example, the first message 614 may also indicate the extent of the road closure 602, where the extent of the road closure 602 includes the traffic behind the road closure 602. For example, if the area occupied by the vehicles 604-2 (i.e., the traffic behind the road closure 602) is more than a threshold distance (e.g., 500 feet), the control subsystem 1400 may determine that the road closure 602 is extensive.

In step 812, based on the first message 614, the operation server 1500 updates the map data 1510, indicating that the road 600 is temporarily closed at the particular (or updated) location coordinates of the road closure 602. As discussed above, depending on the location coordinates of each following AV 1602, the operation server 1500 may send different instructions/data to that following AV 1602.

In step 814, the operation server 1500 selects an AV 1602 from the one or more following AVs 1602. The operation server 1500 iteratively selects an AV 1602 to determine particular instructions/data for that AV 1602 based on its location coordinates. The operation server 1500 selects an AV 1602 from the one or more following AVs 1602 until no more AVs 1602 are left.

In step, 816, the operation server 1500 determines the location coordinates of the selected AV 1602.

In step 818, based on the location coordinates of the selected AV 1602, the operation server 1500 determines whether re-routing is possible for that AV 1602. The operation server 1500 determines that re-routing is possible for the selected AV 1602 if there is at least one exit (e.g., exit 704) between that AV 1602 and the road closure 602, such as the examples of AV 1602-3 and AV 1602-4 described in FIG. 7.

In contrast, the operation server 1500 determines that re-routing is not possible for the selected AV 1602 if there are no exits 704 between that AV 1602 and the road closure 602, such as the example of AV 1602-2 described in FIG. 7. If the operation server 1500 determines that re-routing is possible for the selected AV 1602, the method 800 proceeds to step 820. If, however, the operation server 1500 determines that re-routing is not possible for the selected AV 1602, the method 800 proceeds to step 822.

In step 820, the operation server 1500 sends the updated map data 1510 and re-routing plan 702 to the selected AV 1602. The re-routing plan 702 may include instructions to take a particular exit 704 and use a particular routing plan 1514 to avoid the road closure 602, as described with respect to the example of AV 1602-3 in FIG. 7. In this process, the operation server 1500 may choose a particular routing plan 1514 from a plurality of routing plans 1514 based on their traffic data 1524. The operation server 1500 may choose a particular routing plan 1514 which leads to the selected AV 1602 arriving at its destination in a reduced amount of driving time and with a safer driving experience.

In one embodiment, the operation server 1500 may send the selected AV 1602 the updated map data 1510 and instructions to stop at a safe location behind the road closure 602 (and the vehicles 604-2), as described in FIG. 6.

In step 822, the operation server 1500 sends the updated map data 1510 and the road closure instructions 1410b to the selected AV 1602, as described with respect to the example of AV 1602-2 in FIG. 7. If the operation server 1500 determines that the selected AV 1602 has not left the AV launchpad 706, the operation server 1500 may send the updated map data 1510 and the delay departure instructions 708 to that AV 1602, as described with respect to the example of AV 1602-4 in FIG. 7.

In one embodiment, the operation server 1500 may send the selected AV 1602 the updated map data 1510 and instructions to stop a safe location behind the road closure 602 (and the vehicles 604-2), as described in FIG. 6.

In step 824, the operation server 1500 determines whether to select another AV 1602 from the one or more following AVs 1602. The operation server 1500 may select another AV 1602 if at least one AV 1602 from the one or more following AVs 1602 is left. If the operation server 1500 determines to select another following AV 1602, method 800 returns to step 814. Otherwise, method 800 is ended.

In some cases, the road 600 may be partially closed, such as, for example, if one or more lanes 610 are kept open for the vehicles to pass through. In such cases, the control subsystem 1400 of the lead AV 1602-1 detects the opened lane(s) 610 and navigates the lead AV 1602-1 to change to one of those lanes 610, similar to the lane changing process of the lead AV 1602-1 described in FIGS. 3 and 4. The control subsystem 1400 of the lead AV 1602-1 may then send the first message 614 to the operation server 1500, indicating that the road 600 is partially closed and particular lane(s) 610 are open. In such cases, the first message 614 may include sensor data 616a related to the partial road closure 602 and the particular lane(s) 610 that are kept open. The operation server 1500 analyzes the first message 614 and confirms the detection of the partial road closure 602 and the open particular (or updated) lane(s) 610.

The operation server 1500 updates the map data 1510 reflecting the partial road closure 602 at the particular (or updated) location coordinates. The operation server 1500 may then send a message to the following AVs 1602 that the road 600 is partially closed at particular (or updated) location coordinates and the particular (or updated) lane(s) 610 are open.

Similar to the examples discussed above, based on the location coordinates of each following AV 1602 and the extent of the traffic behind the partial road closure 602, the operation server 1500 may send different instructions/data to each following AV 1602 that leads to a reduced amount of driving time and a safer driving experience. For example, in the case of the AV 1602-2 in FIG. 7, the operation server 1500 determines that re-routing is not possible for AV 1602-2. If the operation server 1500 determines that the traffic behind the partial road closure 602 is not extensive and it is safe to change to one of the open lanes 610, it may send the updated map data 1510 and instructions to change to one of the open lanes 610 to the AV 1602-2. If the operation server 1500 determines that the traffic behind the partial road closure 602 is extensive, it may send the updated map data 1510 and the road closure instructions 1410b to the AV 1602-2.

Example Situation of Encountering a Construction Zone

Figure 9:
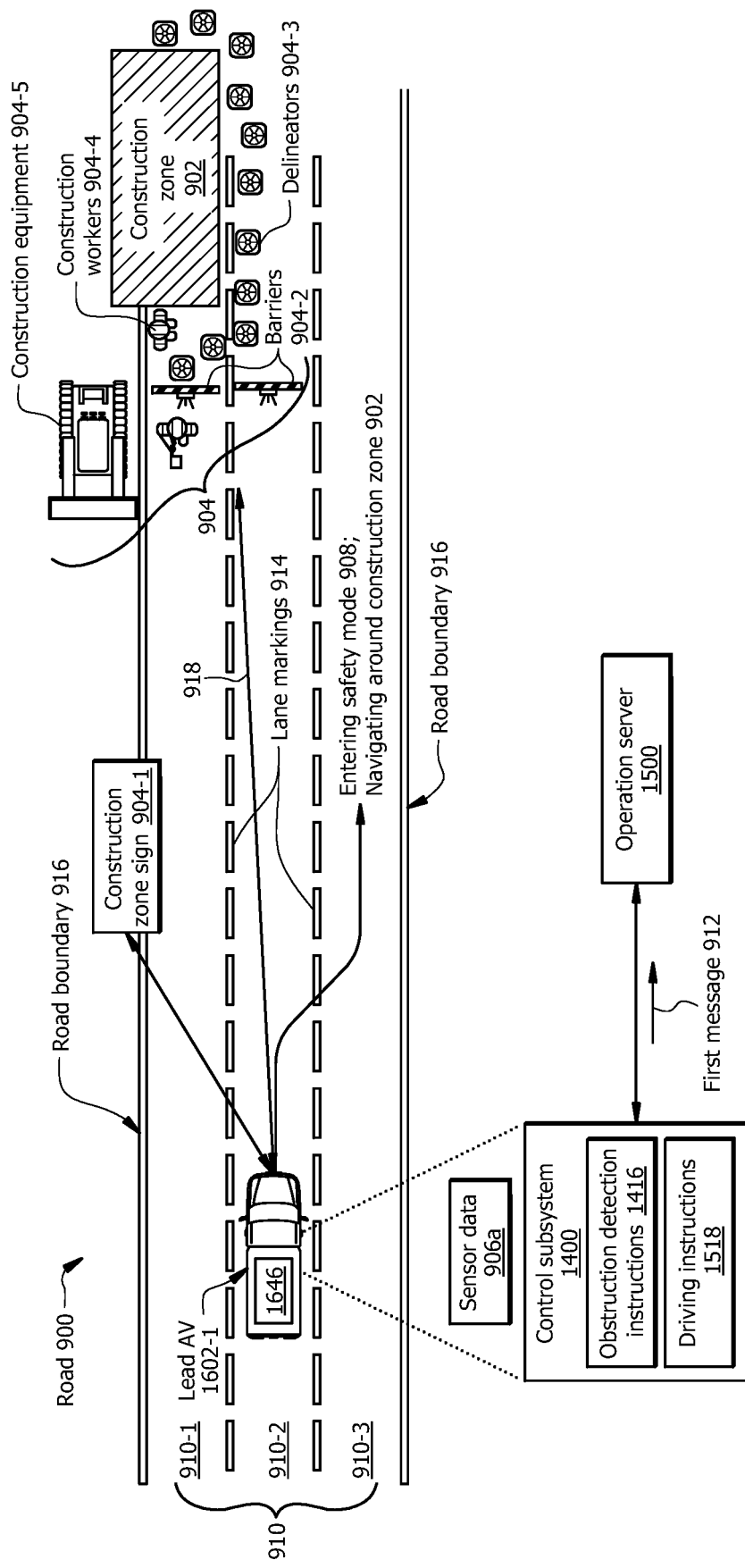
FIG. 9 illustrates a schematic diagram of a road on which a lead AV is encountering a construction zone.

FIG. 9 illustrates a simplified schematic diagram of a road 900 (a road on the route 100) traveled by the lead AV 1602-1 and the one or more following AVs 1602, where the lead AV 1602-1 is encountering a construction zone 902. Similar to as described above with respect to FIGS. 1-4, 6, and 7, the sensors 1646 of the lead AV 1602-1 are configured to observe objects within their detection zones, such as the first detection zone or first field of view 212 in front of the lead AV 1602-1 (See FIG. 2).

In the example situation illustrated in FIG. 9, the sensors 1646 of the lead AV 1602-1 capture lane markings 914 and road boundaries 916, and generate sensor data 616 corresponding to the lane markings 914 and road boundaries 916. The sensors 1646 of the lead AV 1602-1 communicate sensor data 906 associated with the lane markings 914 and road boundaries 916 to the control subsystem 1400. The control subsystem 1400 uses the sensor data 906 associated with the lane markings 914 and road boundaries 916 to navigate the lead AV 1602-1 according to driving instructions 1518 related to/inferred from the lane markings 914 and road boundaries 916, while keeping a safe distance from objects detected within the detection zone of the sensors 1646, similar to as described above in FIGS. 1-4.

When the lead AV 1602-1 comes in a threshold vicinity (e.g., distance 918) of the construction zone 902, the sensors 1646 of the lead AV 1602-1 capture the presence of one or more objects 904 which are associated with the construction zone 902. In other words, the sensors 1646 of the lead AV 1602-1 capture the presence of one or more objects 904 associated with the construction zone 902, when the one or more objects 904 are within at least one detection zone of the sensors 1646 of the lead AV 1602-1, similar to as described in FIG. 2 with respect to objects 204, 206 within the first field of view 212. For example, objects 904 associated with the construction zone 902 may include a construction zone sign 904-1, a traffic barrier 904-2, a traffic cone/delineator 904-3, a construction worker 904-4, a construction vehicle 904-5, an arrow-board trailer/sign, and/or the like. The sensors 1646 of the lead AV 1602-1 generate sensor data 906*a* which provides information about the objects 904 (detected within the detection zone of the sensors 1646). The sensor data 906*a* may include a feed of images, videos, LiDAR data, motion sensor data, sound data, infrared data, and/or other data types associated with the objects 904. The sensors 1646 communicate the sensor data 906*a* to the control subsystem 1400 of the lead AV 1602-1.

In one embodiment, the control subsystem 1400 may use the obstruction detection instructions 1416 to identify each object 904 from the sensor data 906*a*, similar to as described above with respect to identifying objects 204 and 206 in FIGS. 1-4. The control subsystem 1400 then compares the sensor data 906*a* corresponding to objects 904 with a third portion of the map data 1510 covering the detection zone of the sensors 1646 of the lead AV 1602-1. For example, the third portion of the map data 1510 may include expected objects ahead of the lead AV 1602-1 within and around the road 900, such as lane markings, road boundaries, road signs, buildings, terrain, etc.

Based on comparing the sensor data 906*a* with the third portion of the map data 1510, the control subsystem 1400 determines whether a construction zone 902 is detected by identifying one or more objects 904 associated with the construction zone 902 that are not among the expected objects in the third portion of the map data 1510. In other words, the control subsystem 1400 determines that there is a construction zone 902 ahead of the lead AV 1602-1 if it detects the presence of one or more objects 604.

In the particular example situation illustrated in FIG. 9, the control subsystem 1400 identifies the traffic barriers 904-2, traffic cone/delineators 904-3, construction workers 904-4, construction vehicle 904-5 which are associated with the construction zone 902 and that are not among the expected objects in the third portion of the map data 1510.

In the example of the construction worker 904-4, the control subsystem 1400 may identify that a person detected in the sensor data 906*a* is a construction worker 904-4 by detecting one or more features related to a construction worker 904-4, such as a construction helmet, a reflective vest, and/or the like.

In the example of the construction vehicle 904-5, the control subsystem 1400 may identify that a vehicle in the sensor data 906*a* is a construction vehicle 904-5 by detecting a piece that belongs to a construction vehicle 904-5, such a backhoe, a stick, a boom, a tractor, a loader, etc. In another example, the control subsystem 1400 may determine that there is a construction zone 902 ahead of the lead AV 1602-1 by detecting the sounds of construction equipment (e.g., a construction drill tool), construction vehicle 904-5, and/or the like.

In one embodiment, once the control subsystem 1400 determines that there is a construction zone 902 ahead of the lead AV 1602-1, it may update the driving instructions 1518 of the lead AV 1602-1, such that the lead AV 1602-1 enters a safety mode 908. The safety mode 908 may be similar to the safety mode 222 described in FIGS. 2 and 3.

Navigating Around the Construction Zone

In one embodiment, once the control subsystem 1400 detects the construction zone 902, it updates the driving instructions 1518 of the lead AV 1602-1 to navigate around the construction zone 902. In some cases, such as the exemplary situation illustrated in FIG. 9, the control subsystem 1400 may navigate the lead AV 1602-1 by changing to lane 910-3 that is not occupied by the construction zone 902 and/or objects 904. In such cases, the control subsystem 1400 (in signal communication with the in-vehicle control computer 1650) searches for a safe pathway to the lane 910-3, similar to the example of searching for the safe pathway 218 for changing the lead AV 1602-1 to lane 202-3 described above in FIGS. 2-4.

In some examples, the control subsystem 1400 may navigate the lead AV 1602-1 to change to two or more lanes 910, for example, if the construction zone 902 and/or the objects 904 occupy (at least a portion of) two or more lanes 910. The control subsystem 1400 may navigate the lead AV 1602-1 to change to a lane 910 that has less traffic flow compared to other lanes 910. The control subsystem 1400 may navigate the lead AV 1602-1 to change to a lane 910 that is further away from the construction zone 902 and/or the objects 904 and that is safer to drive through. In other cases where the construction zone 902 and/or the objects 904 do not occupy a lane 910 (e.g., the construction zone 902 is beyond a road boundary line 916), the control subsystem 1400 may not have to navigate the lead AV 1602-1 to change to another lane 910.

Informing the Operation Server about the Construction Zone

In one embodiment, the control subsystem 1400 of the lead AV 1602-1 may inform the operation server 1500 about the construction zone 902 before navigating the lead AV 1602-1 around the construction zone 902. In another embodiment, the control subsystem 1400 of the lead AV 1602-1 may inform the operation server 1500 about the construction zone 902 while navigating the lead AV 1602-1 around the construction zone 902.

To inform the operation server 1500 about the construction zone 902, the control subsystem 1400 sends a first message 912 to the operation server 1500, indicating that the construction zone 902 is detected at particular location coordinates. For example, the first message 912 may include sensor data 906*a* associated with the construction zone 902. The operation server 1500 analyzes the sensor data 906*a* (e.g., using the object detection machine learning modules 1520 described above in FIGS. 2-4 with respect to analyzing sensor data 216*a, c*) and confirms that the construction zone 902 is detected at the particular (or updated) location coordinates on the road 900. In one embodiment, based on the first message 912, the operation server 1500 updates the map data 1510, indicating that the construction zone 902 is detected at the particular (or updated) location coordinates on the road 900.

Informing the One or More Following AVs about the Construction Zone

Figure 10:
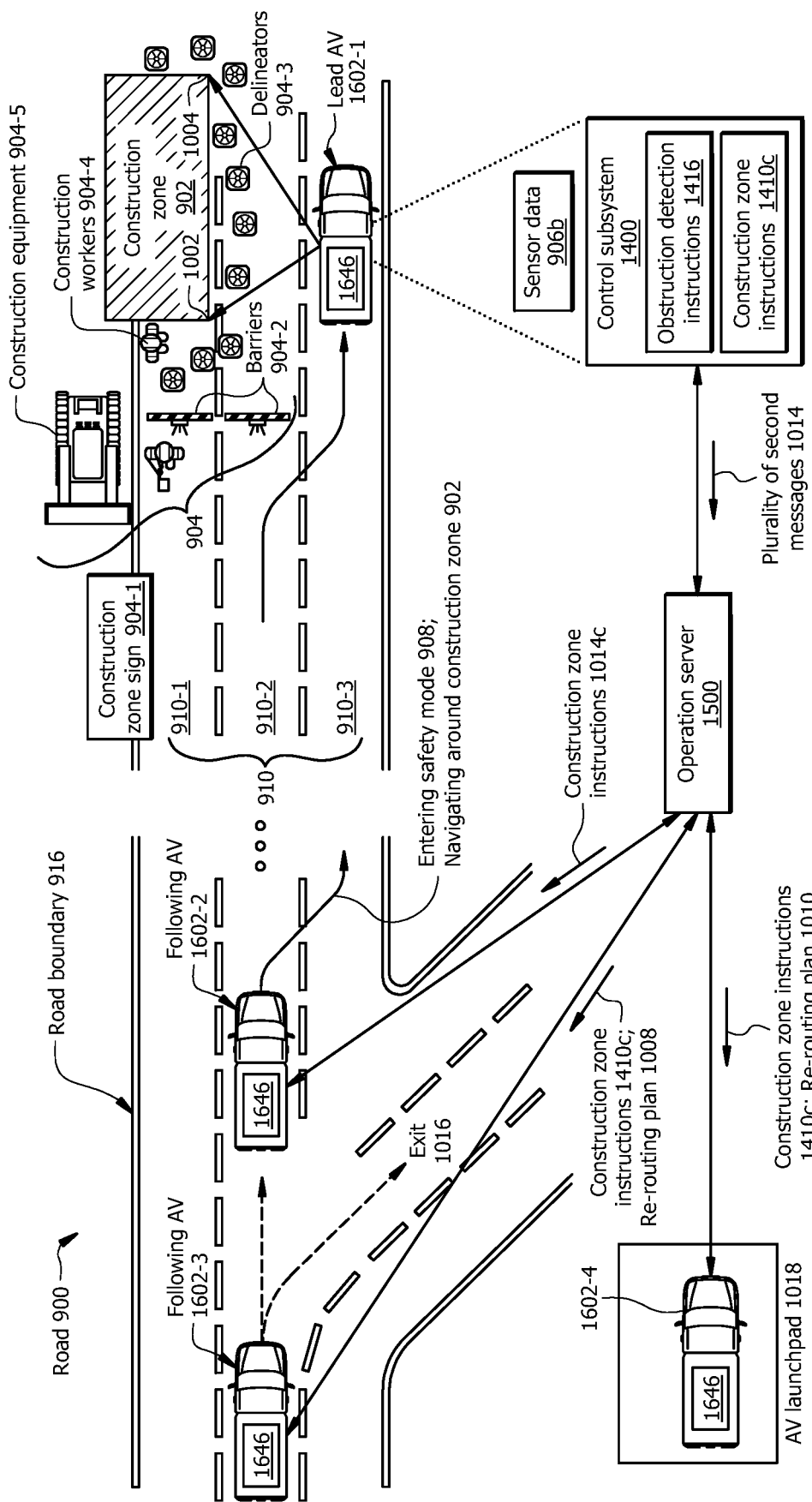
FIG. 10 illustrates a continuation of the schematic diagram in FIG. 9 with one or more following AVs.

FIG. 10 illustrates a continuation of the example situation illustrated in FIG. 9 where the lead AV 1602-1 and the following AV 1602-2 are traveling on the road 900 on which the construction zone 902 is detected by the control subsystem 1400 of the lead AV 1602-1.

While navigating around the construction zone 902, the sensors 1646 of the lead AV 1602-1 capture sensor data 906*b* corresponding to the construction zone 902 (and objects 904) and send them to the control subsystem 1400. The sensor data 906*b* may provide more information about the construction zone 902 and objects 904. The sensor data 906*b* may include a feed of images, videos, LiDAR data, motion sensor data, sound data, and infrared data, and/or other data types associated with the construction zone 902 and objects 904 captured from different angles and directions while the lead AV 1602-1 is navigating around the construction zone 902.

The control subsystem 1400 sends a plurality of second messages 1014 which includes the sensor data 906*b* to the operation server 1500. The operation server 1500 analyzes the plurality of second messages 1014 (e.g., using the object detection machine learning modules 1520 described above in FIGS. 2-4 with respect to analyzing sensor data 216a, c) and determines characteristics of the construction zone 902. For example, the operation server 1500 may determine the space occupied by the construction zone 902, the extent of the construction zone 902, the type of the construction zone 902 (e.g., residential, commercial, etc.), among other characteristics.

In a particular example, the operation server 1500 may determine the extent of the construction zone 902 along the road 900 by calculating the distance between a first end 1002 and a second end 1004 of the construction zone 902. The operation server 1500 then updates the map data 1510, reflecting the construction zone 902 with the particular extent (e.g., from the first end 1002 to the second end 1004) on the road 900.

In one embodiment, the operation server 1500 may determine that the construction zone 902 is extensive if the distance between the first end 1002 and the second end 1004 of the construction zone 902 is more than a threshold distance, e.g., 500 feet.

In one embodiment, the operation server 1500 may determine that the construction zone 902 is extensive if the driving time for reaching a destination while navigating around the construction zone 902 is more than a driving time using any of the alternative routes (which do not include passing the construction zone 902) for reaching the same destination.

In one embodiment, the operation server 1500 may determine that the construction zone 902 is extensive if the navigational complexity of an AV 1602 around the construction zone 902 is above a threshold percentage e.g., 70%. In other words, navigating the AV 1602 around the construction zone 902 is too complex. For example, there are above a threshold number of precise maneuvers are needed to be made to safely navigate the AV 1602 around the construction zone 902. The operation server 1500 determines the navigational complexity of the AV 1602 by running a plurality of autonomous driving simulations navigating an AV 1602 around the construction zone 902, where in each simulation, different maneuvers are tried to determine a particular series of maneuvers that would lead to safely passing the construction zone 902 (see descriptions of autonomous driving simulations in FIG. 15).

In one embodiment, the operation server 1500 may determine that the construction zone 902 is not extensive if there is at least one lane 910 alongside the construction zone 902 that is free of objects, such as objects 904 (i.e., it is safe to navigate around the construction zone 902).

The operation server 1500 then sends the updated map data 1510 to the one or more following AVs 1602. Depending on the location coordinates of each following AV 1602 and the extent of the construction zone 902, the operation server 1500 may send different instructions/data to each following AV 1602. Some example cases for sending different instructions/data to each following AV 1602 are illustrated in FIG. 10.

In a first case, the following AV 1602-2 has passed all the exits on the road 900, such as the exit 1016, before reaching the construction zone 902. In this case, the operation server 1500 sends the updated map data 1510 and the construction zone instructions 1410c. The construction zone instructions 1410c may include the location coordinates of the construction zone 902, instruction to enter safety mode 908, and instruction to navigate around the construction zone 902 (e.g., to change to a particular lane 910 that is further away from the construction zone 902 and/or is free of objects 904). In this way, the AV 1602-2 has more freedom to change lanes if necessary (e.g., if the construction zone 902 is occupying one or more lanes 910) because the AV 1602-2 is not close to the construction zone 902 yet and changing lanes is not as urgent compared to the example of lead AV 1602-1 encountering the construction zone 902 discussed in FIG. 9.

In a second case, the AV 1602-3 has at least one available exit 1016 to take before reaching the construction zone 902. In this case, if the operation server 1500 determines that the construction zone 902 is extensive, the operation server 1500 may send the updated map data 1510 and a re-routing plan 1008 to the AV 1602-3. In this particular example, the re-routing plan 1008 includes instructions to take the exit 1016 and use a particular route (and a particular routing plan 1514) to reach the destination of the AV 1602-3 that leads to a reduced driving time and a safer driving experience compared to other routing plans 1514. For example, the operation server 1500 may fetch the traffic data 1524 of a plurality of routing plans 1514 heading towards the destination of the AV 1602-3 to choose the particular routing plan 1514 for the AV 1602-3.

The operation server 1500 may also use information obtained from external sources (e.g., live traffic reporting, live construction data, etc.) in choosing the particular routing plan 1514 for the AV 1602-3. In one embodiment, if the operation server 1500 determines that the construction zone 902 is not extensive, it may send the updated map data 1510 and the construction zone instructions 1410c to the AV 1602-3.

In a third case, the AV 1602-4 has not left the AV launchpad 1018, where the AV launchpad 1018 is similar to AV launchpad 706 (See FIG. 7). In this case, if the operation server 1500 determines that the construction zone 902 is not extensive, the operation server 1500 may send the updated map data 1510 and the construction zone instructions 1410c to the AV 1602-4. In one embodiment, if the operation server 1500 determines that the construction zone 902 is extensive, it may send the updated map data 1510 and the re-routing plan 1010 to the AV 1602-4. For example, the re-routing plan 1010 may include instructions to replace the previous routing plan 1514 (which included passing the construction zone 902) with a particular routing plan 1514 that leads to reduced driving time and a safer driving experience compared to other routing plans 1514.

The operation server 1500 may fetch the traffic data 1524 of a plurality of routing plans 1514 heading towards the destination of the AV 1602-4 to choose the particular routing plan 1514 for the AV 1602-4. The operation server 1500 may also use information obtained from external sources (e.g., live traffic reporting, live construction data, etc.) in choosing the particular routing plan 1514 for the AV 1602-4.

In one embodiment, if a control subsystem 1400 of any of the AVs 1602 determines that the construction zone 902 is removed, that control subsystem 1400 sends a third message to the operation server 1500 that the construction zone 902 is removed. For example, a control subsystem 1400 of an AV 1602 may determine that the road closure 602 is removed by detecting that the objects 904 corresponding to the construction zone 902 are no longer present at their determined (or updated) location coordinates.

For example, assume that the following AV 1602-2 has diverted from the lane 910-2 (based on receiving the construction zone instructions 1410c) and is arriving at the construction zone 902. Also, assume that the construction zone 902 and objects 904 are no longer present at their determined (or updated) location coordinates, e.g., the construction zone 902 has been completed. As such, while the AV 1602-2 is passing the location coordinates of the previously detected construction zone 902, the control subsystem 1400 of the AV 1602-2 determines that the construction zone 902 is no longer present, e.g., by analyzing sensor data received from the sensors 1646 of the AV 1602-2. In this case, the control subsystem 1400 of the AV 1602-2 sends a third message to the operation server 1500 that the construction zone 902 is no longer present. For example, the third message may include the sensor data associated with the environment surrounding the previously detected construction zone 902. The operation server 1500 analyzes the third message and confirms whether the construction zone 902 is no longer present. If the operation server 1500 confirms that the construction zone 902 is no longer present, it updates the map data 1510, indicating that the construction zone 902 is no longer present. The operation server 1500 then sends the updated map data 1510 to the other AVs 1602. Therefore, other following AVs 1602 may continue traveling on the road 900 without diverting from or otherwise avoiding lanes 910-1 and 910-2 which were previously (at least partially) occupied by the construction zone 902 and objects 904.

In one embodiment, the control subsystem 1400 of the lead AV 1602-1 may determine that it is not safe to navigate around the construction zone 902, e.g., if there is not enough detail about the construction zone 902 in the sensor data 906*a*, not enough room to navigate around the construction zone 902, etc. In such cases, the control subsystem 1400 of the lead AV 1602-1 may navigate the lead AV 1602-1 to pull over to a safe region similar to pulling over the lead AV 1602-1 to the safe region 618 described in FIG. 6. The control subsystem 1400 of the lead AV 1602-1 may inform the operation server 1500 that it is not safe to navigate around the construction zone 902. Thus, the operation server 1500 may send pulling over instructions, re-routing instructions, delay departure instructions, and/or other appropriate instructions to each following AV 1602 based on location coordinates of each following AV 1602 similar to as described above in FIGS. 6 and 7.

In one embodiment, the operation server 1500 may determine the estimated completion time of the construction zone 902 (e.g., from external sources, such as published construction zone data, etc.). For example, assume that the operation server 1500 determines that the construction zone 902 may become extensive during a particular period in the future. In such cases, the operation server 1500 may determine new routing plans 1514 for the AVs 1602 to travel during the particular period in the future to avoid the construction zone 902.

While the example situation in FIG. 9 illustrates a construction zone 902 that is occupying two side lanes 910 (i.e., lane 910-1 and a portion of lane 910-2), it is understood that the construction zone 902 may occupy any portions of lanes 910. For example, the construction zone 902 may occupy one or more middle lanes 910 and leave one or more side lanes 910 on either side open. As such, the control subsystem 1400 of the lead AV 1602-1 may navigate the lead AV 1602-1 to change to a side lane 910 that is safer to change to (e.g., it is further away from the objects 904) and/or easier to drive through (e.g., because it has less traffic flow).

In another example, as a result of the construction zone 902, one or more lanes 910 may be kept open but their widths may be reduced. As such, the control subsystem 1400 of the lead AV 1602-1 detects the changes in the widths of the one or more lanes 910 and adjusts the driving instructions 1518 of the lead AV 1602-1 accordingly, e.g., by driving in the center of a lane 910 with reduced width, changing to a wider lane 910, etc.

In another example, as a result of the construction zone 902, types of one or more lanes 910 may be changed, for example, from dashed lines to solid lines, vice versa, or any other change in lane types. As such, the control subsystem 1400 of the lead AV 1602-1 detects the change in the lane types and adjusts the driving instructions 1518 of the lead AV 1602 according to the driving rules inferred from the changed lane type.

In another example, as a result of the construction zone 902, an exit may have been closed. As such, if the lead AV 1602-1 was supposed to take that exit, the control subsystem 1400 of the lead AV 1602-1 may re-route the lead AV 1602-1, e.g., by using another exit, another road, making a U-turn, etc. In another example, as a result of the construction zone 902, an exit may have been re-routed to another road. As such, the control subsystem 1400 of the lead AV 1602-1 detects this change and determines if the re-routed exit would lead to a road towards its destination (from the map data 1510), if so, the lead AV 1602-1 may take that exit, otherwise the lead AV 1602-1 may re-route to another exit, another road, make a U-turn to another road, etc. that leads to its destination. Other situations are also possible as a result of the construction zone 902. As such, the control systems 1400 of the AVs 1602 and the operation server 1500 are configured to identify each case of construction zone 902 and determine a navigating or routing plan based on each case. The particular examples of routing plans described below may be modified for any cases of construction zone 902.

Figure 11:
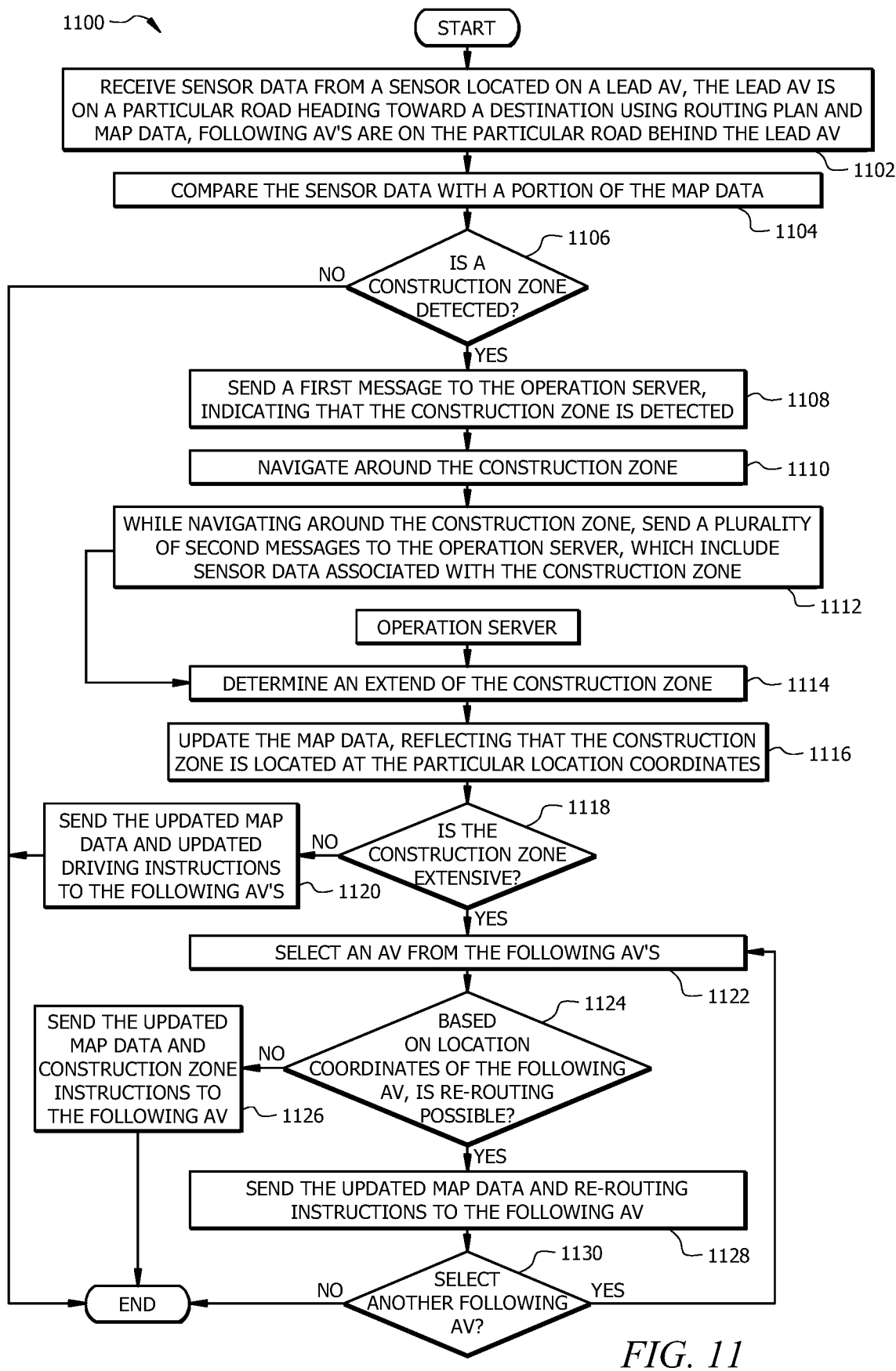
FIG. 11 illustrates a flowchart of an example method for detecting a construction zone and updating routing plans of a lead AV and one or more following AVs accordingly.

An Example Method for Detecting a Construction Zone and Updating Routing Plans of a Lead AV and One or More Following AVs Accordingly FIG. 11 illustrates a method 1100 for detecting a construction zone 902 and updating a routing plans 1514 for the lead AV 1602-1 and one or more following AVs 1602 accordingly. One or more of steps 1102-1130 of the method 1100 may be implemented, at least in part, in the form of software instructions 1408, 1508, 1680 stored on non-transitory, tangible, machine-readable media (e.g., memories 1404, 1504, 1690, and 1802) that when run by one or more processors (e.g., processors 1402, 1502, 1670, and 1804) may cause the one or more processors to perform steps 1102-1130. In some embodiments, method 1100 may be performed by control subsystem 1400, operation server 1500, and in-vehicle control computer 1650, respectively from FIGS. 14, 15, and 16. Aspects of steps 1102-1130 of the method 1100 have been covered in the description for FIGS. 9 and 10; and additional aspects are provided below.

The method 1100 begins at step 1102 where the control subsystem 1400 of the lead AV 1602-1 receives sensor data 906*a* from one or more sensors 1646 of the lead AV 1602-1, where the lead AV 1602-1 is on the road 900 heading toward a destination using the routing plan 1514 and the map data 1510. The one or more following AVs 1602 are also on the road 200 behind the lead AV 1602-1. For example, the sensor data 906*a* may include data related to construction zone 902 and objects 904, as described in FIG. 9. Aspects of the map data 1510 are described in FIGS. 1, 2, and 15.

In step 1104, the control subsystem 1400 compares the sensor data 906*a* with the third portion of the map data 1510 covering the detection zone of the sensors 1646 in front of the lead AV 1602-1. For example, the third portion of the map data 1510 may include expected objects ahead of the lead AV 1602-1 within and around the road 900, such as lane markings, road boundaries, road signs, buildings, terrain, etc. For example, the control subsystem 1400 may use obstruction detection instructions 1416 for detecting objects within the detection zone of the sensors 1646, as described in FIG. 9.

In step 1106, the control subsystem 1400 determines whether a construction zone 902 is detected (i.e., whether one or more objects 904 are detected within the detection zone of the sensors 1646 of the lead AV 1602-1). The control subsystem 1400 may determine that the construction zone 902 is detected if it identifies one or more objects 904 associated with the construction zone 902 and that are not among the expected objects in the third portion of the map data 1510. For example, the control subsystem 1400 may determine that the construction zone 902 is detected if it identifies one or more of the construction zone sign 904-1, traffic barrier 904-2, traffic cone/delineator 904-3, construction worker 904-4, construction vehicle 904-5, arrow-board trailer/sign, and/or the like.

If the control subsystem 1400 determines that construction zone 902 is not detected, the method 1100 terminates and the lead AV 1602-1 proceeds to travel toward its destination. If, however, the control subsystem 1400 determines the construction zone 902 is detected, the method 1100 proceeds to step 1108.

In step 1108, the control subsystem 1400 sends the first message 912 to the operation server 1500, indicating that the construction zone 902 is detected. For example, the first message 912 may include sensor data 906a associated with the construction zone 902 and objects 904.

In step 1110, the control subsystem 1400 updates the driving instructions 1518 of the lead AV 1602-1 to navigate around the construction zone 902. In some cases, such as the exemplary situation illustrated in FIG. 9, the control subsystem 1400 may navigate the lead AV 1602-1 by changing to lane 910-3 that is not occupied by the construction zone 902 and/or objects 904.

In other cases where the construction zone 902 and/or the objects 904 do not occupy a lane 910 (e.g., the construction zone 902 is beyond the road boundary line 916), the control subsystem 1400 may not have to navigate the lead AV 1602-1 to change to another lane 910.

In step 1112, while navigating around the construction zone 902, the control subsystem 1400 sends the plurality of second messages 1014 to the operation server 1500. For example, the plurality of second messages 1014 may include sensor data 906b corresponding to the construction zone 902 (and objects 904) captured by the sensors 1646 from a plurality of angles and directions while navigating around the construction zone 902, as described in FIG. 10.

In step 1114, based on the plurality of second messages 1014, the operation server 1500 determines the extent of the construction zone 902. For example, the operation server 1500 may determine the extent of the construction zone 902 by calculating the distance between the first end 1002 and the second end 1004 of the construction zone 902.

In some embodiments, the detection of the extent of the construction zone 902 may be performed by the control subsystem 1400. In such embodiments, the operation server 1500 may confirm (and update) the extent of the construction zone 902.

The operation server 1500 may also determine other characteristics of the construction zone 902, such as the type of the construction zone 902 (e.g., residential, commercial, etc.). In step 1116, the operation server 1500 updates the map data 1510, reflecting that the construction zone 902 is detected at particular (or updated) location coordinates.

In step 1118, the operation server 1500 determines whether the construction zone 902 is extensive. For example, the operation server 1500 may determine that the construction zone 902 is extensive if the distance between the first end 1002 and the second end 1004 of the construction zone 902 is more than a threshold distance, e.g., 500 feet. For example, the operation server 1500 may determine that the construction zone 902 is not extensive if there is at least one lane 910 alongside the construction zone 902 that is free of objects, such as objects 904 (i.e., it is safe to navigate around the construction zone 902).

If the operation server 1500 determines that the construction zone 902 is not extensive, the method 1100 proceeds to step 1120, where the operation server 1500 sends the updated map data 1510 and the construction zone instructions 1410c to the following AVs 1602. If, however, the operation server 1500 determines that the construction zone 902 is extensive, the method 1100 proceeds to step 1122.

In step 1122, the operation server 1500 selects an AV 1602 from the one or more following AVs 1602. The operation server 1500 iteratively selects an AV 1602 to determine particular instructions/data to send to that AV 1602 based on the location coordinates of that AV 1602. The operation server 1500 selects an AV 1602 from the one or more following AVs 1602 until no more following AV 1602 are left.

In step 1124, the operation server 1500 determines whether, based on the location coordinate of the selected AV 1602, re-routing is possible for that AV 1602. The operation server 1500 determines that re-routing is possible for the selected AV 1602 if there is at least one available exit 1016 between that AV 1602 and the construction zone 902, such as the examples of AV 1602-3 and AV 1602-4 described in FIG. 10.

In contrast, the operation server 1500 determines that re-routing is not possible for the selected AV 1602 if there are no available exits 1016 between the selected AV 1602 and the construction zone 902, such as the example of AV 1602-2 described in FIG. 10.

If the operation server 1500 determines that re-routing is possible for the selected AV 1602, the method 1100 proceeds to step 1128. If, however, the operation server 1500 determines that re-routing is not possible for the selected AV 1602, the method 1100 proceeds to step 1126.

In step 1126, the operation server 1500 sends the updated map data 1510 and the construction zone instructions 1410c to the selected AV 1602. One example of the operation server 1500 sending the updated map data 1510 and the construction zone instructions 1410c is described in FIG. 10 with respect to the AV 1602-2.

For example, the construction zone instructions 1410c may include the location coordinates of the construction zone 902, instruction to enter safety mode 908, and instruction to navigate around the construction zone 902 (e.g., to change to a particular lane 910 that is further away from the construction zone 902).

In step 1128, the operation server 1500 sends the updated map data 1510 and re-routing instructions to the selected AV 1602. Depending on the location coordinates of the selected AV 1602, the operation server 1500 may send different re-routing instructions to the selected AV 1602, such as the re-routing plan 1008 to the AV 1602-3 and the re-routing plan 1010 to the AV 1602-4, as described in FIG. 10.

In step 1130, the operation server 1500 determines whether to select another AV 1602 from the one or more following AVs 1602. The operation server 1500 selects another AV 1602 if at least one AV 1602 is left from the one or more following AVs 1602.

Example Situation of Encountering a Road Structural Change

Figure 12:
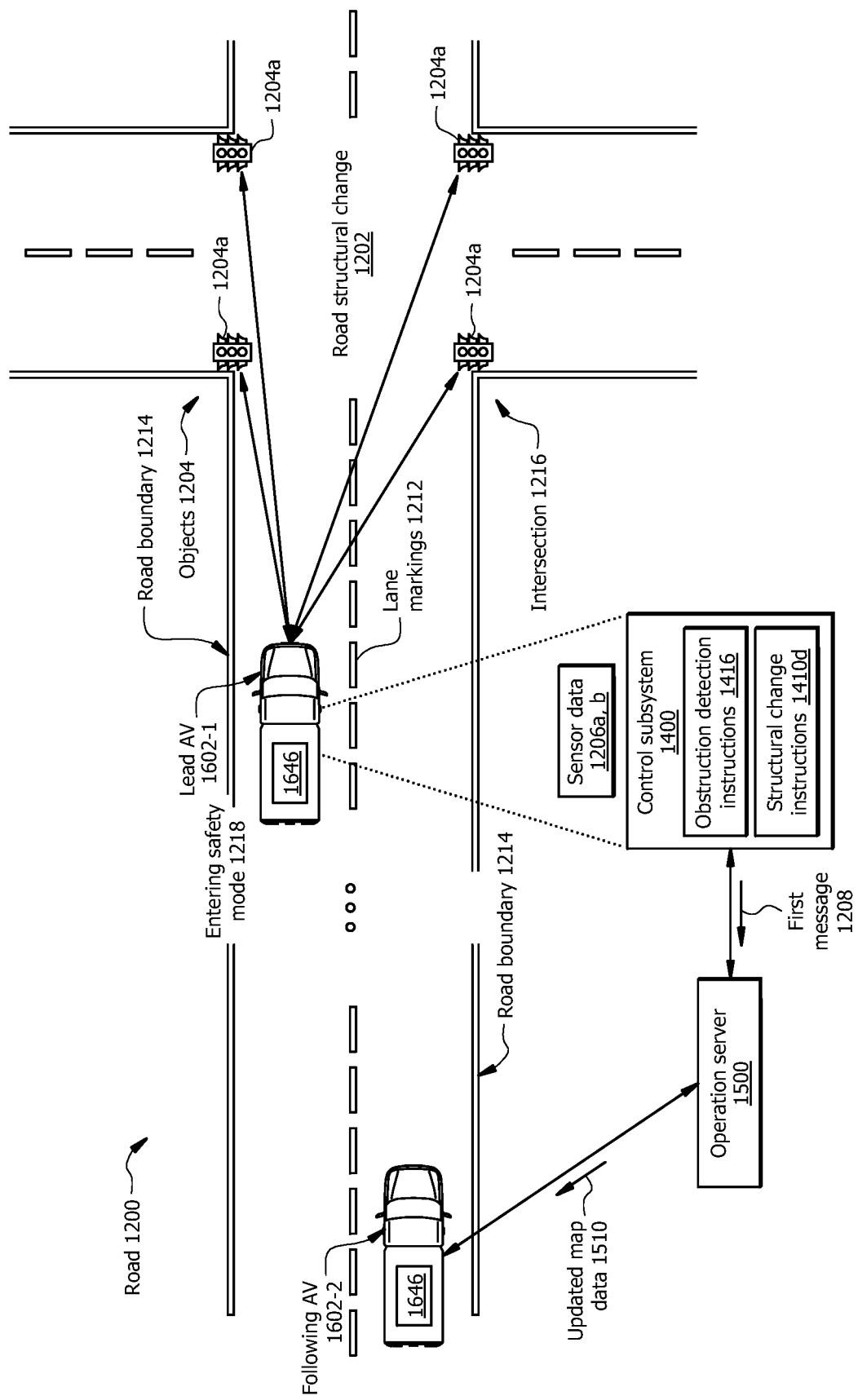
FIG. 12 illustrates a schematic diagram of a road on which a lead AV is encountering a road closure with a following AV behind the lead AV.

FIG. 12 illustrates a simplified schematic diagram of a road 1200 (a road on the route 100) traveled by the lead AV 1602-1 and the one or more following AVs 1602, where the lead AV 1602-1 is encountering a road structural change 1202. Similar to as described above with respect to FIGS. 1-4, 6, and 7, the sensors 1646 of the lead AV 1602-1 are configured to observe objects within their detection zones, such as the first detection zone or first field of view 212 in front of the lead AV 1602-1 (See FIG. 2).

In the example situation illustrated in FIG. 9, the sensors 1646 of the lead AV 1602-1 capture lane markings 1212 and road boundaries 1214, and generate sensor data 1206*a* corresponding to the lane markings 1212 and road boundaries 1214. The sensors 1646 of the lead AV 1602-1 communicate sensor data 1206*a* to the control subsystem 1400. The control subsystem 1400 uses the sensor data 1206*a* to navigate the lead AV 1602-1 according to driving instructions 1518 related to/inferred from the lane markings 1212 and road boundaries 1214, while keeping a safe distance from objects detected within the detection zone of the sensors 1646 of the lead AV 1602-1, similar to as described above in FIGS. 1-4.

When the lead AV 1602-1 comes in a threshold vicinity of the road structural change 1202, the sensors 1646 of the lead AV 1602-1 capture the presence of one or more objects 1204 that correspond to the road structural change 1202. In other words, the sensors 1646 of the lead AV 1602-1 capture the presence of one or more objects 1204 that correspond to the road structural change 1202, when the one or more objects 1204 are within at least one detection zone of the sensors 1646 of the lead AV 1602-1, similar to as described in FIG. 2 with respect to objects 204, 206 within the first field of view 212.

For example, objects 1204 associated with the road structural change 1202 may be related to any change on or around a road, such as a change in a lane marking, a change in an intersection/junction, a change in a traffic light, a new road sign, a lack of a road sign, one or more new lanes, and a lack of one or more lanes, and/or the like. In some examples, the road structural change 1202 may be related to objects 1204 not behaving as expected from the map data 1510, such as to monitor an increase in traffic at an intersection, its traffic lights which used to indicate flashing signals now indicate solid signals or vice versa. In some examples, the road structural change 1202 may be due to power failure in one or more traffic lights, where one or more traffic lights are turned off. In some examples, the road structural change 1202 may be related to road defects, such as negative objects (e.g., a pothole, or a cavity or space underground exposed by a removed manhole cover, etc.). In some examples, the road structural change 1202 may be related to unmaintained roads, such as not fully visible lanes (e.g., as a result of erosion or wear on the road, coved by snow, covered by rubble), among others.

The sensors 1646 of the lead AV 1602-1 generate sensor data 1206*b* which provides information about the objects 1204 (detected within the detection zone of the sensors 1646 of the lead AV 1602-1). The sensor data 1206*b* may include a feed of images, videos, LiDAR data, motion sensor data, sound data, infrared data, and/or other data types associated with the objects 1204. The sensors 1646 of the lead AV 1602-1 communicate the sensor data 1206*b* to the control subsystem 1400 of the lead AV 1602-1.

In one embodiment, the control subsystem 1400 may use the obstruction detection instructions 1416 to identify each object 1204 from the sensor data 1206*b*, similar to as described above with respect to FIGS. 1-4. The control subsystem 1400 then compares the sensor data 1206*b* corresponding to objects 1204 with a fourth portion of the map data 1510 covering the detection zone of the sensors 1646 of the lead AV 1602-1. For example, the fourth portion of the map data 1510 may include expected objects ahead of the lead AV 1602-1 within and around the road 1200, such as lane markings, road boundaries, road signs, buildings, terrain, etc.

Based on comparing the sensor data 1206*b* with the fourth portion of the map data 1510, the control subsystem 1400 determines whether a road structural change 1202 is detected by identifying one or more objects 1204 associated with the road structural change 1202 and that are not among the expected objects in the fourth portion of the map data 1510. In other words, the control subsystem 1400 determines that there is the road structural change 1202 ahead of the lead AV 1602-1, if it detects the presence of one or more objects 1204.

In the particular example situation illustrated in FIG. 12, the control subsystem 1400 identifies the traffic lights 1204*a* at the intersection 1216 which according to the fourth portion of the map data 1510 used to have stop signs at each corner. Thus, the control subsystem 1400 determines that the (added) traffic lights 1204*a* are examples of objects 1204 which correspond to the road structural change 1202 (i.e., traffic lights 1204*a* are not among the expected objects in the fourth portion of the map data 1510). In other words, the control subsystem 1400 determines that the previous stop signs at the intersection 1216 are replaced with traffic lights 1204*a*.

In one embodiment, once the control subsystem 1400 determines that there is the road structural change 1202 ahead of the lead AV 1602-1, it may update the driving instructions 1518 of the lead AV 1602-1, such that the lead AV 1602-1 enters a safety mode 1218. The safety mode 1218 may be similar to the safety mode 222 described in FIGS. 2 and 3.

Navigating Through the Road Structural Change

In one embodiment, once the control subsystem 1400 detects the road structural change 1202, it updates the driving instructions 1518 of the lead AV 1602-1 to navigate through the structural change 1202 using driving instructions 1518 related to the structural change 1202.

In the particular example situation of facing the traffic lights 1204*a* (which are placed instead of stop signs according to the map data 1510), the control subsystem 1400 uses the driving instructions 1518 related to traffic light 1204*a* to navigate the lead AV 1602-1 through the intersection 1216.

For example, the control subsystem 1400 navigates the lead AV 1602-1 by incorporating the indications given by the traffic lights 1204*a*, e.g., stopping the lead AV 1602-1 when the traffic light 1204*a* corresponding to the road traveled by lead AV 1602-1 is red, moving the lead AV 1602-1 forward when the traffic light 1204*a* corresponding to the road traveled by lead AV 1602-1 is green, etc.

In other examples of encountering different road structural changes 1202, the control subsystem 1400 of the lead AV 1602-1 may update the driving instructions 1518 of the lead AV 1602-1 according to the driving instructions 1518 related to each encountered road structural change 1202. For example, in a case of encountering double solid lines in the middle of the road 1200 which were previously a dashed line according to the map data 1510, the control subsystem 1400 updates the driving instructions 1518 of the lead AV 1602-1, such that lead AV 1602-1 does not cross the double solid lines. Similarly, the control subsystem 1400 may update the driving instruction of the lead AV 1602-1 for any case of road structural changes 1202.

Informing the Operation Server and the Following AVs about the Structural Change To inform the operation server 1500 about the road structural change 1202, the control subsystem 1400 sends a first message 1208 to the operation server 1500 indicating that the structural change 1202 is detected at particular location coordinates on the road 1200. The first message 1208 may include sensor data 1206b which corresponds to the road structural change 1202.

The operation server 1500 analyzes the sensor data 1206b (e.g., using the object detection machine learning modules 1520 described above in FIGS. 2-4 with respect to analyzing sensor data 216a, c) and confirms the road structural change 1202. In one embodiment, the operation server 1500 may also update and provide more details about the road structural change 1202. For example, the operation server 1500 may determine more precise location coordinates of the objects 1204 associated with the road structural change 1202, a cause of the road structural change 1202 (e.g., traffic lights 1204a are added due to an increase in traffic in the intersection 1216), among other details.

In one embodiment, based on the first message 1208, the operation server 1500 updates the map data 1510, reflecting the structural change 1202. The operation server 1500 then sends the updated map data 1510 to the one or more following AVs 1602, such as the AV 1602-2 illustrated in FIG. 12. As such, when the AV 1602-2 receives the updates map data 1510, the control subsystem 1400 of the AV 1602-2 updates the driving instructions 1518 of the AV 1602-2 to incorporate the driving instructions 1518 of the road structural change 1202 before reaching the road structural change 1202.

In one embodiment, the operation server 1500 may also send structural change instructions 1410d to the one or more following AVs 1602. The structural change instructions 1410d may include instructions to enter safety mode 1218 when reaching the road structure change 1202.

In one embodiment, if a control subsystem 1400 of any of the AVs 1602 determines that the road structural change 1202 is changed back to a previous state (as in the previous version of the map data 1510), that control subsystem 1400 sends a second message to the operation server 1500 that the road structural change 1202 is changed back to the previous state. For example, a control subsystem 1400 of an AV 1602 may determine that the road structural change 1202 is changed back to the previous state by detecting that the objects 1204 corresponding to the road structural change 1202 are no longer present at their determined (or updated) location coordinates.

For example, assume that the following AV 1602-2 is arriving at the road structural change 1202. Also, assume that the objects 1204 (in the particular example in FIG. 12, the traffic lights 1204a) are no longer present at their determined (or updated) location coordinates. As such, the control subsystem 1400 of the AV 1602-2 determines that the road structural change 1202 is no longer present, e.g., by analyzing sensor data received from the sensors 1646 of the AV 1602-2. In this case, the control subsystem 1400 of the AV 1602-2 sends a second message to the operation server 1500 that the road structural change 1202 (and objects 1204) is no longer present. For example, the second message may include the sensor data associated with the environment surrounding the previously detected road structural change 1202. The operation server 1500 analyzes the second message and confirms whether the road structural change 1202 is no longer present.

If the operation server 1500 confirms that the road structural change 1202 is no longer present, it updates the map data 1510, indicating that the road structural change 1202 is no longer present. The operation server 1500 then sends the updated map data 1510 to the other AVs 1602.

In some embodiments, the operation server 1500 may send pulling over instructions, re-routing instructions, delay departure instructions, and/or other appropriate instructions to each following AV 1602 based location coordinates of each following AV 1602 similar to as described above in FIGS. 6 and 7.

For example, assume that the road structural change 1202 has caused the driving time including navigating through the structural change 1202 to become more than a driving time in any alternative routes (which do not include the road structural change 1202), such as traffic lights at a junction are turned off causing traffic at that junction, etc. In such cases, the operation server 1500 may determine if re-routing is possible for a following AV 1602 based on its location coordinates. If the operation server 1500 determines that re-routing is possible for a following AV 1602, it may send a re-routing plan to that following AV 1602, similar to as described above with respect to sending re-routing plan 702 to AV 1602-3 in FIG. 7 and sending re-routing plan 1008 to AV 1602-3 in FIG. 10. In this particular example, the re-routing plan may include instructions to take a particular exit and use a particular routing plan 1514 that leads to reduced driving time and a safer driving experience compared to other routing plans 1514.

The operation server 1500 may send pulling over instructions to a following AV 1602, if based on traffic data 1524 of the alternative routing plans 1514, it determines that the driving time using any of those alternative routing plans 1514 is more a threshold driving time (e.g., five hours), such as pulling over the lead AV 1602-1 described in FIG. 7.

Figure 13:
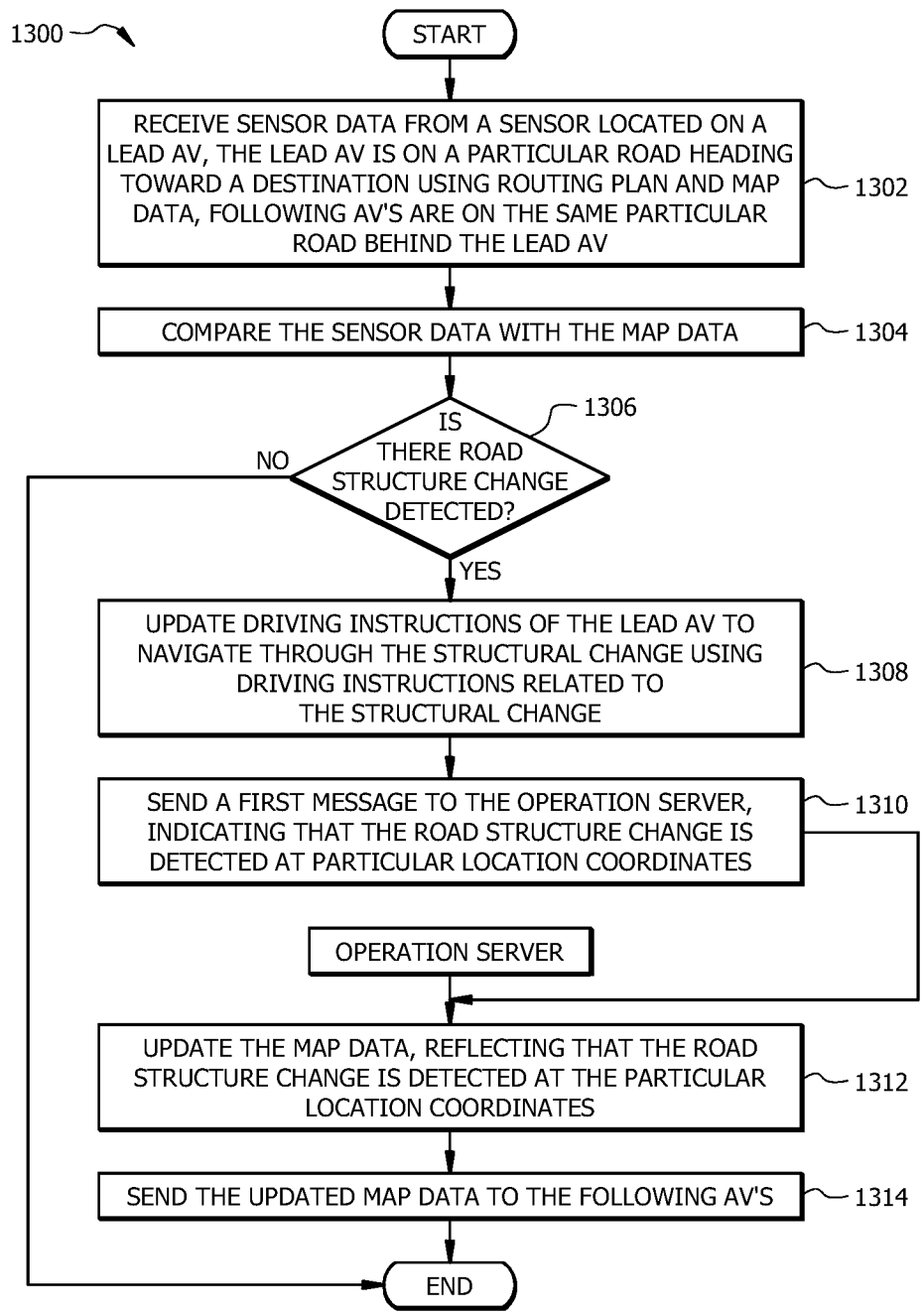
FIG. 13 illustrates a flowchart of an example method for detecting a road closure and updating routing plans of a lead AV and one or more following AVs accordingly.

An Example Method for Detecting a Road Structural Change and Updating Routing Plans of a Lead AV and One or More Following AVs Accordingly FIG. 13 illustrates a flow chart of a method 1300 for detecting a road structural change 1202 and updating routing plans 1514 of the lead AV 1602-1 and one or more following AVs 1602 accordingly. One or more of steps 1302-1314 of the method 1300 may be implemented, at least in part, in the form of software instructions 1408, 1508, and 1680 stored on non-transitory, tangible, machine-readable media (e.g., memories 1404, 1504, 1690, and 1802) that when run by one or more processors (e.g., processors 1402, 1502, 1670, and 1804) may cause the one or more processors to perform steps 1302-1314. In some embodiments, method 1300 may be performed by control subsystem 1400, operation server 1500, and in-vehicle control computer 1650, respectively from FIGS. 14, 15, and 16. Aspects of the steps 1302-1314 of the method 1300 have been covered in the description for FIG. 12; and additional aspects are provided below.

The method 1300 begins at step 1302 where the control subsystem 1400 of the lead AV 1602-1 receives sensor data 1206b from one or more sensors 1646 of the lead AV 1602-1, where the lead AV 1602-1 is on the road 1200 heading toward a destination using the routing plan 1514 and the map data 1510. The one or more following AVs 1602 are also on the road 1200 behind the lead AV 1602-1. For example, the sensor data 1206b may include data related to objects 1204 associated with the road structural change 1202, as described in FIG. 12. Aspects of the map data 1510 are described in FIGS. 1, 2, and 15.

In step 1304, the control subsystem 1400 compares the sensor data 1206b with the fourth portion of the map data 1510. For example, the fourth portion of the map data 1510 may include expected objects ahead of the lead AV 1602-1 within and around the road 1200, such as lane markings, road boundaries, road signs, buildings, terrain, etc. For example, the control subsystem 1400 may use obstruction detection instructions 1416 for detecting objects within the detection zone of the sensors 1646 of the lead AV 1602-1, as described in FIG. 12.

In step 1306, the control subsystem 1400 determines whether a road structural change 1202 is detected (i.e., whether one or more objects 1204 are detected within the detection zone of the sensors 1646 of the lead AV 1602-1). The control subsystem 1400 may determine that the road structural change 1202 is detected if it identifies one or more objects 1204 associated with the road structural change 1202 and that are not among the expected objects in the fourth portion of the map data 1510. For example, the control subsystem 1400 may determine that the road structural change 1202 is detected if it identifies one or more objects 1204 related to a change in a road, such as a change in a lane marking, a change in an intersection/junction, a change in a traffic light, a new road sign, a lack of a road sign, one or more new lanes, and a lack of one or more lanes, and/or the like.

If the control subsystem 1400 determines that road structural change 1202 is not detected, the method 1300 terminates and the lead AV 1602-1 proceeds to travel toward its destination. If, however, the control subsystem 1400 determines the road structural change 1202 is detected, the method 1300 proceeds to step 1308.

In step 1308, the control subsystem 1400 updates the driving instructions 1518 of the lead AV 1602-1 to navigate through the structural change 1202 using driving instructions 1518 relates to the structural change 1202. In the particular example situation of facing the traffic lights 1204a illustrated in FIG. 12, the control subsystem 1400 uses the driving instructions 1518 related to traffic light 1204a to navigate the lead AV 1602-1 through the intersection 1216. Similarly, the control subsystem 1400 may update the driving instructions 1518 of the lead AV 1602-1 based on any case of structural changes 1202.

In step 1310, the control subsystem 1400 sends the first message 1208 to the operation server 1500, indicating that the road structural change 1202 is detected. For example, the first message 1208 may include sensor data 1206b associated with the road structural change 1202.

In step 1312, the operation server 1500 updates map data 1510, reflecting that the structural change 1202 is detected at the particular location coordinates. For example, the operation server 1500 analyses the sensor data 1206b (e.g., using the object detection machine learning modules 1520 described above in FIGS. 2-4 with respect to analyzing sensor data 216a, c) and confirms the road structural change 1202, as described in FIG. 12.

In step 1314, the operation server 1500 sends the updated map data 1510 to the one or more following AVs 1602. As such, when the one or more following AVs 1602 receive the updates map data 1510, their control subsystem 1400s may update their driving instructions 1518 to incorporate the driving instructions 1518 of the road structural change 1202 before reaching the road structural change 1202.

Example Control Subsystem 1400

Figure 14:
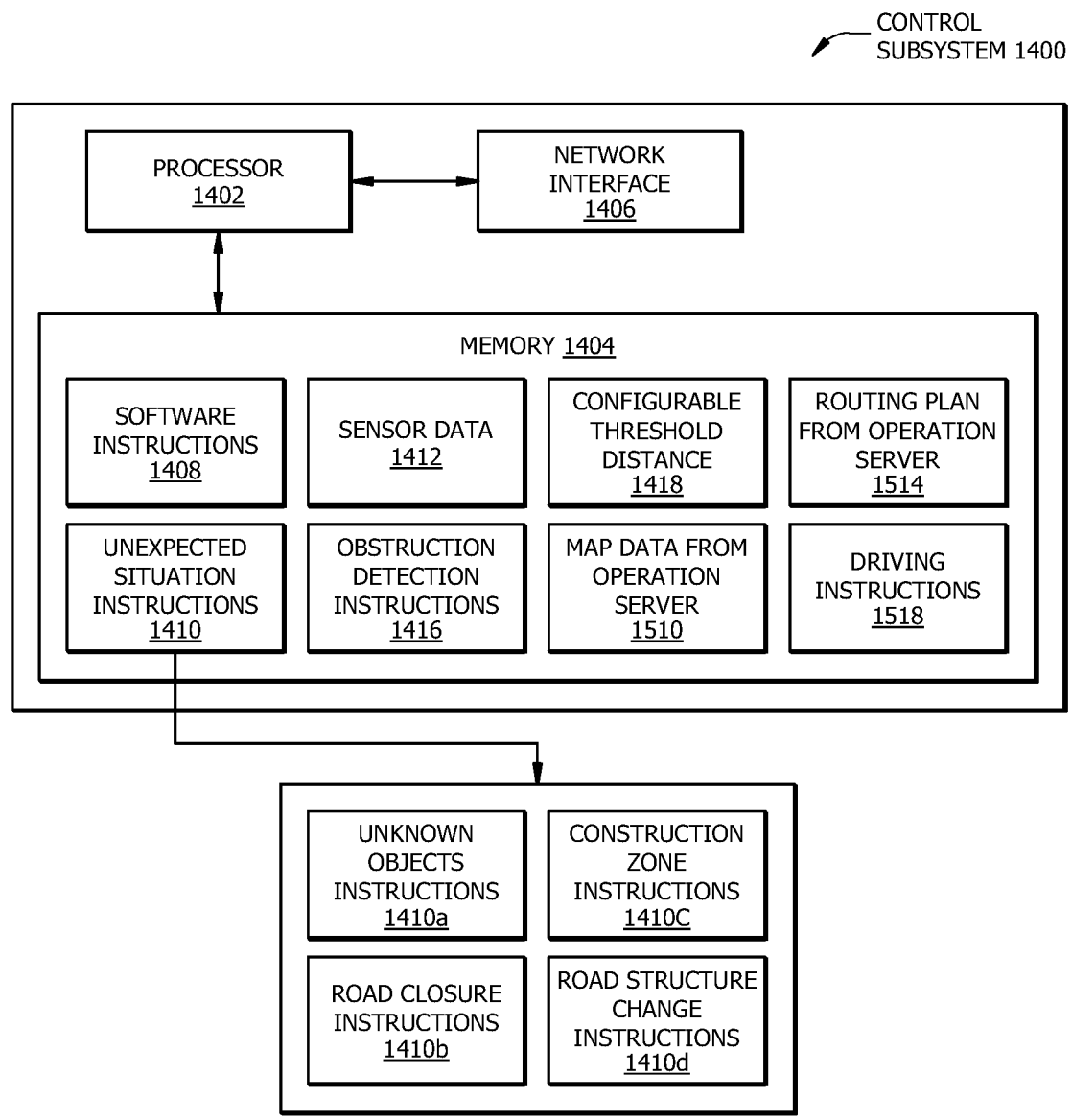
FIG. 14 illustrates a block diagram of a control subsystem.

FIG. 14 illustrates an embodiment of the control subsystem 1400. Aspects of one embodiment of the control subsystem 1400 have been covered in descriptions of FIGS. 2-13, and additional aspects are provided below. The control subsystem 1400 includes at least one processor 1402, at least one memory 1404, and at least one network interface 1406. The control subsystem 1400 may be configured as shown or in any other suitable configuration.

The processor 1402 comprises one or more processors operably coupled to the memory 1404. The processor 1402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 1402 may be a programmable logic device, a microcontroller, a microprocessor, or any suitable combination of the preceding. The processor 1402 is communicatively coupled to and in signal communication with the memory 1404 and the network interface 1406. The one or more processors are configured to process data and may be implemented in hardware or software. For example, the processor 1402 may be 8-bit, 16-bit, 32-bit, 64-bit or of any other suitable architecture. The processor 1402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the functions disclosed herein, such as some or all of those described with respect to FIGS. 1-13. In some embodiments, the function described herein is implemented using logic units, FPGAs, ASICs, DSPs, or any other suitable hardware or electronic circuitry.

The memory 1404 is operable to store any of the information described above with respect to FIGS. 1-13 along with any other data, instructions, logic, rules, or code operable to implement the function(s) described herein when executed by processor 1402. For example, the memory 1404 may store software instructions 1408, sensor data 1412 received from the sensors 1646 of the AVs 1602 (e.g., sensor data 216a-c, sensor data 616a-c, sensor data 906a-b, and sensor data 1206a-b), configurable threshold distance 1418, obstruction detection instructions 1416, map data 1510, routing plan 1514, driving instructions 1518, and/or any other data/instructions described herein. The memory 1404 may further store the unexpected situation instructions 1410 (e.g., unknown object instructions 1410a, road closure instructions 1410b, construction zone instructions 1410c, and road structure change instruction 1410d), described above with respect to FIGS. 2-13. The memory 1404 comprises one or more disks, tape drives, or solid-state drives, and may be used as an over-flow data storage device, to store programs when such programs are selected for execution, and to store instructions and data that are read during program execution. The memory 1404 may be volatile or non-volatile and may comprise read-only memory (ROM), random-access memory (RAM), ternary content-addressable memory (TCAM), dynamic random-access memory (DRAM), and static random-access memory (SRAM).

The network interface 1406 is configured to enable wired and/or wireless communications. The network interface 1406 is configured to communicate data between the control subsystem 1400 and other network devices, systems, or domain(s). For example, the network interface 1406 may comprise a WIFI interface, a local area network (LAN) interface, a wide area network (WAN) interface, a modem, a switch, or a router. The processor 1402 is configured to send and receive data using the network interface 1406. The network interface 1406 may be configured to use any suitable type of communication protocol.

Figure 16:
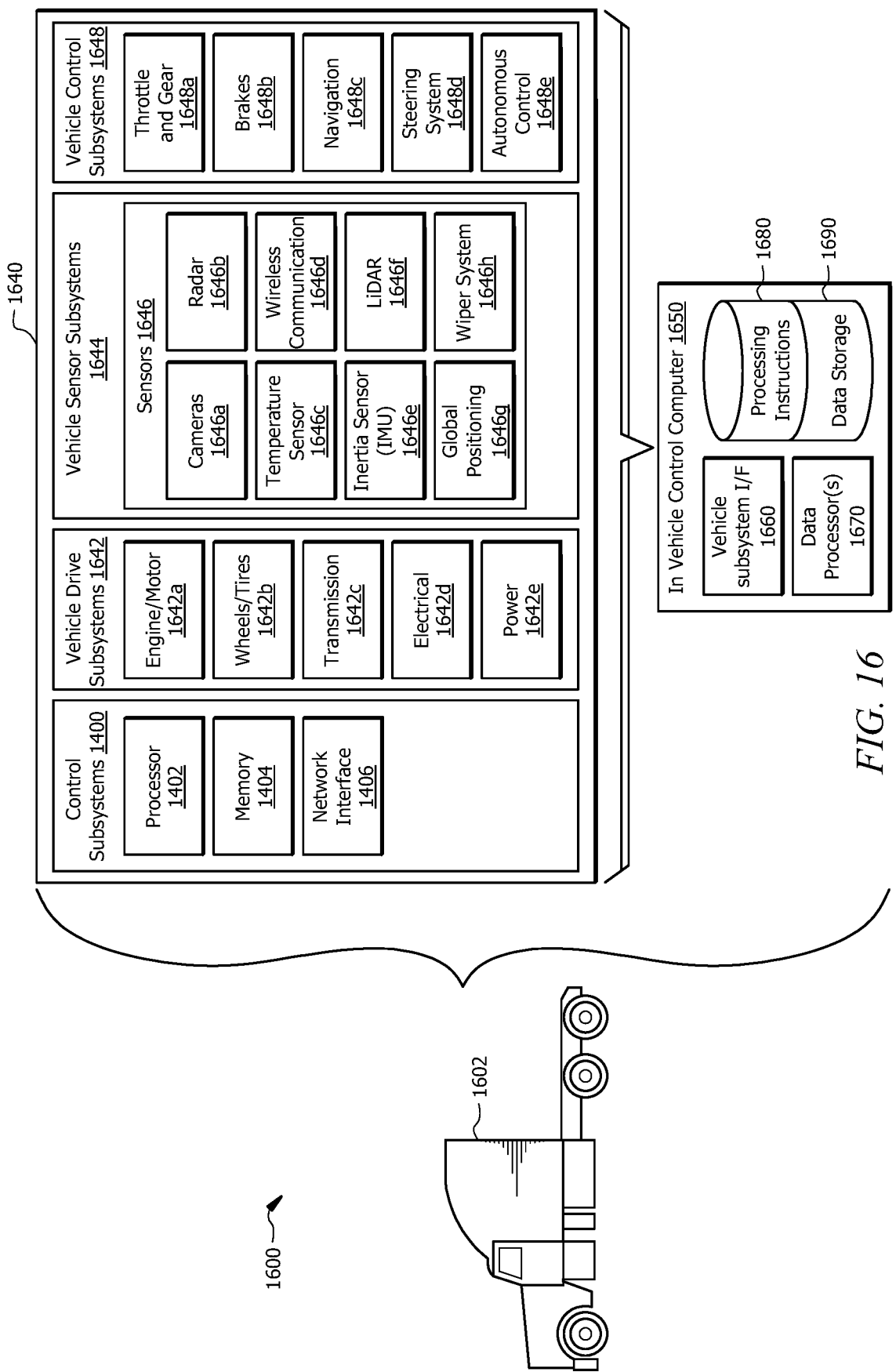
FIG. 16 illustrates a diagram of an example autonomous vehicle configured to implement autonomous driving operations.

In one embodiment, the control subsystem 1400 may be a subsystem of the in-vehicle control computer system 1650 (See FIG. 16). The control subsystem 1400 may be implemented by one or more computing devices that may serve to determine a traveling pathway free of objects/obstacles for the AV 1602. For example, the one or more computing devices may implement computing systems to facilitate detecting objects surrounding the AV 1602. The control subsystem 1400 is in signal communication with the in-vehicle control computer system 1650 (and its components) and the operation server 1500.

To determine a traveling pathway for the AV 1602, the control subsystem 1400 receives the sensor data 1412 from the sensors 1646 of that AV 1602. The control subsystem 1400 then compares the received sensor data 1412 with a portion of the map data 1510 that covers the detection zones of the sensors 1646 of that AV 1602, such as at least in part the first field of view 212 in front of the AV 1602 described in FIG. 2. Some examples of sensors 1646 are described in FIG. 16. The control subsystem 1400 may use the obstruction detection instructions 1416 to detect those objects and their characteristics.

The obstruction detection instructions 1416 may be implemented by the processor 1402 executing software instructions 1408, and is generally configured to detect objects and their characteristics, such as their identification (e.g., a vehicle, an animal, a person, a tree, a traffic light, etc.), speed, among other characteristics. The obstruction detection instructions 1416 may be implemented using neural networks and/or machine learning algorithms for detecting objects from images, videos, infrared images, point clouds, radar data, etc. For example, if the sensors 1646 include cameras, the sensor data 1412 may include images and/or videos of the environment surrounding the AV 1602 (i.e., the detection zones of the sensors 1646). In such cases, the control subsystem 1400 may employ obstruction detection instructions 1416 which include functions for detecting objects in the images and/or videos and determining whether there is any object within the detection zones of the sensors 1646.

The obstruction detection instructions 1416 may include code to employ object detection techniques to identify objects from the images and/or videos, such as an object that is a vehicle, a road sign, a lane marking, a pedestrian, a construction vehicle, a delineator, etc. If the control subsystem 1400 detects an object within the detection zones of the cameras, the control subsystem 1400 (in signal communication with the in-vehicle control computer system 1650) may employ image-based object detection module 1718 to determine characteristics of that object, such as its location coordinates, speed, trajectory, among other characteristics (See the description of the image based object detection module 1718 in FIG. 17.).

In another example, if the sensors 1646 include LiDAR sensors, the sensor data 1412 may include distance measurements. For example, the distance measurements may include a distance traveled by an object (i.e., a displacement of an object), distances of an object from a LiDAR sensor at different times (t), etc.

In another example, the sensor data 1412 from LiDAR sensors may include a cloud of point data representing obstacles or objects, which have been hit by the laser (e.g., radio wave), within the environment surrounding the AV 1602 (i.e., the detection zones of the sensors 1646). The cloud of point data may include points corresponding to light emitted from the LiDAR sensors and reflected from objects within the environment surrounding the AV 1602. The time delay between the transmitted light and the reflected light bounced off an object corresponds to the distance between the LiDAR sensor and that object. The intensity of the reflected light bounced off an object may be indicative of a surface type of that object, e.g., a metal, skin, plastic, fabric, concrete, etc. As such, the control subsystem 1400 (via obstruction detection instructions 1416) may identify that object.

For example, the obstruction detection instructions 1416 may include code to employ object detection techniques to identify objects from the distance measurements and/or a cloud of point data. The control subsystem 1400 may employ obstruction detection instructions 1416 which include functions for detecting objects based on characteristics and/or changes in the distance measurements and/or a cloud of point data, and determining whether there is any object within the detection zones of the sensors 1646. If the control subsystem 1400 detects an object within the detection zones of the LiDAR sensors, the control subsystem 1400 (in signal communication with the in-vehicle control computer system 1650) may employ LiDAR based object detection module 1712 to determine location coordinates, speed, trajectory, among other characteristics of that object (See the description of the image based object detection module 1718 in FIG. 17.).

In another example, if the sensors 1646 include motion sensors, the sensor data 1412 may include motion measurements. For example, the motion measurements may include the motion of an object from a first location to a second location. In such cases, the control subsystem 1400 may employ obstruction detection instructions 1416 which include functions for detecting objects based on characteristics and/or changes in the motion measurements and determining whether there is any object within the detection zones of the sensors 1646. For example, changes in motions measured by a motion sensor may indicate the presence of an object within the detection zone of the sensors 1646, and the direction of movement of that object. As such, the control subsystem 1400 may determine whether an object is moving towards the AV 1602 (e.g., a vehicle on the opposite side of a road), away from the AV 1602 (e.g., a vehicle speeding ahead of the AV 1602), across the AV 1602 (e.g., a pedestrian crossing the road), etc.

While certain examples of the detection of objects are described above, it should be understood that any other appropriate method of object detection may be used by the control subsystem 1400. In some embodiments, the control subsystem 1400 may use two or more types of sensor data to determine whether an object is detected (e.g., by combining camera images, LiDAR data, and radar data as described with respect to the sensor fusion module 1702 of FIG. 4-7) 17. In other words, the obstruction detection instructions 1416 may include instructions, rules, and/or code for implementing any of the modules as described with respect to FIG. 17.

If the control subsystem 1400 detects a distance of an object from the AV 1602 is getting close to a configurable threshold distance 1418 (e.g., 200 feet), the control subsystem 1400 sends signals to the in-vehicle control computer system 1650 to navigate the AV 1602 according to each case and to keep a safe distance from that object.

In one case, the control subsystem 1400 may detect that a distance of an object from the AV 1602 is getting close to a configurable threshold distance 1418, if control subsystem 1400 detects a stationary object ahead of the AV 1602, such as a building, a stopped vehicle, a pedestrian, among other objects. In other examples, the stationary object may be similar to the unknown object 204 discussed in FIG. 2, objects 604 associated with the road closure 602 discussed in FIG. 6, objects 904 associated with the construction zone 902 discussed in FIG. 9, objects 1204 associated with the road structural change 1202 discussed in FIG. 12.

In another case, the control subsystem 1400 may detect that a distance of an object from the AV 1602 is getting close to a configurable threshold distance 1418, if control subsystem 1400 detects a vehicle in front of the AV 1602 that is moving below a speed range of the road (e.g., the unknown object 204 discussed above in FIGS. 2-5).

The control subsystem 1400 may determine the configurable threshold distance 1418 based at least in part upon allowed speed range of a road traveled by the AV 1602, speed of the AV 1602, and speeds of surrounding vehicles. For example, in a highway where the allowed speed range is 65-75 mph, the AV 1602 is moving with a speed of 65 mph, and the average speed of surrounding vehicles is 70 mph, the configurable threshold distance 1418 may be 300 feet.

Unexpected situation instructions 1410 may include instructions and rules to update routing plans 1514 and/or driving instructions 1518 of the AVs 1602, when the lead AV 1602-1 is encountering an unexpected situation 104 (See FIG. 1). The control subsystem 1400 generates particular unexpected situation instructions 1410 by the processor 1402 executing software instruction 1408 for each circumstance of encountering unexpected situations 104 based on location coordinates of an AV 1602, map data 1510, and traffic data 1524. For example, the unexpected situation instructions 1410 may be generated by a machine learning module that is trained to take the sensor data 1412, map data 1510, and traffic data 1524; and recommend a particular navigation plan for each AV 1602 based on those inputs and the location coordinate of each AV 1602. Some examples of the unexpected situation instructions 1410 include unknown object instructions 1410a, road closure instructions 1410b, construction zone instructions 1410c, and road structural change instructions 1410d discussed in FIGS. 2-13.

Example Operation Server 1500

Figure 15:
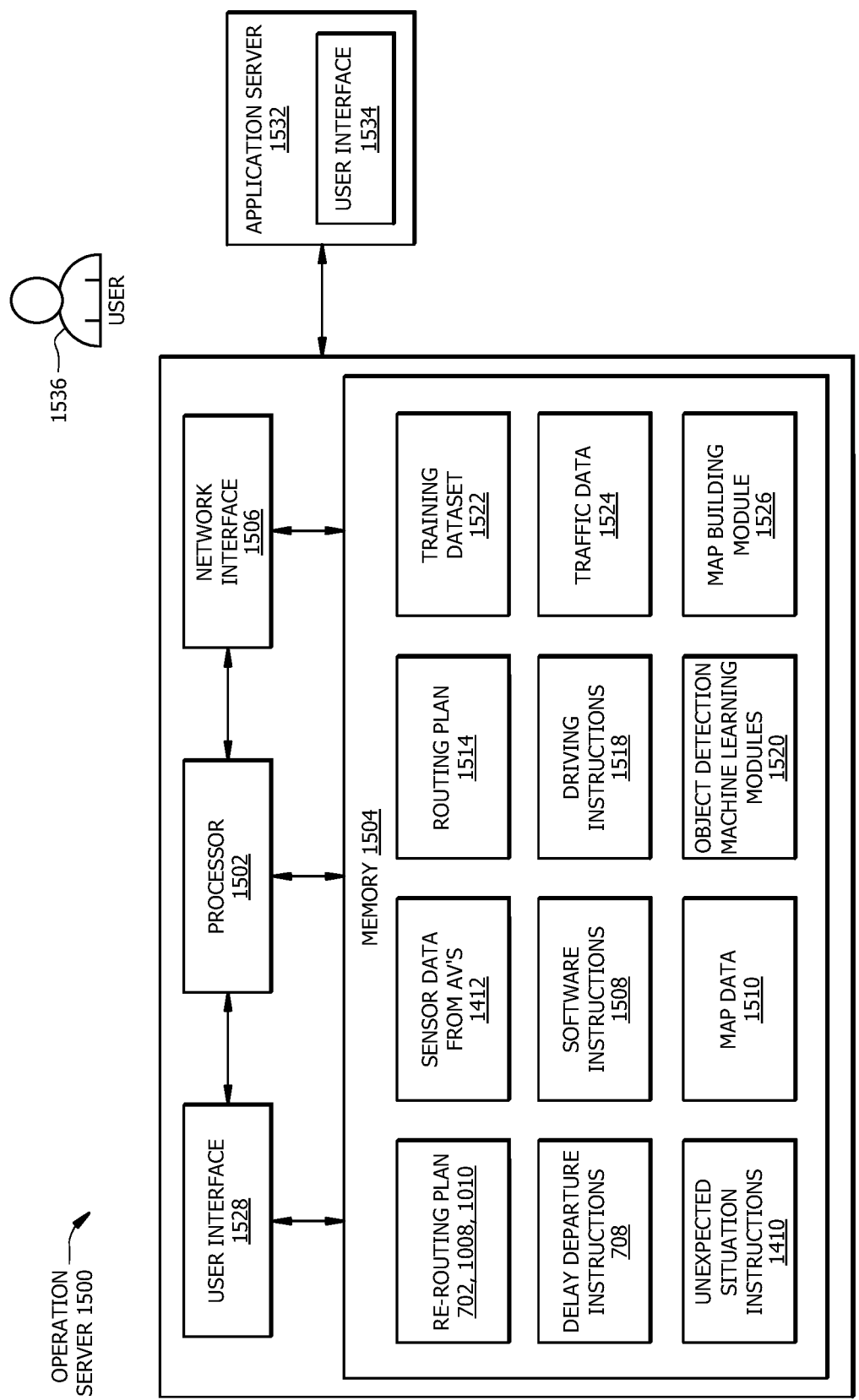
FIG. 15 illustrates a block diagram of an operation server.

FIG. 15 shows an embodiment of the operation server 1500. Aspects of one embodiment of the operation server 1500 have been covered in descriptions of FIGS. 2-13, and additional aspects are provided below. The operation server 1500 includes at least one processor 1502, at least one memory 1504, and at least one network interface 1506. The operation server 1500 may be configured as shown or in any other suitable configuration.

The processor 1502 comprises one or more processors operably coupled to the memory 1504. The processor 1502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 1502 may be a programmable logic device, a microcontroller, a microprocessor, or any suitable combination of the preceding. The processor 1502 is communicatively coupled to and in signal communication with the memory 1504, the network interface 1506, and user interface 1528. The one or more processors are configured to process data and may be implemented in hardware or software. For example, the processor 1502 may be 8-bit, 16-bit, 32-bit, 64-bit or of any other suitable architecture. The processor 1502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1-13. In some embodiments, the function described herein is implemented using logic units, FPGAs, ASICs, DSPs, or any other suitable hardware or electronic circuitry.

The memory 1504 is operable to store any of the information described above with respect to FIGS. 1-13 along with any other data, instructions, logic, rules, or code operable to implement the function(s) described herein when executed by processor 1502. For example, the memory 1504 may store software instructions 1508, map data 1510, re-routing plans 702, 1008, 1010, routing plan 1514, training dataset 1522, delay departure instructions 708, driving instructions 1518, sensor data 1412 received from the AVs 1602, unexpected situation instructions 1410, object detection machine learning modules 1520, traffic data 1524, map building module 1526, and/or any other data/instructions. The memory 1504 comprises one or more disks, tape drives, or solid-state drives, and may be used as an over-flow data storage device, to store programs when such programs are selected for execution, and to store instructions and data that are read during program execution. The memory 1504 may be volatile or non-volatile and may comprise read-only memory (ROM), random-access memory (RAM), ternary content-addressable memory (TCAM), dynamic random-access memory (DRAM), and static random-access memory (SRAM).

The network interface 1506 is configured to enable wired and/or wireless communications. The network interface 1506 is configured to communicate data between the control subsystem 1400 and other network devices, systems, or domain(s). For example, the network interface 1506 may comprise a WIFI interface, a local area network (LAN) interface, a wide area network (WAN) interface, a modem, a switch, or a router. The processor 1502 is configured to send and receive data using the network interface 1506. The network interface 1506 may be configured to use any suitable type of communication protocol.

In one embodiment, the operation server 1500 may be implemented by a cluster of computing devices that may serve to oversee the operations of the AVs 1602. For example, the operation server 1500 may be implemented by a plurality of computing devices using distributed computing and/or cloud computing systems. In another example, the operation server 1500 may be implemented by a plurality of computing devices in one or more data centers. The operation server 1500 is in signal communication with the AVs 1602 and their components (e.g., the in-vehicle control computer 1650). In one embodiment, the operation server 1500 is configured to determine a particular routing plan 1514 for each AV 1602. For example, the operation server 1500 may determine a particular routing plan 1514 for an AV 1602 that leads to reduced driving time and a safer driving experience for reaching the destination of that AV 1602. Some examples of determining (or updating) routing plans 1514 for different AVs are described in FIGS. 2-13.

In one embodiment, in cases where an AV (e.g., the lead AV 1602-1) encounters an unexpected situation 104 (See FIG. 1), the operation server 1500 may determine a more efficient, safe, and reliable navigating solution for the lead AV 1602-1 and the one or more following AVs 1602 based on analyzing the sensor data 1412 received from the lead AV 1602-1. For example, based on the nature of the unexpected situation 104, location coordinates of each AV 1602, and traffic data 1524 of the routing plans 1514, the operation server 1500 may send any appropriate instructions/data to each AV 1602. For example, the operation server 1500 may send a particular re-routing plan to an AV 1602, such as re-routing plan 702 for AV 1602-3 in FIG. 7, re-routing plan 1008 for AV 1602-3 in FIG. 10, re-routing plan 1010 for AV 1602-4 in FIG. 10. Other examples of sending instructions/data to each AV are described in FIGS. 2-13.

In one embodiment, the navigating solutions or routing plans 1514 for the AVs 1602 may be determined from Vehicle-to-Vehicle (V2V) communications, such as the lead AV 1602-1 with one or more following AVs 1602. In one embodiment, the navigating solutions or routing plans 1514 for the AVs 1602 may be determined from Vehicle-to-Cloud (V2C) communications, such as any AV 1602 with the operation server 1500.

In one embodiment, the navigating solutions or routing plans 1514 for the AVs 1602 may be determined by Vehicle-to-Cloud-to-Human (V2C2H) and/or Vehicle-to-Human (V2H) communications, where a human intervention is incorporated in determining navigating solutions for any of the AVs 1602. For example, a user 1536 may review the sensor data 1412 from the user interface 1528 and confirm, modify, and/or override navigating solutions for any of the AVs 1602 determined by the control subsystem 1400 and/or the operation server 1500. The user 1536 may add a human perspective in determining the navigation plans of the AVs 1602 that the control subsystem 1400 and/or the operation server 1500 otherwise do not have the human perspective which is more preferable compared to machine's perspectives in terms of safety, fuel-saving, etc.

With respect to the example of the unknown object 204 in FIG. 2, the user 1536 may review the sensor data 1412 and clarify the identity of the object 204, e.g., it is indeed an unknown object 204, such as a couch, it is safe to pass by it, etc. With respect to the example of the road closure 602 in FIG. 6, the user 1536 may review the sensor data 1412 and determine a more precise location of the road closure 602 on the map data 1510. In some cases, when encountering the road closure 602, the user 1536 may set (or update) the navigation plans of the lead AV 1602-1 to re-route before reaching the road closure 602, such as instructing the lead AV 1602-1 to make a U-turn and take a particular exit. The user 1536 may also set (or update) the navigation plans of the following AVs 1602, e.g., to take a particular exit (e.g., three exits before the road closure 602). As such, those following AVs 1602 that passed the particular exit may re-route by making a U-turn and driving until they reach the particular exit.

In another example, the user 1536 (based on reviewing the sensor data 1412) may determine that the road closure 602 is no longer applicable (e.g., the road 600 is opened) and set (or update) the navigation plans of the AVs 1602 to resume autonomous driving (e.g., if they are stopped in their lanes or pulled over). With respect to the example of determining re-routing plan 702 for AV 1602-3 in FIG. 7 where the operation server 1500 instructs the AV 1602-3 to take the exit 704, the user 1536 may review the sensor data 1412 and set the navigation plans of the AV 1602-3 to take another exit, e.g., to shorten the delay in arriving the destination or because the other exit is safer to drive through. With respect to the example of determining a safe region 618 for any of the AVs 1602 in FIGS. 6 and 7, the user 1536 (based on reviewing the sensor data 1412) may determine a more favorable safe region 618 for each AV 1602, such as regions that the AVs 1602 are allowed to stop without getting towed. With respect to encountering a construction zone 902 in FIG. 10, the user 1536 (based on reviewing the sensor data 1412) may set markers on the map data 1510 showing the extent of the construction zone 902 to be from a first marker before the first end 1002 (e.g., 200 feet before the first end 1002) to a second marker after the second end 1004 (e.g., 200 feet after the second end 1004). As such, the AVs 1602 would operate in the safety mode 908 longer, i.e., from the first marker until the second marker, thus making passing the construction zone 902 safer for the AVs 1602, other vehicles, pedestrians, etc. Therefore, the AVs 1602 would have easier transitions and navigations to pursue, such as, easier transitions for changing lanes where there is less congestion in traffic on road 900. In one embodiment, the navigating solutions for the AVs 1602 may be determined by any combination of V2V, V2C, V2C2H, V2H communications, among other types of communications.

In one embodiment, the operation server 1500 may capture and record the navigation plans set by the user 1536 in each situation and use it in similar situations. For example, the operation server 1500 may train the machine learning module used to generate the unexpected situation instructions 1410 to learn from the navigation plans set by the user 1536 in each situation and recommend similar navigation plans for similar situations.

In one embodiment, the operation server 1500 may send the sensor data 1412 to an application server 1532 to be reviewed by users 1536. The application server 1532 is generally any computing device configured to communicate with other devices, such as other servers (e.g., operation server 1500), AVs 1602, databases, etc., via a network interface. The application server 1532 is configured to perform specific functions described herein and interact with users 1536, e.g., via its user interfaces 1534. Examples of the application server 1532 include but are not limited to desktop computers, laptop computers, servers, etc. In one example, the application server 1532 may act as a presentation layer where users 1536 access to review the sensor data 1412. As such, the operation server 1500 may send the sensor data 1412 to an application server 1532. The user 1536 may review the sensor data 1412 from the user interface 1534 and confirm, modify, and/or override navigating solutions for any of the AVs 1602 determined by the control subsystem 1400 and/or the operation server 1500, such as described above.

Map data 1510 may include a virtual map of a city which includes route 100 (See FIG. 1). In some examples, the map data 1510 may include the map database 1758 and map database 1736 (See FIG. 17 for descriptions of the map database 1758 and map database 1736). The map data 1510 may include drivable areas, such as roads, paths, highways, and undrivable areas, such as terrain (determined by the occupancy grid module 1760, see FIG. 17 for descriptions of the occupancy grid module 1760). The map data 1510 may specify location coordinates of road signs, lanes, lane markings, lane boundaries, road boundaries, traffic lights, etc.

The map data 1510 may also specify connections between lanes (e.g., which lanes can feed into other adjacent lanes). The map data 1510 may specify information indicating types of lanes of a road (e.g., traffic lane, passing lane, emergency lane, turning lane, bus lane, etc.), types of lane boundaries (e.g., white lines, yellow lines, other road surface markings and/or mechanical markings, etc.), types of road boundaries (e.g., regular curbs, red curbs, sidewalks, guard rails, other barriers, etc.) road intersections, one or more obstacles ahead of the autonomous vehicle, and other information about the road or areas adjacent to the road. The map data 1510 may also specify elevations of roads, such as curves, hills, valleys; road hazards, such as speed bumps, potholes; road sections, such as road school zones, railroad crossings, etc.

Map building module 1526 may be implemented by the processor 1502 executing software instructions 1508, is configured to build the map data 1510. In one embodiment, the map building module 1526 may build the map data 1510 from sensor data received from one or more mapping vehicles. In one example, a mapping vehicle may be an AV 1602. In another example, a mapping vehicle may be an AV 1602 or un-autonomous vehicle connected or integrated with sensors 1646 operated by a driver. In some cases, one or more mapping vehicles may be dispatched to observe an unexpected situation 104 reported by an AV 1602, and send more sensor data related to the unexpected situation 104.

The map building module 1526 is configured to use the sensor data to determine which portion of the map data 1510 they are associated with. The map building module 1526 may dynamically build each section of the map data 1510 by merging different sensor data associated with each section of the map data 1510. The map building module 1526 also uses the sensor data to discover overlapping portions of the map data 1510 (e.g., by matching corresponding images, videos, LiDAR data, radar data, etc. observing the same portion of the map data 1510). The map building module 1526 then connects portions of the map data 1510 with their corresponding adjacent portions. In other words, the map building module 1526 discovers adjacent portions of the map data 1510, stitches them together, and builds the map data 1510. The map building module 1526 is also configured to update a portion of the map data 1510 that based on the received sensor data needs to be updated.

For example, in the case of encountering an unknown object 204 in FIG. 2, when the operation server 1500 receives the sensor data 216*a* (related to the unknown object 204), once it is confirmed that there is indeed the unknown object 204 at particular location coordinates, the map building module 1526 updates a portion of the map data 1510, reflecting the presence of the unknown object 204. Similarly, the map building module 1526 updates different portions of the map data 1510 based on sensor data related to different cases of encountering unexpected situations 104 (See FIG. 1).

The map building module 1526 is also configured to facilitate shadow testing of routing plans 1514 using the new layout of one or more roads in the updated map data 1510. For example, when the map data 1510 is updated, the map building module 1526 may run one or more simulations of autonomous driving through the updates map data 1510 for each AV 1602. For example, the one or more simulations of autonomous driving may be related to an AV 1602 navigating around an object, changing lanes, pulling over, re-routing, etc.

The map building module 1526 selects a particular course of autonomous driving from the one or more simulations of autonomous driving that leads to a more efficient, safe, and reliable navigating solution for each AV 1602 compared to other simulations.

Routing plan 1514 is a plan for traveling from a start location (e.g., a first AV launch pad/landing pad) to a destination (e.g., a second AV launchpad/landing pad). For example, the routing plan 1514 of the AV 1602 may specify a combination of one or more streets/roads/highways in a specific order from the start location to the destination. The routing plan 1514 of the AV 1602 may specify stages including the first stage (e.g., moving out from the start location), a plurality of intermediate stages (e.g., traveling along particular lanes of one or more particular street/road/highway), and the last stage (e.g., entering the destination. The routing plan 1514 may include other information about the route from the start position to the destination, such as road/traffic signs in that routing plan 1514, etc.

Figure 17:
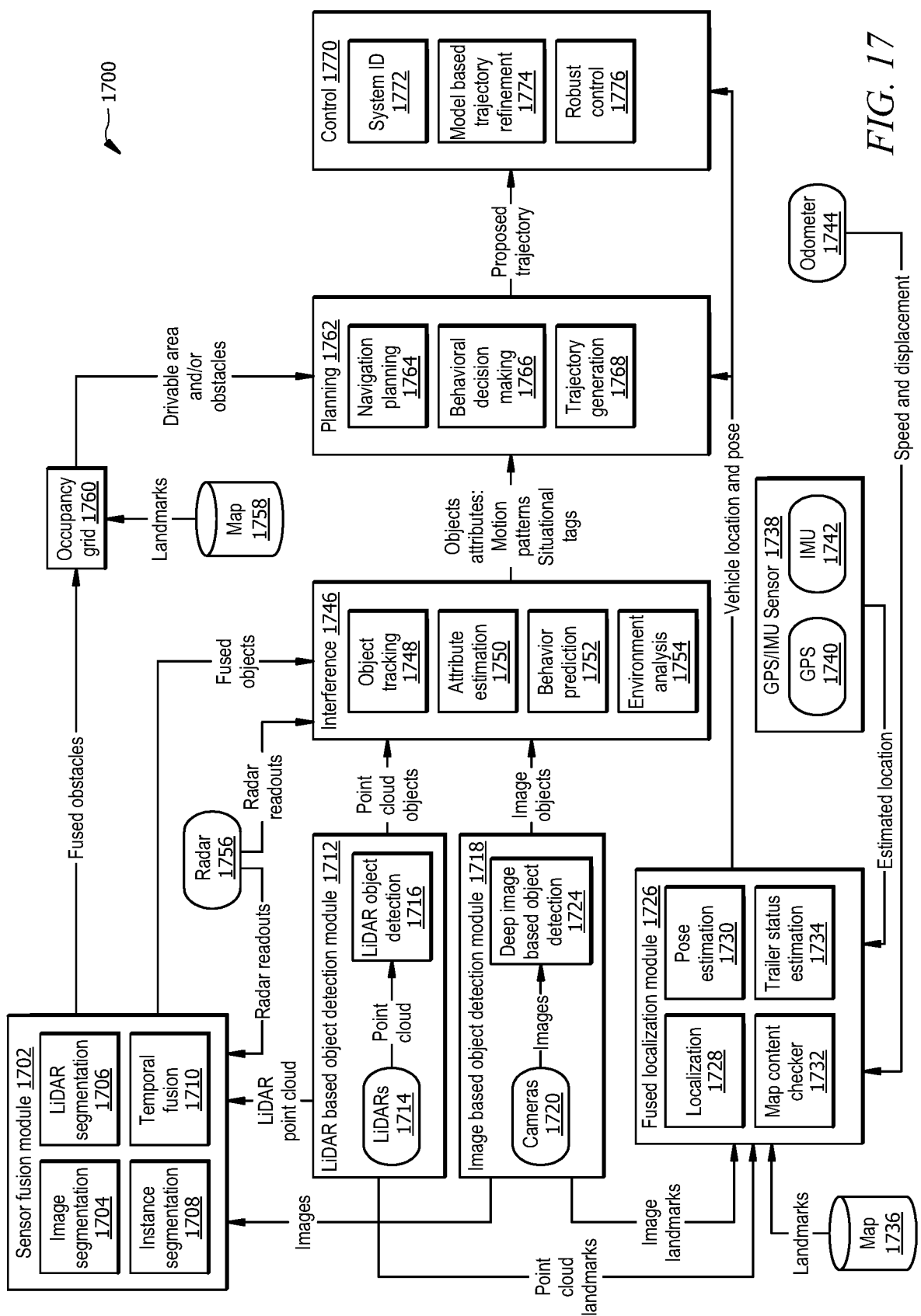
FIG. 17 illustrates an example system for providing autonomous driving operations used by the AV of FIG. 16.

Driving instructions 1518 may be implemented by the planning module 1762 (See descriptions of the planning module 1762 in FIG. 17.). The driving instructions 1518 may include instructions and rules to adapt the autonomous driving of the AV 1602 according to the driving rules of each stage of the routing plan 1514. For example, the driving instructions 1518 may include instructions to stay within the speed range of a road traveled by the AV 1602, adapt the speed of the AV 1602 with respect to observed changes by the sensors 1646, such as speeds of surrounding vehicles, objects within the detection zones of the sensors, etc.

Object detection machine learning modules 1520 may be implemented by the processor 1502 executing software instructions 1508, and is generally configured to detect objects from the sensor data 1412. The object detection machine learning modules 1520 may be implemented using neural networks and/or machine learning algorithms for detecting objects from any data type, such as images, videos, infrared images, point clouds, radar data, etc.

In one embodiment, the object detection machine learning modules 1520 may be implemented using machine learning algorithms, such as Support Vector Machine (SVM), Naïve Bayes, Logistic Regression, k-Nearest Neighbors, Decision trees, or the like. In one embodiment, the object detection machine learning modules 1520 may utilize a plurality of neural network layers, convolutional neural network layers, and/or the like, in which weights and biases of perceptrons of these layers are optimized in the training process of the object detection machine learning modules 1520. The object detection machine learning modules 1520 may be trained by the training dataset 1522 which includes samples of data types labeled with one or more objects in each sample. For example, the training dataset 1522 may include sample images of objects (e.g., vehicles, lane markings, pedestrian, road signs, etc.) labeled with object(s) in each sample image. Similarly, the training dataset 1522 may include samples of other data types, such as videos, infrared images, point clouds, radar data, etc. labeled with object(s) in each sample data. The object detection machine learning modules 1520 may be trained, testes, and refined by the training dataset 1522 and the sensor data 1412. The object detection machine learning modules 1520 uses the sensor data 1412 (which are not labeled with objects) to increase their accuracy of predictions in detecting objects. For example, supervised and/or unsupervised machine learning algorithms may be used to validate the predictions of the object detection machine learning modules 1520 in detecting objects in the sensor data 1412.

Traffic data 1524 may include traffic data 1524 of roads/streets/highways in the map data 1510. The operation server 1500 may use traffic data 1524 gathered by one or more mapping vehicles. The operation server 1500 may use traffic data 1524 that is captured from any source, such as crowd-sourced traffic data 1524 captured from external sources, e.g., Waze™ and Google map™, live traffic reporting, etc.

Example AV 1602 and its Operation

FIG. 16 shows a block diagram of an example vehicle ecosystem 1600 in which autonomous driving operations can be determined. As shown in FIG. 16, the AV 1602 may be a semi-trailer truck. The vehicle ecosystem 1600 includes several systems and components that can generate and/or deliver one or more sources of information/data and related services to the in-vehicle control computer 1650 that may be located in an AV 1602. The in-vehicle control computer 1650 can be in data communication with a plurality of vehicle subsystems 1640, all of which can be resident in the AV 1602. A vehicle subsystem interface 1660 is provided to facilitate data communication between the in-vehicle control computer 1650 and the plurality of vehicle subsystems 1640. In some embodiments, the vehicle subsystem interface 1660 can include a controller area network (CAN) controller to communicate with devices in the vehicle subsystems 1640.

The AV 1602 may include various vehicle subsystems that support of the operation of AV 1602. The vehicle subsystems may include the control subsystem 1400, a vehicle drive subsystem 1642, a vehicle sensor subsystem 1644, and/or a vehicle control subsystem 1648. The components or devices of the vehicle drive subsystem 1642, the vehicle sensor subsystem 1644, and the vehicle control subsystem 1648 shown in FIG. 16 are examples. The vehicle drive subsystem 1642 may include components operable to provide powered motion for the AV 1602. In an example embodiment, the vehicle drive subsystem 1642 may include an engine/motor 1642a, wheels/tires 1642b, a transmission 1642c, an electrical subsystem 1642d, and a power source 1642e.

The vehicle sensor subsystem 1644 may include a number of sensors 1646 configured to sense information about an environment or condition of the AV 1602. The vehicle sensor subsystem 1644 may include one or more cameras 1646a or image capture devices, a radar unit 1646b, one or more temperature sensors 1646c, a wireless communication unit 1646d (e.g., a cellular communication transceiver), an inertial measurement unit (IMU) 1646e, a laser range finder/LiDAR unit 1646f, a Global Positioning System (GPS) transceiver 1646g, and/or a wiper control system 1646h. The vehicle sensor subsystem 1644 may also include sensors configured to monitor internal systems of the AV 1602 (e.g., an O2 monitor, a fuel gauge, an engine oil temperature, etc.).

The IMU 1646e may include any combination of sensors (e.g., accelerometers and gyroscopes) configured to sense position and orientation changes of the AV 1602 based on inertial acceleration. The GPS transceiver 1646g may be any sensor configured to estimate a geographic location of the AV 1602. For this purpose, the GPS transceiver 1646g may include a receiver/transmitter operable to provide information regarding the position of the AV 1602 with respect to the Earth. The radar unit 1646b may represent a system that utilizes radio signals to sense objects within the local environment of the AV 1602. In some embodiments, in addition to sensing the objects, the radar unit 1646b may additionally be configured to sense the speed and the heading of the objects proximate to the AV 1602. The laser range finder or LiDAR unit 1646f may be any sensor configured to sense objects in the environment in which the AV 1602 is located using lasers. The cameras 1646a may include one or more devices configured to capture a plurality of images of the environment of the AV 1602. The cameras 1646a may be still image cameras or motion video cameras.

The vehicle control subsystem 1648 may be configured to control the operation of the AV 1602 and its components. Accordingly, the vehicle control subsystem 1648 may include various elements such as a throttle and gear 1648a, a brake unit 1648b, a navigation unit 1648c, a steering system 1648d, and/or an autonomous control unit 1648e. The throttle 1648a may be configured to control, for instance, the operating speed of the engine and, in turn, control the speed of the AV 1602. The gear 1648a may be configured to control the gear selection of the transmission. The brake unit 1648b can include any combination of mechanisms configured to decelerate the AV 1602. The brake unit 1648b can use friction to slow the wheels in a standard manner. The brake unit 1648b may include an Anti-lock brake system (ABS) that can prevent the brakes from locking up when the brakes are applied. The navigation unit 1648c may be any system configured to determine a driving path or route for the AV 1602. The navigation 1648c unit may additionally be configured to update the driving path dynamically while the AV 1602 is in operation. In some embodiments, the navigation unit 1648c may be configured to incorporate data from the GPS transceiver 1646g and one or more predetermined maps so as to determine the driving path (e.g., along the route 100 of FIG. 1) for the AV 1602. The steering system 1648d may represent any combination of mechanisms that may be operable to adjust the heading of AV 1602 in an autonomous mode or in a driver-controlled mode.

The autonomous control unit 1648e may represent a control system configured to identify, evaluate, and avoid or otherwise negotiate potential obstacles or obstructions in the environment of the AV 1602. In general, the autonomous control unit 1648e may be configured to control the AV 1602 for operation without a driver or to provide driver assistance in controlling the AV 1602. In some embodiments, the autonomous control unit 1648e may be configured to incorporate data from the GPS transceiver 1646g, the radar 1646b, the LiDAR unit 1646f, the cameras 1646a, and/or other vehicle subsystems to determine the driving path or trajectory for the AV 1602.

Many or all of the functions of the AV 1602 can be controlled by the in-vehicle control computer 1650. The in-vehicle control computer 1650 may include at least one data processor 1670 (which can include at least one microprocessor) that executes processing instructions 1680 stored in a non-transitory computer readable medium, such as the data storage device 1690 or memory. The in-vehicle control computer 1650 may also represent a plurality of computing devices that may serve to control individual components or subsystems of the AV 1602 in a distributed fashion. In some embodiments, the data storage device 1690 may contain processing instructions 1680 (e.g., program logic) executable by the data processor 1670 to perform various methods and/or functions of the AV 1602, including those described with respect to FIGS. 1-13 above and FIGS. 17 and 18 below.

The data storage device 1690 may contain additional instructions as well, including instructions to transmit data to, receive data from, interact with, or control one or more of the vehicle drive subsystem 1642, the vehicle sensor subsystem 1644, and the vehicle control subsystem 1648. The in-vehicle control computer 1650 can be configured to include a data processor 1670 and a data storage device 1090. The in-vehicle control computer 1650 may control the function of the AV 1602 based on inputs received from various vehicle subsystems (e.g., the vehicle drive subsystem 1642, the vehicle sensor subsystem 1644, and the vehicle control subsystem 1648).

FIG. 17 shows an exemplary system 1700 for providing precise autonomous driving operations. The system 1700 includes several modules that can operate in the in-vehicle control computer 1650, as described in FIG. 16. The in-vehicle control computer 1650 includes a sensor fusion module 1702 shown in the top left corner of FIG. 17, where the sensor fusion module 1702 may perform at least four image or signal processing operations. The sensor fusion module 1702 can obtain images from cameras located on an autonomous vehicle to perform image segmentation 1704 to detect the presence of moving objects (e.g., other vehicles, pedestrians, etc.,) and/or static obstacles (e.g., stop sign, speed bump, terrain, etc.,) located around the autonomous vehicle. The sensor fusion module 1702 can obtain LiDAR point cloud data item from LiDAR sensors located on the autonomous vehicle to perform LiDAR segmentation 1706 to detect the presence of objects and/or obstacles located around the autonomous vehicle.

The sensor fusion module 1702 can perform instance segmentation 1708 on image and/or point cloud data item to identify an outline (e.g., boxes) around the objects and/or obstacles located around the autonomous vehicle. The sensor fusion module 1702 can perform temporal fusion 1710 where objects and/or obstacles from one image and/or one frame of point cloud data item are correlated with or associated with objects and/or obstacles from one or more images or frames subsequently received in time.

The sensor fusion module 1702 can fuse the objects and/or obstacles from the images obtained from the camera and/or point cloud data item obtained from the LiDAR sensors. For example, the sensor fusion module 1702 may determine based on a location of two cameras that an image from one of the cameras comprising one half of a vehicle located in front of the autonomous vehicle is the same as the vehicle located captured by another camera. The sensor fusion module 1702 sends the fused object information to the interference module 1746 and the fused obstacle information to the occupancy grid module 1760. The in-vehicle control computer includes the occupancy grid module 1760 can retrieve landmarks from a map database 1758 stored in the in-vehicle control computer. The occupancy grid module 1760 can determine drivable areas and/or obstacles from the fused obstacles obtained from the sensor fusion module 1702 and the landmarks stored in the map database 1758. For example, the occupancy grid module 1760 can determine that a drivable area may include a speed bump obstacle.

Below the sensor fusion module 1702, the in-vehicle control computer 1650 includes a LiDAR based object detection module 1712 that can perform object detection 1716 based on point cloud data item obtained from the LiDAR sensors 1714 located on the autonomous vehicle. The object detection 1716 technique can provide a location (e.g., in 3D world coordinates) of objects from the point cloud data item. Below the LiDAR based object detection module 1712, the in-vehicle control computer includes an image based object detection module 1718 that can perform object detection 1724 based on images obtained from cameras 1720 located on the autonomous vehicle. The object detection 1724 technique can employ a deep machine learning technique to provide a location (e.g., in 3D world coordinates) of objects from the image provided by the camera.

The radar 1756 on the autonomous vehicle can scan an area in front of the autonomous vehicle or an area towards which the autonomous vehicle is driven. The radar data is sent to the sensor fusion module 1702 that can use the radar data to correlate the objects and/or obstacles detected by the radar 1756 with the objects and/or obstacles detected from both the LiDAR point cloud data item and the camera image. The radar data is also sent to the inference module 1746 that can perform data processing on the radar data to track objects 1748 as further described below.

The in-vehicle control computer includes an interference module 1746 that receives the locations of the objects from the point cloud and the objects from the image, and the fused objects from the sensor fusion module 1702. The interference module 1746 also receive the radar data with which the interference module 1746 can track objects 1748 from one point cloud data item and one image obtained at one time instance to another (or the next) point cloud data item and another image obtained at another subsequent time instance.

The interference module 1746 may perform object attribute estimation 1750 to estimate one or more attributes of an object detected in an image or point cloud data item. The one or more attributes of the object may include a type of object (e.g., pedestrian, car, or truck, etc.). The interference module 1746 may perform behavior prediction 1752 to estimate or predict motion pattern of an object detected in an image and/or a point cloud. The behavior prediction 1752 can be performed to detect a location of an object in a set of images received at different points in time (e.g., sequential images) or in a set of point cloud data item received at different points in time (e.g., sequential point cloud data items). In some embodiments the behavior prediction 1752 can be performed for each image received from a camera and/or each point cloud data item received from the LiDAR sensor. In some embodiments, the interference module 1746 can be performed to reduce computational load by performing behavior prediction 1752 on every other or after every pre-determined number of images received from a camera or point cloud data item received from the LiDAR sensor (e.g., after every two images or after every three point cloud data items).

The behavior prediction 1752 feature may determine the speed and direction of the objects that surround the autonomous vehicle from the radar data, where the speed and direction information can be used to predict or determine motion patterns of objects. A motion pattern may comprise a predicted trajectory information of an object over a pre-determined length of time in the future after an image is received from a camera. Based on the motion pattern predicted, the interference module 1746 may assign motion pattern situational tags to the objects (e.g., "located at coordinates (x,y)," "stopped," "driving at 50 mph," "speeding up" or "slowing down"). The situation tags can describe the motion pattern of the object. The interference module 1746 sends the one or more object attributes (e.g., types of the objects) and motion pattern situational tags to the planning module 1762. The interference module 1746 may perform an environment analysis 1754 using any information acquired by system 1700 and any number and combination of its components.

The in-vehicle control computer includes the planning module 1762 that receives the object attributes and motion pattern situational tags from the interference module 1746, the drivable area and/or obstacles, and the vehicle location and pose information from the fused localization module 1726 (further described below).

The planning module 1762 can perform navigation planning 1764 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 1764 may include determining an area next to the road where the autonomous vehicle can be safely parked in case of emergencies. The planning module 1762 may include behavioral decision making 1766 to determine driving actions (e.g., steering, braking, throttle) in response to determining changing conditions on the road (e.g., traffic light turned yellow, or the autonomous vehicle is in an unsafe driving condition because another vehicle drove in front of the autonomous vehicle and in a region within a pre-determined safe distance of the location of the autonomous vehicle). The planning module 1762 performs trajectory generation 1768 and selects a trajectory from the set of trajectories determined by the navigation planning operation 1764. The selected trajectory information is sent by the planning module 1762 to the control module 1770.

The in-vehicle control computer includes a control module 1770 that receives the proposed trajectory from the planning module 1762 and the autonomous vehicle location and pose from the fused localization module 1726. The control module 1770 includes a system identifier 1772. The control module 1770 can perform a model based trajectory refinement 1774 to refine the proposed trajectory. For example, the control module 1770 can applying a filtering (e.g., Kalman filter) to make the proposed trajectory data smooth and/or to minimize noise. The control module 1770 may perform the robust control 1776 by determining, based on the refined proposed trajectory information and current location and/or pose of the autonomous vehicle, an amount of brake pressure to apply, a steering angle, a throttle amount to control the speed of the vehicle, and/or a transmission gear. The control module 1770 can send the determined brake pressure, steering angle, throttle amount, and/or transmission gear to one or more devices in the autonomous vehicle to control and facilitate precise driving operations of the autonomous vehicle.

The deep image-based object detection 1724 performed by the image based object detection module 1718 can also be used detect landmarks (e.g., stop signs, speed bumps, etc.,) on the road. The in-vehicle control computer includes a fused localization module 1726 that obtains landmarks detected from images, the landmarks obtained from a map database 1736 stored on the in-vehicle control computer, the landmarks detected from the point cloud data item by the LiDAR based object detection module 1712, the speed and displacement from the odometer sensor 1744 and the estimated location of the autonomous vehicle from the GPS/IMU sensor 1738 (i.e., GPS sensor 1740 and IMU sensor 1742) located on or in the autonomous vehicle. Based on this information, the fused localization module 1726 can perform a localization operation 1728 to determine a location of the autonomous vehicle, which can be sent to the planning module 1762 and the control module 1770.

The fused localization module 1726 can estimate pose 1730 of the autonomous vehicle based on the GPS and/or IMU sensors 1738. The pose of the autonomous vehicle can be sent to the planning module 1762 and the control module 1770. The fused localization module 1726 can also estimate status 1734 (e.g., location, possible angle of movement) of the trailer unit based on, for example, the information provided by the IMU sensor 1742 (e.g., angular rate and/or linear velocity). The fused localization module 1726 may also check the map content 1732.

Figure 18:
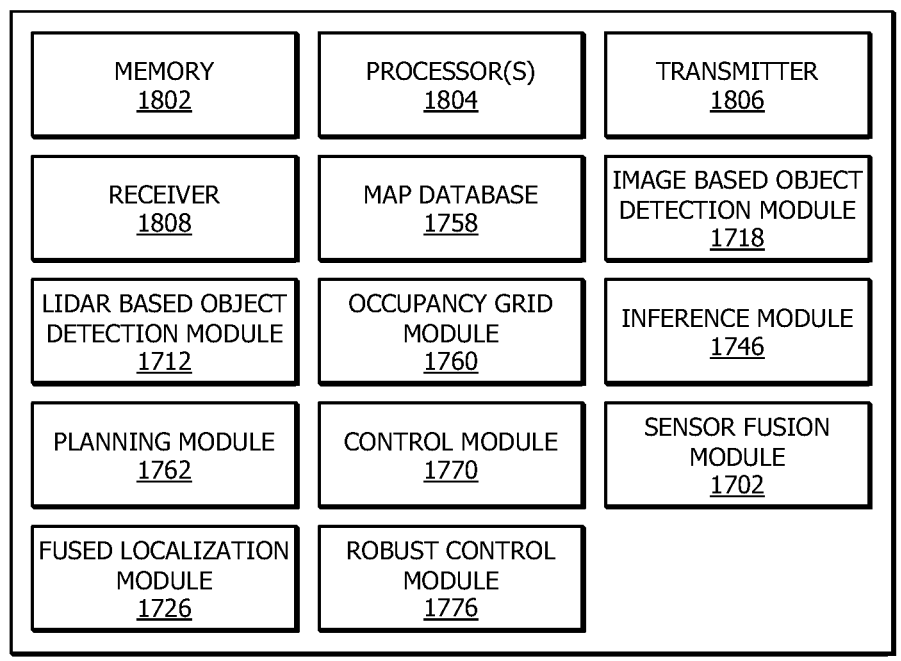
FIG. 18 illustrates a diagram of an in-vehicle control computer included in an AV.

FIG. 18 shows an exemplary block diagram of an in-vehicle control computer 1650 included in an autonomous AV 1602. The in-vehicle control computer 1650 includes at least one processor 1804 and a memory 1802 having instructions stored thereupon (e.g., software instructions 1408, 1508, and processing instructions 1680 in FIGS. 14, 15, and 16, respectively). The instructions upon execution by the processor 1804 configure the in-vehicle control computer 1650 and/or the various modules of the in-vehicle control computer 1650 to perform the operations described in FIGS. 14-17. The transmitter 1806 transmits or sends information or data to one or more devices in the autonomous vehicle. For example, a transmitter 1806 can send an instruction to one or more motors of the steering wheel to steer the autonomous vehicle. The receiver 1808 receives information or data transmitted or sent by one or more devices. For example, the receiver 1808 receives a status of the current speed from the odometer sensor or the current transmission gear from the transmission. The transmitter 1806 and receiver 1808 are also configured to communicate with the control subsystem 1400 described above with respect to FIGS. 1-13.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

Implementations of the disclosure can be described in view of the following clauses, the features of which can be combined in any reasonable manner.

Clause 1. A system, comprising:

a lead autonomous vehicle comprising at least one vehicle sensor located on the lead autonomous vehicle and configured to observe a first field-of-view comprising a region in front of the lead autonomous vehicle;

one or more following autonomous vehicles, different from the lead autonomous vehicle, wherein:

the lead autonomous vehicle is on a particular road heading toward a destination using a first routing plan and map data previously received from an operation server;

the one or more following autonomous vehicles are on the particular road behind the lead autonomous vehicle; and the lead autonomous vehicle and the one or more following autonomous vehicles are communicatively coupled with the operation server;

a first control subsystem, associated with the lead autonomous vehicle, communicatively coupled with the lead autonomous vehicle, the one or more following autonomous vehicles, and the operation server, the first control subsystem comprising a first processor configured to:

receive sensor data from the at least one vehicle sensor of the lead autonomous vehicle, wherein the sensor data comprises location coordinates of any object on the particular road within the first field-of-view of the lead autonomous vehicle;

compare the sensor data with a first portion of the map data, wherein the first portion of the map data comprises location coordinates of expected objects on the particular road within the first field-of-view of the lead autonomous vehicle;

based at least in part upon comparing the sensor data with the first portion of the map data, determine whether the particular road is closed ahead by identifying objects in the sensor data that correspond to a road closure and that are not among the expected objects in the map data;

in response to a determination that the particular road is closed ahead:

determine particular location coordinates of the road closure;

override driving instructions of the lead autonomous vehicle, such that the lead autonomous vehicle is stopped at first location coordinates;

send a first message to the operation server, indicating that the particular road is closed at the particular location coordinates;

the operation server comprising a second processor configured to:

based at least in part upon the first message, update the first portion of the map data, reflecting that the particular road is temporarily closed at the particular location coordinates;

for each autonomous vehicle from the one or more following autonomous vehicles:

determine location coordinates of each autonomous vehicle;

based at least in part upon the location coordinates of each autonomous vehicle, determine whether re-routing is possible, wherein re-routing is possible if there is at least one road to a second routing plan to reach the destination between each autonomous vehicle and the road closure;

if it is determined that re-routing is possible, send updated map data and re-routing instructions to each autonomous vehicle, wherein the re-routing instructions comprise the second routing plan, and if it is determined that re-routing is not possible, send the updated map data and road closure instructions to each autonomous vehicle, wherein the road closure instructions comprise pulling over each autonomous vehicle, wherein pulling over the autonomous vehicle comprises:

searching for an obstacle-free region on a side of the particular road; and instructing the autonomous vehicle to pull over to the obstacle-free region.

Clause 2. The system of Clause 1, wherein the second processor is further configured to send the updated map data and delay departure instructions to each autonomous vehicle from the one or more following autonomous vehicles which has not left an autonomous vehicle launch pad, wherein the delay departure instructions comprises delaying a departure of each autonomous vehicle until the particular road is opened.

Clause 3. The system of Clause 1, wherein the lead autonomous vehicle is pulled over at the first location coordinates and the first processor is further configured to:

notify a driver employee of an organization associated with the lead autonomous vehicle and the one or more following autonomous vehicles that the lead autonomous vehicle is pulled over at the first location coordinates; and upon the driver employee manually driving the lead autonomous vehicle past the road closure and switching back to an autonomous mode, continue autonomously driving the lead autonomous vehicle towards the destination.

Clause 4. The system of Clause 1, wherein overriding the driving instructions of the lead AV comprises entering a safety mode by:

reducing a speed of the lead AV according to speeds of surrounding vehicles;

increasing distances from the surrounding vehicles; or avoiding autonomous driving parallel to the surrounding vehicles.

Clause 5. The system of Clause 1, wherein determining that the particular road is closed comprises determining a presence of one or more of a traffic cone, a traffic barrier, a traffic barrel, or a traffic barricade tape used to close the particular road.

Clause 6. The system of Clause 1, further comprising:

a second control subsystem, associated with any of the one or more following AVs, comprising a third processor configured to:

determine whether the particular road is opened; and in response to a determination that the particular road is opened, send a second message to the operation server, indicating that the particular road is opened, wherein in response to receiving the second message, the operation server updates the first portion of the map data, indicating that the particular road is opened.

Clause 7. The system of Clause 1, wherein the at least one vehicle sensor comprises one or more of cameras, LiDAR sensors, motion sensors, and infrared sensors.

Clause 8. A method, comprising:

receiving sensor data from at least one vehicle sensor of a lead autonomous vehicle, wherein:

the sensor data comprises location coordinates of any object on a particular road within a first field-of-view of the lead autonomous vehicle;

the lead autonomous vehicle is on the particular road heading toward a destination using a routing plan and map data previously received from an operation server; and one or more following autonomous vehicles, different from the lead autonomous vehicle, are on the particular road behind the lead autonomous vehicle; comparing the sensor data with a first portion of the map data, wherein the first portion of the map data comprises location coordinates of expected objects on the particular road within the first field-of-view of the lead autonomous vehicle;

based at least in part upon comparing the sensor data with the first portion of the map data, determining whether the particular road is closed ahead by identifying objects in the sensor data that correspond to a road closure and that are not among the expected objects in the map data;

in response to determining that the particular road is closed ahead:
  determining particular location coordinates of the road closure;
  overriding driving instructions of the lead autonomous vehicle, such that the lead autonomous vehicle is stopped at first location coordinates;
  sending a first message to the operation server, indicating that the particular road is closed at the particular location coordinates;
  based at least in part upon the first message, updating, by a processor associated with the operation server, the first portion of the map data, reflecting that the particular road is temporarily closed at the particular location coordinates;
  for each autonomous vehicle from the one or more following autonomous vehicles:
    determining location coordinates of each autonomous vehicle;
    based at least in part upon the location coordinates of each autonomous vehicle, determining whether re-routing is possible, wherein re-routing is possible if there is at least one road to a second routing plan to reach the destination between each autonomous vehicle and the road closure;
    if it is determined that re-routing is possible, sending updated map data and re-routing instructions to each autonomous vehicle, wherein the re-routing instructions comprise the second routing plan, and
    if it is determined that re-routing is not possible, sending, by the processor associated with the operation server, the updated map data and road closure instructions to each autonomous vehicle, wherein the road closure instructions comprise pulling over each autonomous vehicle.

Clause 9. The method of Clause 8, wherein the method further comprises sending the updated map data and delay departure instructions to each autonomous vehicle from the one or more following autonomous vehicles which has not left an autonomous vehicle launchpad, wherein the delay departure instructions comprises delaying a departure of each autonomous vehicle until the particular road is opened.

Clause 10. The method of Clause 8, wherein the lead autonomous vehicle is pulled over at the first location coordinates and the method further comprises:
  notifying a driver employee of an organization associated with the lead autonomous vehicle and the one or more following autonomous vehicles that the lead autonomous vehicle is pulled over at the first location coordinates; and
  upon the driver employee manually driving the lead autonomous vehicle past the road closure and switching back to an autonomous mode, resuming autonomous driving the lead autonomous vehicle towards the destination.

Clause 11. The method of Clause 8, wherein overriding the driving instructions of the lead AV comprises entering a safety mode by:
  reducing a speed of the lead AV according to speeds of surrounding vehicles;
  increasing distances from the surrounding vehicles; or
  avoiding autonomous driving parallel to the surrounding vehicles.

Clause 12. The method of Clause 8, wherein determining that the particular road is closed comprises determining the presence of one or more of a traffic cone, a traffic barrier, a traffic barrel, or a traffic barricade tape used to close the particular road.

Clause 13. The method of Clause 8, further comprising:
  determining whether the particular road is opened; and
  in response to determining that the particular road is opened, sending a second message to the operation server, indicating that the particular road is opened, wherein in response to receiving the second message, the operation server updates the first portion of the map data, indicating that the particular road is opened.

Clause 14. The method of Clause 8, wherein the at least one vehicle sensor comprises one or more of cameras, LiDAR sensors, motion sensors, and infrared sensors.

Clause 15. A computer program comprising executable instructions stored in a non-transitory computer-readable medium that when executed by one or more processors causes the one or more processors to:
  receive sensor data from at least one vehicle sensor of a lead autonomous vehicle, wherein:
    the sensor data comprises location coordinates of any object on a particular road within a first field-of-view of the lead autonomous vehicle;
    the lead autonomous vehicle is on the particular road heading toward a destination using a routing plan and map data previously received from an operation server; and
    one or more following autonomous vehicles, different from the lead autonomous vehicle, are on the particular road behind the lead autonomous vehicle;
  compare the sensor data with a first portion of the map data, wherein the first portion of the map data comprises location coordinates of expected objects on the particular road within the first field-of-view of the lead autonomous vehicle;
  based at least in part upon comparing the sensor data with the first portion of the map data, determine whether the particular road is closed ahead by identifying objects in the sensor data that correspond to a road closure and that are not among the expected objects in the map data;
  in response to a determination that the particular road is closed ahead:
    determine particular location coordinates of the road closure;
    override driving instructions of the lead autonomous vehicle, such that the lead autonomous vehicle is stopped at first location coordinates;
    send a first message to the operation server, indicating that the particular road is closed at the particular location coordinates;
    based at least in part upon the first message, update the first portion of the map data, reflecting that the particular road is temporarily closed at the particular location coordinates;
    for each autonomous vehicle from the one or more following:
      determine location coordinates of each autonomous vehicle;
      based at least in part upon the location coordinates of each autonomous vehicle, determine whether re-routing is possible, wherein re-routing is possible if there is at least one road to a second routing plan to reach the destination between each autonomous vehicle and the road closure;

if it is determined that re-routing is possible, send updated map data and re-routing instructions to each autonomous vehicle, wherein the re-routing instructions comprise the second routing plan, and if it is determined that re-routing is not possible, send the updated map data and road closure instructions to each autonomous vehicle, wherein the road closure instructions comprise pulling over each autonomous vehicle.

Clause 16. The computer program of Clause 15, wherein the one or more processors are further configured to send the updated map data and delay departure instructions to each autonomous vehicle from the one or more following autonomous vehicles which has not left an autonomous vehicle launch pad, wherein the delay departure instructions comprises delaying a departure of each autonomous vehicle until the particular road is opened.

Clause 17. The computer program of Clause 15, wherein the lead autonomous vehicle is pulled over at the first location coordinates and the one or more processors are further configured to:

notify a driver employee of an organization associated with the lead autonomous vehicle and the one or more following autonomous vehicles that the lead autonomous vehicle is pulled over at the first location coordinates; and upon the driver employee manually driving the lead autonomous vehicle past the road closure and switching back to an autonomous mode, continue autonomously driving the lead autonomous vehicle towards the destination.

Clause 18. The computer program of Clause 15, wherein overriding the driving instructions of the lead AV comprises entering a safety mode by:

reducing a speed of the lead AV according to speeds of surrounding vehicles;

increasing distances from the surrounding vehicles; or avoiding autonomous driving parallel to the surrounding vehicles.

Clause 19. The computer program of Clause 15, wherein determining that the particular road is closed comprises determining the presence of one or more of a traffic cone, a traffic barrier, a traffic barrel, or a traffic barricade tape used to close the particular road.

Clause 20. The computer program of Clause 15, wherein the one or more processors are further configured to:

determine whether the particular road is opened; and in response to a determination that the particular road is opened, send a second message to the operation server, indicating that the particular road is opened, wherein in response to receiving the second message, the operation server updates the first portion of the map data, indicating that the particular road is opened.

The invention claimed is:

1. A system, comprising:
 a lead autonomous vehicle comprising at least one vehicle sensor located on the lead autonomous vehicle and configured to observe a first field-of-view comprising a region in front of the lead autonomous vehicle;
 one or more following autonomous vehicles, different from the lead autonomous vehicle, wherein:
  the lead autonomous vehicle is on a particular road heading toward a destination using a first routing plan and map data previously received from an operation server;
  the one or more following autonomous vehicles are on the particular road behind the lead autonomous vehicle; and
  the lead autonomous vehicle and the one or more following autonomous vehicles are communicatively coupled with the operation server;
 a first control subsystem, associated with the lead autonomous vehicle, communicatively coupled with the lead autonomous vehicle, the one or more following autonomous vehicles, and the operation server, the first control subsystem comprising a first processor configured to:
  receive sensor data from the at least one vehicle sensor of the lead autonomous vehicle, wherein the sensor data comprises location coordinates of any object on the particular road within the first field-of-view of the lead autonomous vehicle;
  compare the sensor data with a first portion of the map data, wherein the first portion of the map data comprises location coordinates of expected objects on the particular road within the first field-of-view of the lead autonomous vehicle;
  based at least in part upon comparing the sensor data with the first portion of the map data, determine whether the particular road is closed ahead by identifying objects in the sensor data that correspond to a road closure and that are not among the expected objects in the map data;
  in response to a determination that the particular road is closed ahead:
   determine particular location coordinates of the road closure;
   override driving instructions of the lead autonomous vehicle, such that the lead autonomous vehicle is stopped at first location coordinates;
   send a first message to the operation server, indicating that the particular road is closed at the particular location coordinates;
 the operation server comprising a second processor configured to:
  based at least in part upon the first message, update the first portion of the map data, reflecting that the particular road is temporarily closed at the particular location coordinates;
  for each autonomous vehicle from the one or more following autonomous vehicles:
   determine location coordinates of each autonomous vehicle;
   based at least in part upon the location coordinates of each autonomous vehicle, determine whether re-routing is possible, wherein re-routing is possible if there is at least one road to a second routing plan to reach the destination between each autonomous vehicle and the road closure;
   if it is determined that re-routing is possible, send updated map data and re-routing instructions to each autonomous vehicle, wherein the re-routing instructions comprise the second routing plan, and
   if it is determined that re-routing is not possible, send the updated map data and road closure instructions to each autonomous vehicle, wherein the road closure instructions comprise pulling over each autonomous vehicle, wherein pulling over the autonomous vehicle comprises:
    searching for an obstacle-free region on a side of the particular road; and
    instructing the autonomous vehicle to pull over to the obstacle-free region; and
   send the updated map data and delay departure instructions to each autonomous vehicle from among the one or more following autonomous vehicles which has not left an autonomous vehicle launch pad, wherein the delay departure instructions comprise delaying a departure of each autonomous vehicle until the particular road is opened.

2. The system of claim 1, wherein the lead autonomous vehicle is pulled over at the first location coordinates and the first processor is further configured to:
notify a driver employee of an organization associated with the lead autonomous vehicle and the one or more following autonomous vehicles that the lead autonomous vehicle is pulled over at the first location coordinates; and
upon the driver employee manually driving the lead autonomous vehicle past the road closure and switching back to an autonomous mode, continue autonomously driving the lead autonomous vehicle towards the destination.

3. The system of claim 1, wherein overriding the driving instructions of the lead autonomous vehicle comprises entering a safety mode by:
reducing a speed of the lead autonomous vehicle according to speeds of surrounding vehicles;
increasing distances from the surrounding vehicles; or
avoiding autonomous driving parallel to the surrounding vehicles.

4. The system of claim 1, wherein determining that the particular road is closed comprises determining a presence of one or more of a traffic cone, a traffic barrier, a traffic barrel, or a traffic barricade tape used to close the particular road.

5. The system of claim 1, further comprising:
a second control subsystem, associated with any of the one or more following autonomous vehicles, comprising a third processor configured to:
determine whether the particular road is opened; and
in response to a determination that the particular road is opened, send a second message to the operation server, indicating that the particular road is opened, wherein in response to receiving the second message, the operation server updates the first portion of the map data, indicating that the particular road is opened.

6. The system of claim 1, wherein the at least one vehicle sensor comprises one or more of cameras, LiDAR sensors, motion sensors, and infrared sensors.

7. A method, comprising:
receiving sensor data from at least one vehicle sensor of a lead autonomous vehicle, wherein:
the sensor data comprises location coordinates of any object on a particular road within a first field-of-view of the lead autonomous vehicle;
the lead autonomous vehicle is on the particular road heading toward a destination using a routing plan and map data previously received from an operation server; and
one or more following autonomous vehicles, different from the lead autonomous vehicle, are on the particular road behind the lead autonomous vehicle;
comparing the sensor data with a first portion of the map data, wherein the first portion of the map data comprises location coordinates of expected objects on the particular road within the first field-of-view of the lead autonomous vehicle;
based at least in part upon comparing the sensor data with the first portion of the map data, determining whether the particular road is closed ahead by identifying objects in the sensor data that correspond to a road closure and that are not among the expected objects in the map data;
in response to determining that the particular road is closed ahead:
determining particular location coordinates of the road closure;
overriding driving instructions of the lead autonomous vehicle, such that the lead autonomous vehicle is stopped at first location coordinates;
sending a first message to the operation server, indicating that the particular road is closed at the particular location coordinates;
based at least in part upon the first message, updating, by a processor associated with the operation server, the first portion of the map data, reflecting that the particular road is temporarily closed at the particular location coordinates;
for each autonomous vehicle from the one or more following autonomous vehicles:
determining location coordinates of each autonomous vehicle;
based at least in part upon the location coordinates of each autonomous vehicle, determining whether re-routing is possible, wherein re-routing is possible if there is at least one road to a second routing plan to reach the destination between each autonomous vehicle and the road closure;
if it is determined that re-routing is possible, sending updated map data and re-routing instructions to each autonomous vehicle, wherein the re-routing instructions comprise the second routing plan, and
if it is determined that re-routing is not possible, sending, by the processor associated with the operation server, the updated map data and road closure instructions to each autonomous vehicle, wherein the road closure instructions comprise pulling over each autonomous vehicle, wherein pulling over the autonomous vehicle comprises:
searching for an obstacle-free region on a side of the particular road; and
instructing the autonomous vehicle to pull over to the obstacle-free region; and
sending the updated map data and delay departure instructions to each autonomous vehicle from the one or more following autonomous vehicles which has not left an autonomous vehicle launchpad, wherein the delay departure instructions comprise delaying a departure of each autonomous vehicle until the particular road is opened.

8. The method of claim 7, wherein the lead autonomous vehicle is pulled over at the first location coordinates and the method further comprises:
notifying a driver employee of an organization associated with the lead autonomous vehicle and the one or more following autonomous vehicles that the lead autonomous vehicle is pulled over at the first location coordinates; and
upon the driver employee manually driving the lead autonomous vehicle past the road closure and switching back to an autonomous mode, resuming autonomous driving the lead autonomous vehicle towards the destination.

9. The method of claim 7, wherein overriding the driving instructions of the lead autonomous vehicle comprises entering a safety mode by:

reducing a speed of the lead autonomous vehicle according to speeds of surrounding vehicles;
increasing distances from the surrounding vehicles; or
avoiding autonomous driving parallel to the surrounding vehicles.

10. The method of claim 7, wherein determining that the particular road is closed comprises determining a presence of one or more of a traffic cone, a traffic barrier, a traffic barrel, or a traffic barricade tape used to close the particular road.

11. The method of claim 7, further comprising:
determining whether the particular road is opened; and
in response to determining that the particular road is opened, sending a second message to the operation server, indicating that the particular road is opened, wherein in response to receiving the second message, the operation server updates the first portion of the map data, indicating that the particular road is opened.

12. The method of claim 7, wherein the at least one vehicle sensor comprises one or more of cameras, LiDAR sensors, motion sensors, and infrared sensors.

13. A computer program comprising executable instructions stored in a non-transitory computer-readable medium that when executed by one or more processors causes the one or more processors to:
receive sensor data from at least one vehicle sensor of a lead autonomous vehicle, wherein:
the sensor data comprises location coordinates of any object on a particular road within a first field-of-view of the lead autonomous vehicle;
the lead autonomous vehicle is on the particular road heading toward a destination using a routing plan and map data previously received from an operation server; and
one or more following autonomous vehicles, different from the lead autonomous vehicle, are on the particular road behind the lead autonomous vehicle;
compare the sensor data with a first portion of the map data, wherein the first portion of the map data comprises location coordinates of expected objects on the particular road within the first field-of-view of the lead autonomous vehicle;
based at least in part upon comparing the sensor data with the first portion of the map data, determine whether the particular road is closed ahead by identifying objects in the sensor data that correspond to a road closure and that are not among the expected objects in the map data;
in response to a determination that the particular road is closed ahead:
determine particular location coordinates of the road closure;
override driving instructions of the lead autonomous vehicle, such that the lead autonomous vehicle is stopped at first location coordinates;
send a first message to the operation server, indicating that the particular road is closed at the particular location coordinates;
based at least in part upon the first message, update the first portion of the map data, reflecting that the particular road is temporarily closed at the particular location coordinates;
for each autonomous vehicle from the one or more following autonomous vehicles:
determine location coordinates of each autonomous vehicle;
based at least in part upon the location coordinates of each autonomous vehicle, determine whether re-routing is possible, wherein re-routing is possible if there is at least one road to a second routing plan to reach the destination between each autonomous vehicle and the road closure;
if it is determined that re-routing is possible, send updated map data and re-routing instructions to each autonomous vehicle, wherein the re-routing instructions comprise the second routing plan, and
if it is determined that re-routing is not possible, send the updated map data and road closure instructions to each autonomous vehicle, wherein the road closure instructions comprise pulling over each autonomous vehicle, wherein pulling over the autonomous vehicle comprises:
searching for an obstacle-free region on a side of the particular road; and
instructing the autonomous vehicle to pull over to the obstacle-free region; and
send the updated map data and delay departure instructions to each autonomous vehicle from the one or more following autonomous vehicles which has not left an autonomous vehicle launch pad, wherein the delay departure instructions comprise delaying a departure of each autonomous vehicle until the particular road is opened.

14. The computer program of claim 13, wherein the lead autonomous vehicle is pulled over at the first location coordinates and the one or more processors are further configured to:
notify a driver employee of an organization associated with the lead autonomous vehicle and the one or more following autonomous vehicles that the lead autonomous vehicle is pulled over at the first location coordinates; and
upon the driver employee manually driving the lead autonomous vehicle past the road closure and switching back to an autonomous mode, continue autonomously driving the lead autonomous vehicle towards the destination.

15. The computer program of claim 13, wherein overriding the driving instructions of the lead autonomous vehicle comprises entering a safety mode by:
reducing a speed of the lead autonomous vehicle according to speeds of surrounding vehicles;
increasing distances from the surrounding vehicles; or
avoiding autonomous driving parallel to the surrounding vehicles.

16. The computer program of claim 13, wherein determining that the particular road is closed comprises determining the presence of one or more of a traffic cone, a traffic barrier, a traffic barrel, or a traffic barricade tape used to close the particular road.

17. The computer program of claim 13, wherein the one or more processors are further configured to:
determine whether the particular road is opened; and
in response to a determination that the particular road is opened, send a second message to the operation server, indicating that the particular road is opened, wherein in response to receiving the second message, the operation server updates the first portion of the map data, indicating that the particular road is opened.

* * * * *